(12) United States Patent
Chrabieh

(10) Patent No.: US 12,468,003 B2
(45) Date of Patent: Nov. 11, 2025

(54) INDOOR AND OUTDOOR GEOLOCATION AND TIME OF ARRIVAL ESTIMATION USING WIRELESS SIGNALS

(71) Applicant: NextNav France, Neuilly-sur-Seine (FR)

(72) Inventor: Rabih Chrabieh, Paris (FR)

(73) Assignee: NextNav France, Puteaux (FR)

(*) Notice: Subject to any disclaimer, the term of this patent is extended or adjusted under 35 U.S.C. 154(b) by 555 days.

(21) Appl. No.: 17/987,839

(22) Filed: Nov. 15, 2022

(65) Prior Publication Data
US 2023/0081564 A1    Mar. 16, 2023

Related U.S. Application Data

(63) Continuation-in-part of application No. 16/952,982, filed on Nov. 19, 2020, now Pat. No. 11,522,576, (Continued)

(51) Int. Cl.
*H04L 27/26*    (2006.01)
*G01S 5/02*    (2010.01)

(52) U.S. Cl.
CPC ................... *G01S 5/0218* (2020.05)

(58) Field of Classification Search
CPC ........ G01S 5/0218; G01S 19/22; G01S 11/02; H04L 27/2647; H04L 27/2662;
(Continued)

(56) References Cited

U.S. PATENT DOCUMENTS

| | | | |
|---|---|---|---|
| 6,665,539 B2* | 12/2003 | Sih | G01S 19/254 455/85 |
| 6,952,446 B1 | 10/2005 | Tsui et al. | |

(Continued)

FOREIGN PATENT DOCUMENTS

| | | |
|---|---|---|
| WO | 2016132338 A1 | 8/2016 |
| WO | 2022106043 A | 5/2022 |

OTHER PUBLICATIONS

Fan et al., "Weak target detection technology of passive radar on the navigation satellite signal", The Journal of Engineering, the Institution of Engineering and Technology, vol. 2019, No. 20, Oct. 1, 2019 (Oct. 1, 2019), pages.

International Search Report and Written Opinion dated Apr. 11, 2025 for International Application PCT/IB2024/060727.

Ducoff et al., "Chapter 8: Pulse Compression Radar," in "Radar Handbook" Jan. 1, 2008, McGraw Hill.

(Continued)

*Primary Examiner* — Joseph E Dean, Jr.
(74) *Attorney, Agent, or Firm* — MLO, a professional corp.

(57) ABSTRACT

A method for estimating a time of arrival of a signal transmitted over a wireless channel, includes receiving the signal by a receiving device to produce a received signal; filtering by a filter either the received signal or a code sequence, wherein the filter is designed to produce a correlation output that is near causal; correlating the received signal with the code sequence to create the correlation output that is near causal; wherein near causal means that early side lobes and an early part of a main lobe of the correlation output are sufficiently suppressed in order to substantially reduce an impact of delayed multipath onto a first path component in the received signal, wherein the first path is in an operating region; identifying in the correlation output, an observation window associated with a main lobe in the correlation output; processing the observation window to determine a time of arrival of the first path component in the received signal.

15 Claims, 24 Drawing Sheets

Related U.S. Application Data which is a continuation-in-part of application No. 16/534,192, filed on Aug. 7, 2019, now Pat. No. 10,880,678.

(60) Provisional application No. 63/300,454, filed on Jan. 18, 2022, provisional application No. 62/715,535, filed on Aug. 7, 2018.

(58) Field of Classification Search
CPC ... H04L 27/2601; H04B 1/707; H04B 1/7093; H04B 1/711
See application file for complete search history.

(56) References Cited

U.S. PATENT DOCUMENTS

| | | | |
|---|---|---|---|
| 8,161,453 B2 | 4/2012 | Chrabieh | |
| 8,166,483 B2 | 4/2012 | Chrabieh | |
| 9,749,069 B2 | 8/2017 | Garcia et al. | |
| 10,042,037 B2 | 8/2018 | Chrabieh et al. | |
| 10,212,608 B2 | 2/2019 | Chrabieh | |
| 10,539,652 B2 | 1/2020 | Chrabieh | |
| 10,880,678 B1 | 12/2020 | Chrabieh | |
| 11,079,467 B2 | 8/2021 | Chrabieh | |
| 11,522,576 B2 | 12/2022 | Chrabieh | |
| 2002/0106035 A1 | 8/2002 | Harikumar et al. | |
| 2003/0081659 A1 | 5/2003 | Yousef et al. | |
| 2004/0142696 A1 | 7/2004 | Saunders et al. | |
| 2005/0135495 A1 | 6/2005 | Barak et al. | |
| 2006/0209974 A1 | 9/2006 | Yoshida | |
| 2007/0076785 A1 | 4/2007 | Reial et al. | |
| 2008/0130794 A1 | 6/2008 | Chong et al. | |
| 2009/0149132 A1 | 6/2009 | Lefever et al. | |
| 2009/0262010 A1 | 10/2009 | Kwak et al. | |
| 2011/0286505 A1 | 11/2011 | Hedley et al. | |
| 2011/0316747 A1* | 12/2011 | Budianu | G01S 11/00 342/387 |
| 2013/0094620 A1 | 4/2013 | Alexander et al. | |
| 2016/0306027 A1 | 10/2016 | Chrabieh et al. | |
| 2020/0348421 A1* | 11/2020 | Lennen | G01S 19/22 |

OTHER PUBLICATIONS

Guvenc et al., "Threshold-based TOA estimation for impulse radio UWB systems," Ultra-wideband, 2005, IEEE Intl. Conf. Sep. 2005, p. 420-425. DOI: 10.1109/ICU.2005.1570024.

International Search Report for IA PCT/IB2016/050919 dated Jul. 27, 2021.

International Search Report for IA PCT/IB2016/050919 dated Jun. 20, 2016.

Sharp et al. "Peak and leading edge detection for time-of-arrival estimation in band-limited positioning systems," IET Comm. vol. 3, No. 10, Jan. 1, 2009, p. 1616. DOI: 10.1049/iet-com.2008.0637.

Chrabieh, et al. "Enhanced Multipath Mitigation Design for GNSS in NLOS," Proceedings of the 2022 International Technical Meeting of The Institute of Navigation, Long Beach, California, Jan. 25-27, 2022, pp. 967-979.

\* cited by examiner

Fig. 3B

Correlate the N point signal vector with the set of ML sequences in order to a) undo the filtering (the prime), b) undo the colored noise or reduce the colored noise (the inverse of matrix C), c) orthonormalize the set of first and nuisance paths (matrix Γ), and d) maximize the norm of the projection onto the signal vector that has the best timing (TOA) hypothesis.  324

Pick the sequence that shows the strongest correlation  326

The time offset corresponding to this sequence (obtained from the corresponding set $t$) provides the timing of the first path component (TOA)  328

Fig. 3C

Apply a filter to the received waveform, preferably a near-causal filter  330

Identify in the waveform an observation window associated with an energy rise in the waveform  332

Correlate the identified observation window in the waveform with correlator sequences that account for the filtering of the waveform during the correlating, reduce the effect of colored noise after hypothetical first path components; and correspond to different time shifts of a hypothetical first path component  334

Determine a time of arrival offset of the first path component from results of correlating the observation window with the correlator sequences  336

*Fig. 10A*
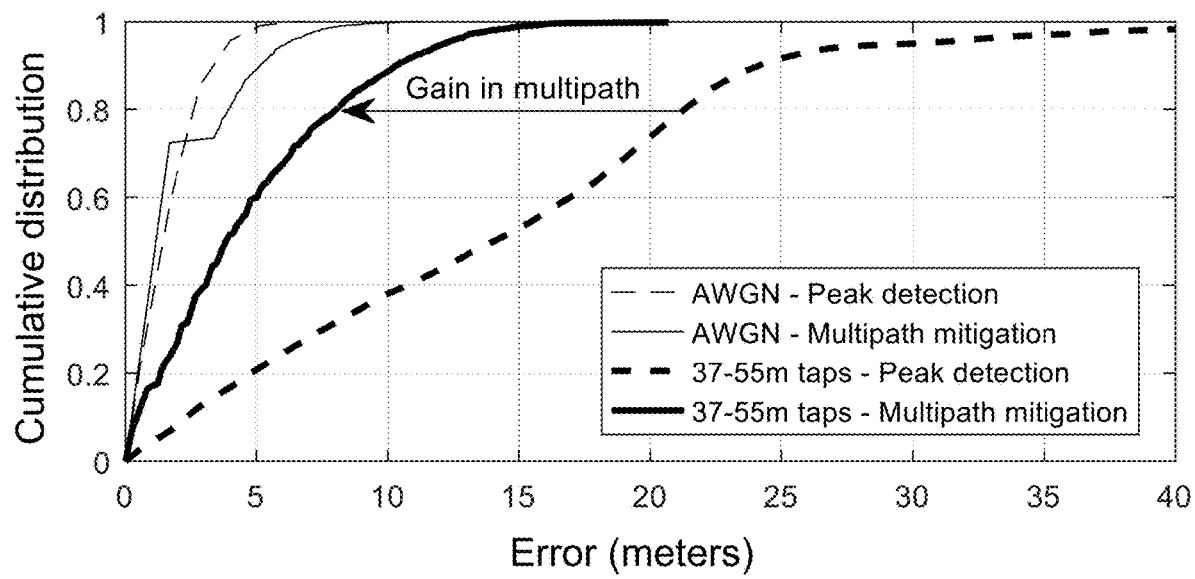
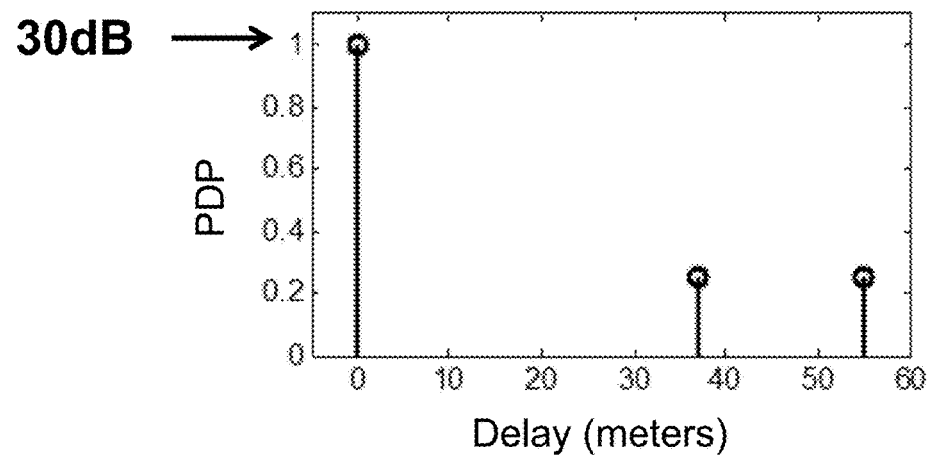
*Fig. 10B*

**512 are the ETU channel model taps or PDP (relative)
514 is an exponentially decaying (density) PDP
516 is a flat per section (density) PDP**

INDOOR AND OUTDOOR GEOLOCATION AND TIME OF ARRIVAL ESTIMATION USING WIRELESS SIGNALS

CROSS-REFERENCE TO RELATED APPLICATIONS

This application claims priority from U.S. Provisional Patent Application 63/300,454 filed Jan. 18, 2022, which is incorporated herein by reference. This application is a continuation-in-part of U.S. patent application Ser. No. 16/952,982 filed Nov. 19, 2020, which is a continuation-in-part of U.S. patent application Ser. No. 16/534,192 filed Aug. 7, 2019, now U.S. Pat. No. 10,880,678, which claims priority from U.S. Provisional Patent Application 62/715,535 filed Aug. 7, 2018, all of which are incorporated herein by reference.

FIELD OF THE INVENTION

The present invention relates generally to wireless communications, and more particularly, to systems and methods for determining time of arrival (TOA) of radio signals.

BACKGROUND OF THE INVENTION

Time of arrival estimation is the estimation of the travel time of a radio signal from a single transmitter to a remote single receiver. The travel time may be expressed in units of time or in units of distance, as the distance between the transmitter and the receiver can be easily calculated by multiplying the travel time by the known speed of the radio wave.

As shown in FIG. 12, a difficulty in the estimation of time of arrival arises from the fact that the radio wave can follow multiple paths from the transmitter 10 to the receiver 12. The first path 14 is the direct path from the transmitter to the receiver, and is the path that TOA estimation seeks to identify. However, the shape of a waveform generated by the receiver 12 in response to the reception of the radio signal is a combined waveform which includes noise, and a sum of the first arriving path component waveform (corresponding to the first path 14) with a multitude of other multipath component waveforms corresponding to other longer paths (for example, 16, 18, and 20) which are received by the receiver 12 at later times. The received signals are filtered to a desired bandwidth.

As seen in FIG. 13, the bandwidth filtering causes each waveform to have early side lobes and late side lobes. The early side lobes interfere with waveforms corresponding to shorter paths and the late side lobes interfere with waveforms corresponding to slightly longer paths. In FIG. 13, the radio wave that has travelled via the first path 14 (FIG. 12) and has arrived at a time $\tau_0$ to as path component 22 has a first waveform 24 generated by the bandwidth filtering. The first waveform 24 has early side lobes 26, 26' and late side lobes 28, 28'. Similarly, the second waveform 30 generated after bandwidth filtering the second received radio wave path component 32 which travelled the second path 16 (FIG. 12) has second early lobes 34, 34' and second late lobes 36, 36'.

Commonly the impulse response of the bandwidth filter to each path component has a cardinal sine function (sinc) or similar low-pass waveform in the time domain, as seen by the shapes of the waveforms in FIG. 13. The combined waveform that is received by the receiver, therefore has a shape which includes a main lobe sided by early and late lobes.

Some techniques for extracting the time of arrival from such waveforms are known. However, such techniques are either simple to process but inaccurate or, like the Maximum Likelihood (ML) algorithm, accurate but very processing intensive, and therefore expensive.

The impulse response shape is usually a sinc, a raised cosine, or some relatively slowly decaying waveform symmetrical around the origin. The reason for the symmetry is that the frequency domain matched filter creates a zero phase signal symmetrical in time domain. The matched filter is necessary to optimize symbol detection in noisy environment (used in conjunction with an equalizer). In this problem, the information is carried by all the taps.

BRIEF SUMMARY OF THE INVENTION

However, the inventor has found that for estimating the TOA where the information is carried by the first tap only, and whose phase has no relevance in this case, the matched filter is not necessarily the right strategy. Some embodiments of the present invention, therefore, relate to the use of a near-causal filter (near zero energy before the origin) which ensures that the first tap is not interfered (or less interfered) by subsequent taps. Filtering a signal in this manner makes it easier to identify the first tap, and therefore to calculate the TOA. In one aspect, the invention provides a method for estimating a time of arrival of a signal received by a receiving device over a wireless channel, the method comprising the step of identifying by the receiving device a location in the time domain of a first path component in a waveform of the received signal; wherein identifying the location of the first path component comprises: applying a filter to the waveform; identifying in the waveform an observation window associated with an energy rise in the waveform; correlating the identified observation window in the waveform with correlator sequences, and determining a time of arrival offset of the first path component from results of correlating the observation window with the correlator sequences, e.g., by minimizing a cost function; wherein the correlator sequences account for the filtering of the waveform during the correlating, wherein the correlator sequences reduce the effect of colored noise after hypothetical first path component; wherein the correlator sequences correspond to different time shifts of a hypothetical first path component.

Preferably, the observation window has at most 20 samples and each of the correlator sequences has at most 20 samples.

In some implementations, the method includes selecting the correlator sequences from a set of pre-stored correlator sequences. In other implementations, the method includes selecting the correlator sequences from a set of correlator sequences computed in real time.

Preferably, the filter is a near-causal filter, which may have a flat response in a region before a main lobe.

For GNSS, the inventor has discovered the above technique to create near causal filters or near-causal correlation output using TOA-MF filters where we maximize the SINR. More recently, the inventor has discovered that one can design near causal filter or near-causal correlation output for GNSS by adding one more piece of information to the design. Namely, in addition to constraining the early sidelobes of the correlation output to be weak, one can cut about half of the main lobe and reduce it too (it is transformed into sidelobes).

In one aspect, the invention provides a method for estimating a time of arrival of a signal transmitted over a wireless channel, the method comprising: receiving the signal by a receiving device to produce a received signal; filtering by a filter either the received signal or a code sequence, wherein the filter is designed to produce a correlation output that is near causal; correlating the received signal with the code sequence to create the correlation output that is near causal; wherein near causal means that early side lobes and an early part of a main lobe of the correlation output are sufficiently suppressed in order to substantially reduce an impact of delayed multipath onto a first path component in the received signal, wherein the first path is in an operating region; identifying in the correlation output, an observation window associated with a main lobe in the correlation output; processing the observation window to determine a time of arrival of the first path component in the received signal.

The early part of the main lobe is preferably a part of the main lobe before a peak of the main lobe. Preferably, the side lobes and the early part of the main lobe are suppressed by predetermined amounts selected to reduce TOA error in predetermined operational conditions. Preferably, the side lobes and the early part of the main lobe are sufficiently suppressed to decrease the impacting early side lobes and the first 50% or less of the main lobe by at least 20 dB below the peak of the main lobe.

In one implementation, the TOA-MF is configured such that the correlation output has reduced sidelobes due to multipath and a steepened rising edge of a main lobe compared to a hypothetical correlation output using an unfiltered shaped code sequence.

In one implementation, the TOA-MF is designed configured such that the correlation output has increased SINR compared to a hypothetical correlation output using an unfiltered shaped code sequence. In one implementation, the filtered code sequence is precomputed and stored by the receiving device. Alternatively, the filtered code sequence is computed by the receiver. The shaping sequence may be, for example, a square wave or binary offset character (BOC) waveform. The power delay profile may be, for example, an expected power delay profile of the wireless channel or a measured power delay profile of the wireless channel. The code sequence may be, for example, a PRN code sequence, CDMA code sequence, GNSS code sequence, or GPS L1 code sequence. In one implementation, identifying an observation window associated with a main lobe comprises identifying a rising edge or falling edge in the correlation output. In one implementation, the method further includes correlating the observation window with correlator sequences that reduce the effect of colored noise after a hypothetical first path component. The correlator sequences preferably correspond to different time shifts of the hypothetical first path component.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE SEVERAL VIEWS OF THE DRAWINGS

FIG. 3B is a flow chart detailing step 312 of FIG. 3A.

FIG. 3C provides an overview of a method for estimating a time of arrival of a signal received by a receiving device over a wireless channel by identifying a location in the time domain of a first path component in a waveform of the received signal, according to an embodiment of the invention.

FIG. 10A is a graph of cumulative distribution function vs error that illustrates a simulation with a GPS channel model giving the performance results, for both typical GPS correlation and for TOA-MF filtering.

FIG. 10B shows a channel model with a main path signal component and 2 subsequent path signal components that are 6 dB weaker; one arriving randomly between 37 and 46 meters after the main path signal component; and another one arriving randomly between 46 and 55 meters after the main path signal component.

DETAILED DESCRIPTION OF THE INVENTION

Figure 2:
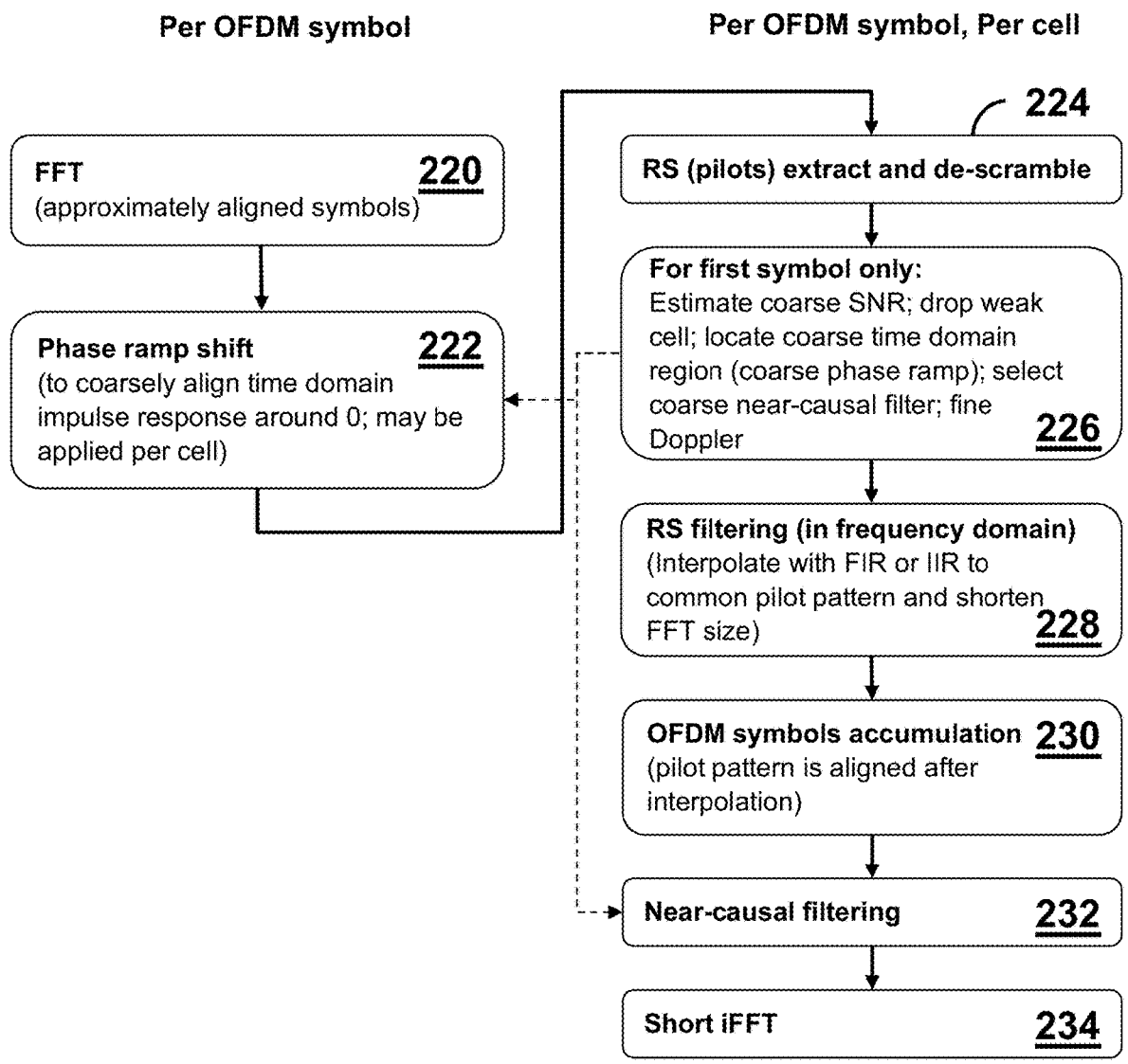
FIG. 2 is a flow chart of frequency domain processing (for systems such as OFDM systems). The steps given in this flowchart may be processed out of order. The given order is given as an example.

Given an input signal (received signal or received waveform) generated by an antenna in response to the antenna's receipt of a radio signal composed of a plurality of taps, the input signal is filtered via a filter of the present invention, to generate a filtered waveform, for example the near-causal filtering 232 shown in the OFDM receiver chain depicted in FIG. 2. The filter used for filtering the input signal is a causal or near causal filter. A causal filter is perfectly 0, i.e., no signal emerging from the output of the filter before time 0 (the time at which the input signal begins). A near-causal filter is not perfectly 0 but has some weak early side lobes; e.g., 40 dB below the main lobe; or 30 dB; or 20 dB. That is, a non-causal filter has a non-zero level of signal emerging from the output of the filter in advance of the signal emerging from the filter at the time of the input signal (e.g., an impulse as delayed by the filter). A non-causal filter may be designed such that the amount and magnitude of the weak early side lobes is adjustable and may be selected based on expected noise level and SINR (as explained below). Thus, the term near-causal filter as used in the present description is defined to be a filter that reduces but does not eliminate side lobes before the main lobe that have signal levels more than a predetermined amount below the signal level of the main lobe, e.g., where the predetermined amount is based on expected PDP and/or noise level.

Figure 1:
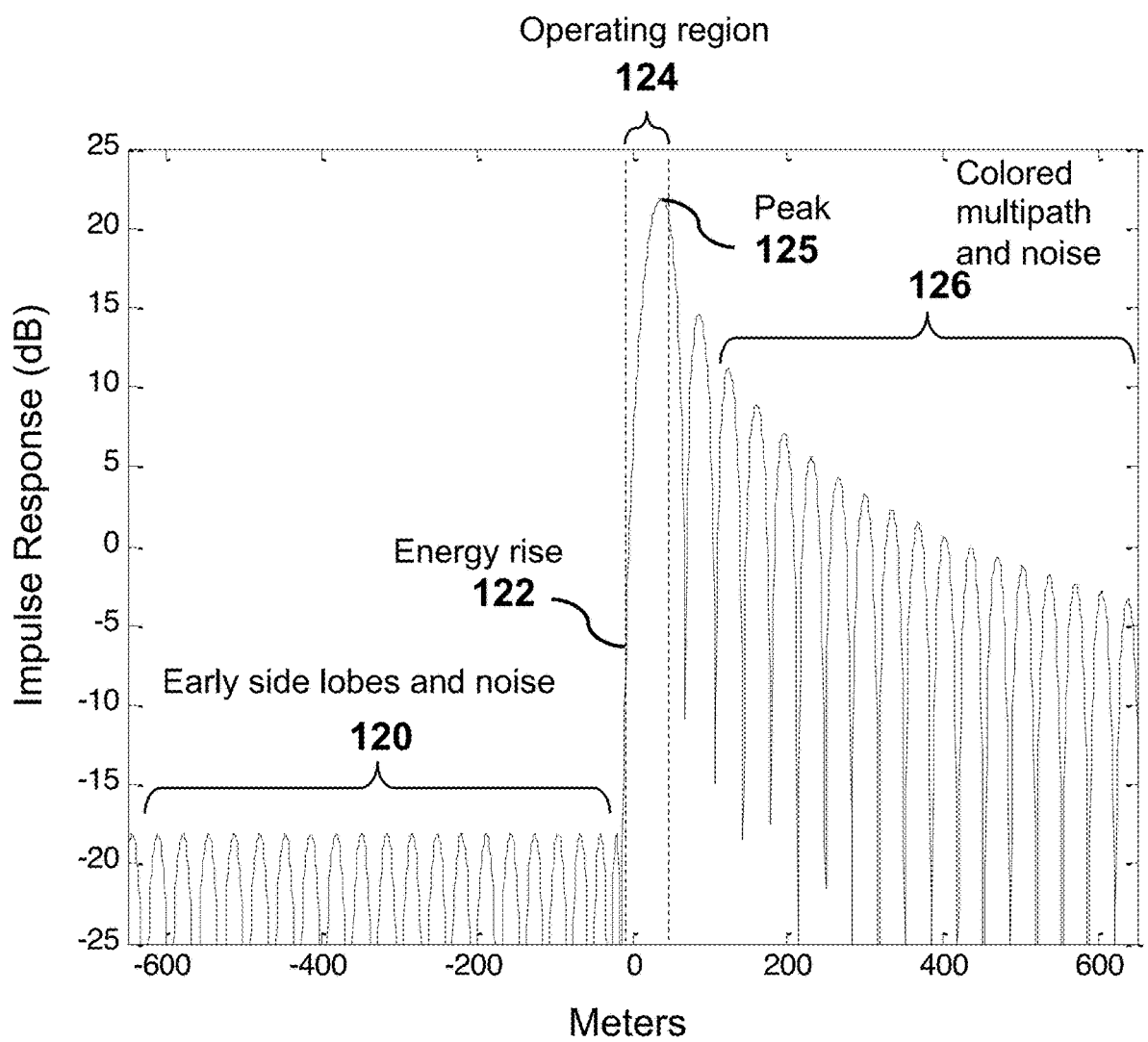
FIG. 1 is a graph of a time domain near-causal impulse response (where time is represented as equivalent distance).

An example of near causal filter (or impulse response of the near causal filter) is given in FIG. 1. We observe a first region 120 on the left, the early side lobes region, where our waveform (or filter) generator has substantially suppressed the waveform's side lobes in order to reduce their interference onto preceding multipath components (which may include a first arriving path signal component). In this region, prior to any received path signal component, we may estimate the noise level, for example, at the time equivalent of 600 to 10 meters in advance of the energy rise. Before the energy rise position is detected, the noise level plus the early side lobe level may be computed in a sliding window of length 50 samples, for example, in this region. The power level may be the mean of the squared magnitude of the samples in this region; or it could be the count or proportion of the samples above a certain threshold. We then observe at 122 a fast energy rise, which can be detected at the right end of the sliding window, in order to locate the start of useful energy in the received signal. The sharper this energy rise, the higher the accuracy of the time of arrival estimation. The energy rise may be determined at 7 to 12 dB above noise level. Above the energy rise 122 and around the first peak 125, we observe the best operating region 124; this is the region where the SINR (Signal to Interference and Noise Ratio) is near maximal, and where interference is caused by subsequent multipath components. The operating region 124 may be determined coarsely, for example by detecting a signal a few dB above the start of the energy rise (i.e., greater than the early side lobes and noise 120). Or it may be determined more accurately (for improved accuracy) by analyzing the power delay profile and/or the shape of the first main lobe. In an embodiment, if the main lobe shape matches closely (or sufficiently) the amplitude and phase (i.e., the shape) of the reference waveform, the system may conclude that the interference is low and the system may determine a high operating region 124 limited to samples near the peak of the first main lobe. Alternatively, if there is no fit to the reference waveform, the system may conclude that there is substantial interference from subsequent multipath components and may determine a low operating point nearer to the energy rise. Finally, at a time after operating region 124, there is a region 126 where we observe the receding side lobes that do not generate interference onto preceding multipath components or the first (direct) path component. Nevertheless, their level helps obtain an idea of the subsequent multipath components and potential interference onto the operating point. Their level is usually better determined by using the original sinc waveform (not the near causal waveform) or a waveform with suppressed right region side lobes (the opposite of the near-causal waveform or a hybrid with both sidelobes from both "sides" being suppressed).

The shape of the filter's impulse response in time domain may be based upon the following characteristics:
(i) a main lobe having a maximal power within the shape, early side lobes located before the main lobe, and late side lobes located after the main lobe;
(ii) the early side lobes have peaks with levels below but designed approximately equal to the noise level of the input signal; (close enough to avoid over filtering, which impacts the sharpness of the rising curve, e.g., say the noise level is −25 dB relative to the signal level; then we can filter the side lobes to some level around −25 dB or −30 dB).
(iii) a ratio of the maximal power of the main lobe to a second maximal power of a tallest of the early side lobes within a desired distance from the main lobe is at least 13 dB; (The desired distance means: less than the expected channel length, optionally adding a small safety margin for unknown operating conditions. Any side lobe appearing at a distance (or equivalent time) earlier than a channel's length would not contribute any measurement error.

(iv) the slope of the main lobe is approximately equal to the slope of the main lobe of the sinc filter's impulse response; (In other words, the left edge slope of the main lobe is as sharp as possible, i.e., with similar sharpness to the sinc filter. Then there is a tradeoff in order to maximize the SINR in the operating region: we trade early side lobe level versus slope sharpness to achieve the best balance, i.e., strongest SINR.)

(v) a width between the main lobe's beginning and the main lobe's peak is larger than a corresponding width of a sinc filter's impulse response between the sinc filter' main lobe's beginning and the sinc filter's main lobe's peak, while being maintained near the corresponding width in the sinc filter's impulse response; for example, the above mentioned width of the main lobe of the filter of the present invention may be larger than the corresponding width of the main lobe of a sinc filter by no more than a predetermined threshold, e.g., 42%; (The main lobe gets fatter as a tradeoff with decreasing the early side lobes. A sinc is very slim but has very bad side lobes. A perfect causal filter has no side lobes but quite fat main lobe. A Hanning filter has good side lobes but too fat main lobe. The desired balance creates the best SINR in the operating region where we wish to estimate the time of arrival. This is because: a) weak side lobes decrease interference from the latest multipath, and b) slim main lobe decreases interference from the nearby adjacent multipath.)

and (vi) in the case where frequency down-sampling is performed at a predetermined frequency, a ratio of the maximal power of the main lobe to a third maximal power of the tallest of the late lobes at a location at which aliasing from down-sampling occurs is at least −30 dB;

(vii) optionally, the time domain response of the filter of the present invention is near flat (e.g., within +/−1 dB) in the early side lobe region. This characteristic is used in order to improve the detection of the energy rise by reducing the false alarms (noisy spikes). When the region is flat, the noise generated by the side lobes tends to be a bit flat. Otherwise, it may have an increasing or decreasing shape, which makes it harder to detect where the first start of signal is (i.e., the energy rise). Such constraint is not used if the noise level is much above the early side lobes level.

Before preceding to the next section, it should be noted that in this document, vectors denoted by capital letters indicate vectors in the frequency domain, while vectors denoted by small letters indicate vectors in the time domain. However, at times, for simpler notation, the same formulas may be used interchangeably in frequency and time domain, and the same notation may be used in both domains.

In any case, frequency and time domain are simply a change of basis with respect to each other. Diagonal matrices in one domain transform into Toeplitz matrices in the other domain. And the element-wise product is a convolution in the other domain.

Waveform, signal and sequence are terms used in this description to indicate a digital, sampled signal, unless otherwise indicated. In some cases, waveform and signal can mean the analog, continuous version of the same signal.

Construction of the Filter Via Constraints or Weights Method

Figure 3A:
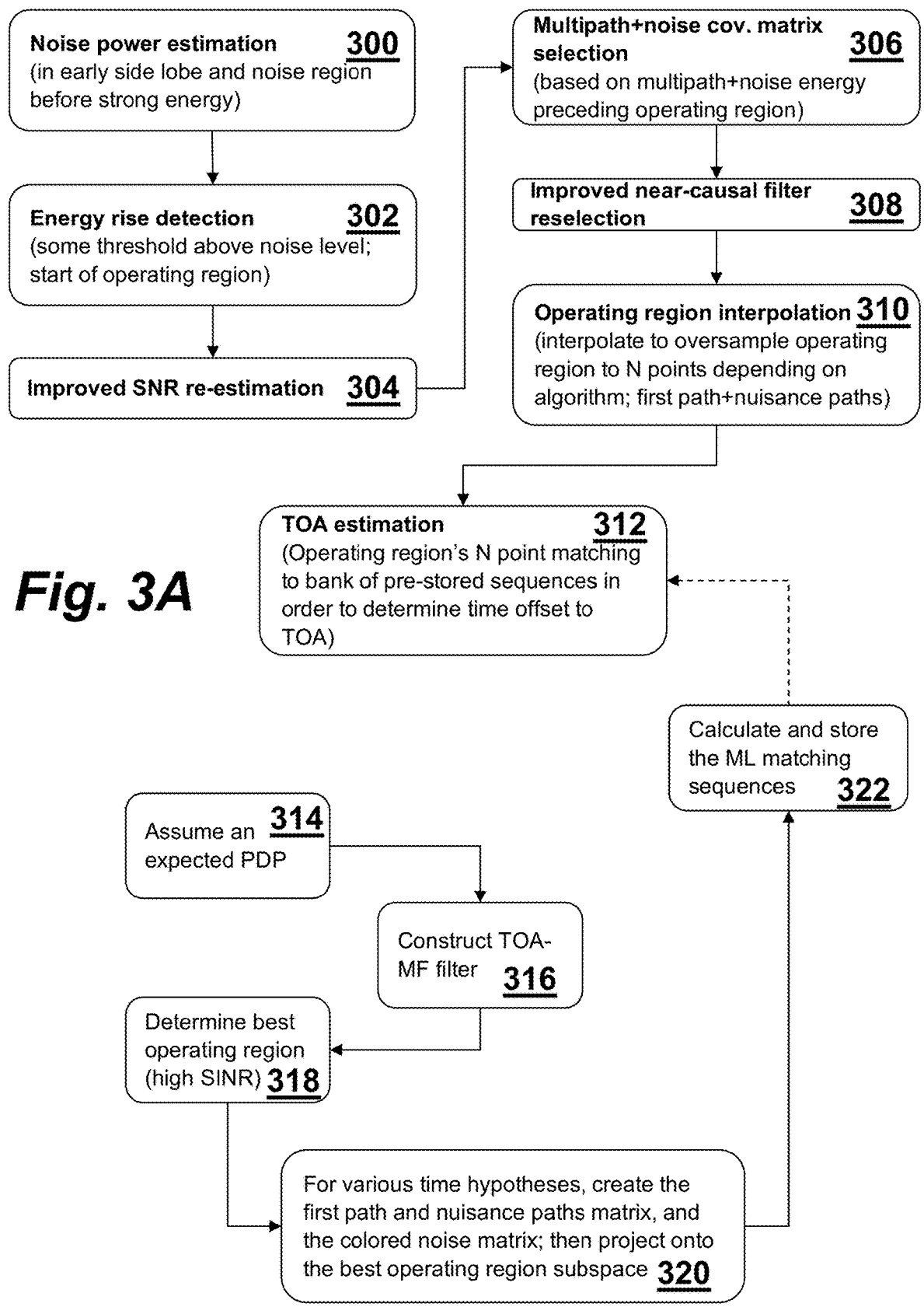
FIG. 3A is a flow chart of time domain processing of a received signal.

It should be noted that while the filter of the present invention can be obtained in a plurality of different methods, the scope of the present invention encompasses the actual filter and the effect that the filter has on an input signal generated by an antenna in response to a plurality of radio wave path components. This method is merely an example and does not limit the scope of the present invention. The term "filter" used in this and subsequent sections is equivalent to the near causal filtering 232 step shown in FIG. 2 as well as the improved near-causal filter reselection 308 as shown in FIG. 3A.

In an embodiment, the filter may be designed using a constraints or weights method.

Vectors are represented in non-italic letters. Matrices in boldface, non-italic. Scalars in italic. Same vectors and matrices can denote either the time or frequency domain representation (depending on the context). The matrix corresponding to the diagonal of a vector, or to its Circulant (or Toeplitz) is denoted by the same letter in boldface (it is diagonal or Circulant based on whether we are in time or frequency domain). When indicated, a time domain vector or matrix is represented by a small letter while the corresponding in the Fourier domain is represented by a capital letter (if not indicated, the same letter represents both domains, depending on context).

Denote the K×N Fourier transform matrix by F, where K is the dimension of the frequency space and N is the dimension of the time space, and with element $F_{k,n}=e^{-j2\pi k n}/\sqrt{N}$ (assuming K≤N, and rows k>K are removed after re-ordering), where n and k are respectively the time and frequency indices. Vectors and matrices in time domain are written in small letters, and the corresponding frequency domain quantities in capital letters. The filter's impulse response in time and frequency domain is $$X=Fx$$

(and $x=F^H X$, valid only if K=N). The filter's desired frequency domain response is a vector G. In a variant, G is the transmitted waveform. In another variant, the components $G_k=1$ for k≤K and $G_k=0$ otherwise. For TOA estimation, the kind of filter impulse response we are interested in, $G_k$ is real (zero phase), or if it has a phase, the phase is of no importance.

One solution for creating near-causal filters is to set time and frequency constraints on the filter's impulse response such as $|x_n|^2 < e_n$ and $|X_k|^2 - |G_k|^2 < \epsilon_k$ for all n and k, where $e_n$ and $\epsilon_k$ are respectively time and frequency domain error functions. For example, in the time domain's non-causal region $e_n \ll 1$, otherwise $e_n$ is relaxed. $\epsilon_k \ll 1$ for all k.

The frequency domain constraints imply that a phase error is unimportant. Additional or alternative weighted least squares constraints are given by $$x^H w x < e' \text{ and } (X-GP)^H V(X-GP) < \epsilon'$$

where w and V are respectively time and frequency domain diagonal weight matrices carefully chosen to achieve a desired impulse response shape. And where in the above equation, G is a diagonal matrix of the transmitted waveform vector G. P is a phase rotation vector (with optional amplitude correction) to be determined since the phase of G is unimportant. In a first non-limiting example, in the time domain's non-causal region a strong weight $w_{n,n} \gg 1$ is chosen, and elsewhere $w_{n,n}$ is relaxed. In another non-limiting example, the non-causal region length (or the length of the early side lobes region) is determined by the length of the channel power delay profile (PDP). The non-causal region length is equal to or a little higher than the channel length to guarantee that no interference is incurred from subsequent multipath components. The non-causal region length can be defined with varying weight level $w_{n,n}$, to take into account that late multipath components tend to be weaker. The length of the early side lobes region could be extended to allow for a region with noise only (i.e., no multipath components and weak side lobes). In that extended region, noise can be estimated relatively precisely. $V_{k,k}$ is approximately constant for all k. P is an arbitrary frequency domain phase rotation vector to be determined for best results. P can also apply some amplitude correction. The parameters e' and $\epsilon$' are small values relative to the values of the elements in matrices w and V, respectively. The parameters e' and $\epsilon$' are tweaked, manually or automatically in some optimization loop to achieve desired impulse response shape, or desired Time of Arrival estimation performance (such as desired cumulative distribution function of the estimation error, obtained for a given channel model).

There are solutions to the constrained quadratic optimization. But a simpler and quicker solution can be obtained by the following unconstrained least squares minimization where weights w and V and phase rotation (with amplitude correction) P are tweaked until a solution is found as follows:

$$\min_{x,P} x^H w x + (X - GP)^H V(X - GP)$$

with a constraint on vector P such as $P^H P = K$ (or $|P_k|=1$ but this is a more difficult constraint and less optimal in general).

We can convert the time domain $x^H w x$ quantity to frequency domain $X^H V X$ (or vice versa, all can be equivalently converted to time domain), where V is non-diagonal Toeplitz or Circulant. Thus equation (1) can be written as $$\min_{X,P} X^H W X + (X - GP)^H V(X - GP)$$

Which can be concatenated into equivalent larger matrices as $$\min_{X,P} (IX - G'P)^H U(IX - G'P)$$

where $$U = \begin{pmatrix} V & 0 \\ 0 & W \end{pmatrix}$$

is the larger weight matrix (concatenating the frequency and time domain weights), $$I = \begin{pmatrix} I \\ I \end{pmatrix}$$

is a matrix with two identity matrices concatenated vertically, and $$G' = \begin{pmatrix} G \\ 0 \end{pmatrix}$$

is a concatenation of diagonal matrix G and the 0 matrix. The constraint being $P^H P = 1$.

By differentiating with respect to unknown vector X, we obtain $$I^H U(IX - G'P) = 0$$

and that leads to $$X = (V + W)^{-1}[VW]G'P \equiv AP$$

Replacing X by AP in the minimization formula, we get $$\min_P P^H (IA - G')^H U(IA - G')P$$

Defining the new weight matrix $U' = (IA - G')^H U(IA - G')$ gives $$\min_P P^H U' P$$

And given the constraint $P^H P = 1$ therefore the solution is $$P = \text{WEV}(U')$$

$$X = AP$$

where WEV(U') is the Weakest Eigen Vector of matrix U'.

Optionally, the elements (modulus) of P can be collapsed to a constant value, such as 1, to suppress the oscillations of the power vs. frequency graph, so as to convert the graph to a square waveform. In a variant, after collapsing the modulus of P, an additional phase search is performed for a refined value near the collapsed modulus, e.g., via gradient descent or any other optimization method to find a local minimum of $P^H U' P$.

In some cases, the inventors have observed that the time domain weight should not be symmetrical to achieve convergence. An example was generated for a Long-Term Evolution (LTE) 10 MHz signal (K=601 subcarriers, N=1024 samples) with weights given in the Table I, case of high signal-to-noise ratio (SNR).

TABLE 1

| Time domain | $w_{n,n}$ | Frequency domain | $V_{k,k}$ |
|---|---|---|---|
| n = 0 | 0.01 | 0 ≤ k < K | 1 |
| N − 160 ≤ n ≤ N − 4 | 30 | K ≤ k < N | 0 |
| Elsewhere | 1 | | |

Maximizing SINR with Multipath Treated Like Colored Noise in Time Domain (Time of Arrival Matched Filter (TOA-MF))

In an embodiment, a near-casual filter, such the filter used for near-causal filtering 232 or improved near-causal filtering reselection 308, may be designed such that SINR is maximized and such that multipath is treated like colored noise in the time domain. This filter design is termed a Time of Arrival Matched Filter (TOA-MF).

In the frequency domain, the transmitted waveform, before multipath and noise effects are introduced, is denoted by vector G. The noise covariance matrix V is an identity matrix if the noise is white (non-colored). The impulse response of a conventional matched filter (MF) maximizes the SINR assuming a uniquely received path signal component. It treats all multipath components equally and is well suited for maximizing the energy captured by all of the multipath components, for example, for data decoding (by using a subsequent multipath combining stage). But it is not best suited for extracting the first path signal component (or some path signal component) from the rest of the multipath components.

Thus, the filter of the present invention, which is aimed at simplifying the identification of the first path signal component, is designed such that all the path components except the first path component are considered colored noise, or colored interference in time domain. Note that multipath components are normally statistically independent. In fact, the multipath components appear like normal noise, often Gaussian, convolved with the transmitted waveform G, which can often be all ones in the frequency domain's passband. I.e., there is often no distinction between normal noise and multipath components except for their power levels. The model for the construction of the filter of the present invention is essentially that the noise plus interference power levels in time domain suddenly increase after the first path component arrives.

The noise coloring can now be represented by the noise plus multipath colored covariance matrix $$C = V + \sum_{i>1} w_i P_i G G^H P_i^H$$

where $w_i$ is the expected power level of path component i (excluding the first path component in this summation), $P_i$ the diagonal matrix phase ramp in frequency domain, or time shift in time domain, to shift path component i by its time offset $t_i$. By oversampling the time domain, limiting the multipath components positions to oversampled time offsets, and setting $w_i$ to zero where we don't expect any multipath components, the noise plus multipath colored covariance matrix can be simplified to $$C = V + \Gamma W \Gamma^H$$

Where, in frequency domain, $\Gamma$ is the diagonal matrix of vector G, and W is the Fourier transform of the diagonal matrix of time domain weights (or power levels) $w_i$. W is Toeplitz or Circulant and can be efficiently computed via one fast Fourier transform (FFT) followed by index shifts per row.

In an embodiment, the filter X is obtained by maximizing the output SINR of the first path component over the colored noise and multipath components, $$\max SINR = \frac{X^H G G^H X}{X^H C X}$$

and the solution is $X = C^{-1} G = (V + \Gamma W \Gamma^H)^{-1} G$. If X is applied as a filter (i.e., convolution) to the received signal, then the maximum SINR is reached at the best sampling time, which is usually time 0. Note that using the formula above without maximization, the SINR can be obtained for any given filter X and at any sampling time t by shifting the vector X to that sampling time.

After defining the expected Power Delay Profile (PDP) of the channel (i.e., the multipath profile), X can be easily designed. Multiplying element-wise the conjugate of X by the transmitted waveform G, the reference waveform is obtained at the receiver side. I.e., it is the waveform received in the absence of noise and multipath, i.e., the convolution $X^H G$ where matrix X is the diagonal or Circulant matrix of vector X. The output of the correlation as a function of time is the squared amplitude of the waveform $X^H G$ as function of time.

It can be shown that the effective SINR on each point of the reference waveform (for the first path component) is a function of noise and multipath, and is maximized at the best operating point, which is a point typically before the peak of the reference waveform, if there is a nearby second path component. The best operating point (operating region) is a tradeoff between being as high as possible above noise, but as early as possible to be far from subsequent multipath components. While conventional Matched Filter maximizes SNR in the absence of multipath, it fails to maximize SINR in their presence. The filter of the present invention is able to maximize SINR in the presence of multipath. Determining the position of the best operating point and estimating the time of arrival is described later in this document.

Figure 14:
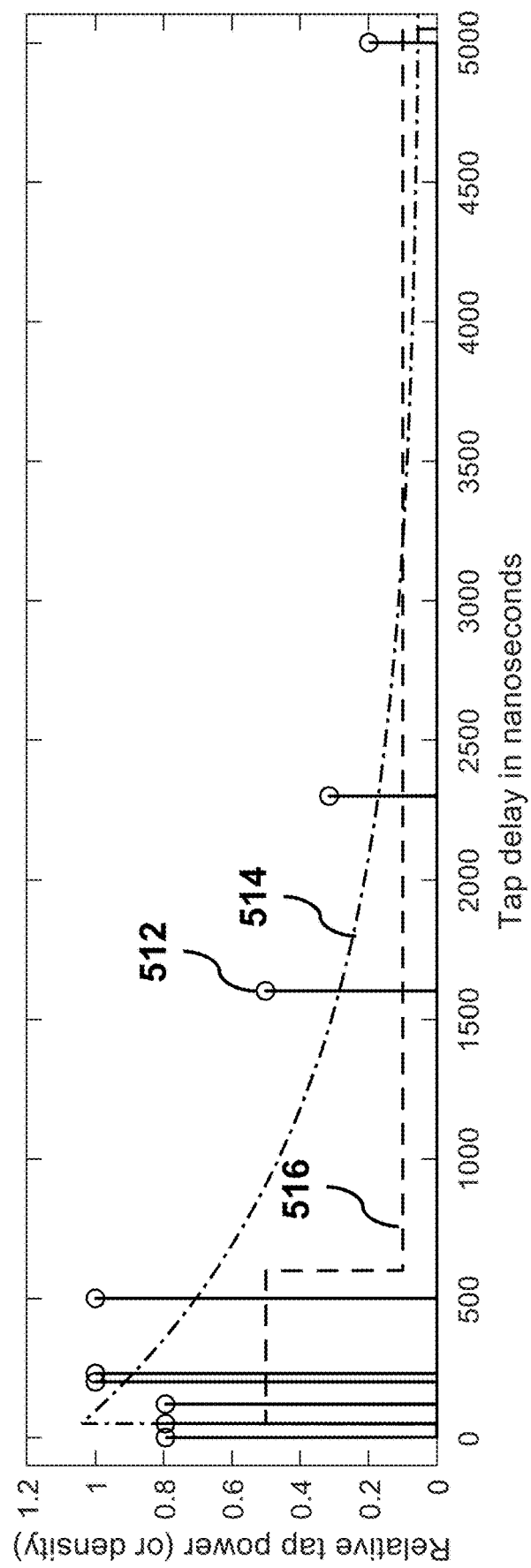
FIG. 14 is a graph showing how we can adjust an 3GPP LTE defined PDP into a more or less dense PDP that better reflects the real-world PDP, which does not have discrete multipath at fixed positions.

An example of defining the channel's PDP profile for constructing the filter is given in FIG. 14. In this example, we start from a reference LTE ETU channel with known taps 512 (multipath including the first path component) at relative delays in nanoseconds of 0, 50, 120, 200, 230, 500, 1600, 2300, 5000 respectively, and with relative received power in dB of −1.0, −1.0, −1.0, 0.0, 0.0, 0.0, −3.0, −5.0, −7.0 respectively. The total SNR is the total received power from all multipath divided by noise power. This SNR is useful for "data communication" as all multipath contribute useful energy in this case. However, for "TOA estimation", the useful energy is mainly concentrated in the first path component (or the first cluster of few path components, depending on whether an application can afford some reduced accuracy). The total length of the channel in the example of ETU is 5000 ns. The PDP that we use to construct the filter is usually not the reference ETU channel as it uses discrete taps at discrete prefixed locations, which can result in a filter well adapted to ETU but not to real-world channels where the taps can be located anywhere. Instead, we smooth the ETU PDP to morph the discrete taps into a more or less dense PDP, for instance, as shown in 514 (exponentially decaying) or 516 (flat density per-section); while maintaining approximately the same energy, per PDP section, for the dense multipath as for the discrete multipath. The relative PDP power and noise power, the density, the length are dependent on the statistics of the real world channel. They may optionally be adjusted such that the constructed filter has early sidelobes no stronger than a certain level, or such that simulations with varying positions of taps show good results.

Once the PDP is defined, it can be inserted as the diagonal of matrix W.

Note that the first path component and some region or margin between the first path component and the start of the interfering PDP can be set to 0 and ignored in the weight matrix W. As the first path component is also the reference path component G, including it in the matrix W does not alter the filter (except for some unimportant scaling value. This is also true for weights of path component very near the first path component.

If M−1 nuisance path components are to be jointly estimated with the first path component, then the margin region following the first path component can increase in length to cover the region of nuisance multipath since the nuisance multipath in this margin region are excluded from the colored noise covariance matrix; and consequently, they may be excluded from the weight matrix W.

Near-Causal Filters with Flat Response in the Early Side Lobes Region (Constrained TOA Matched Filter)

In an embodiment, a near-casual filter, such the filter used for near-causal filtering 232 or improved near-causal filtering reselection 308, may be designed to create a flat response in the early side lobes region. This filter design is termed a Constrained TOA Matched Filter.

Figure 4:
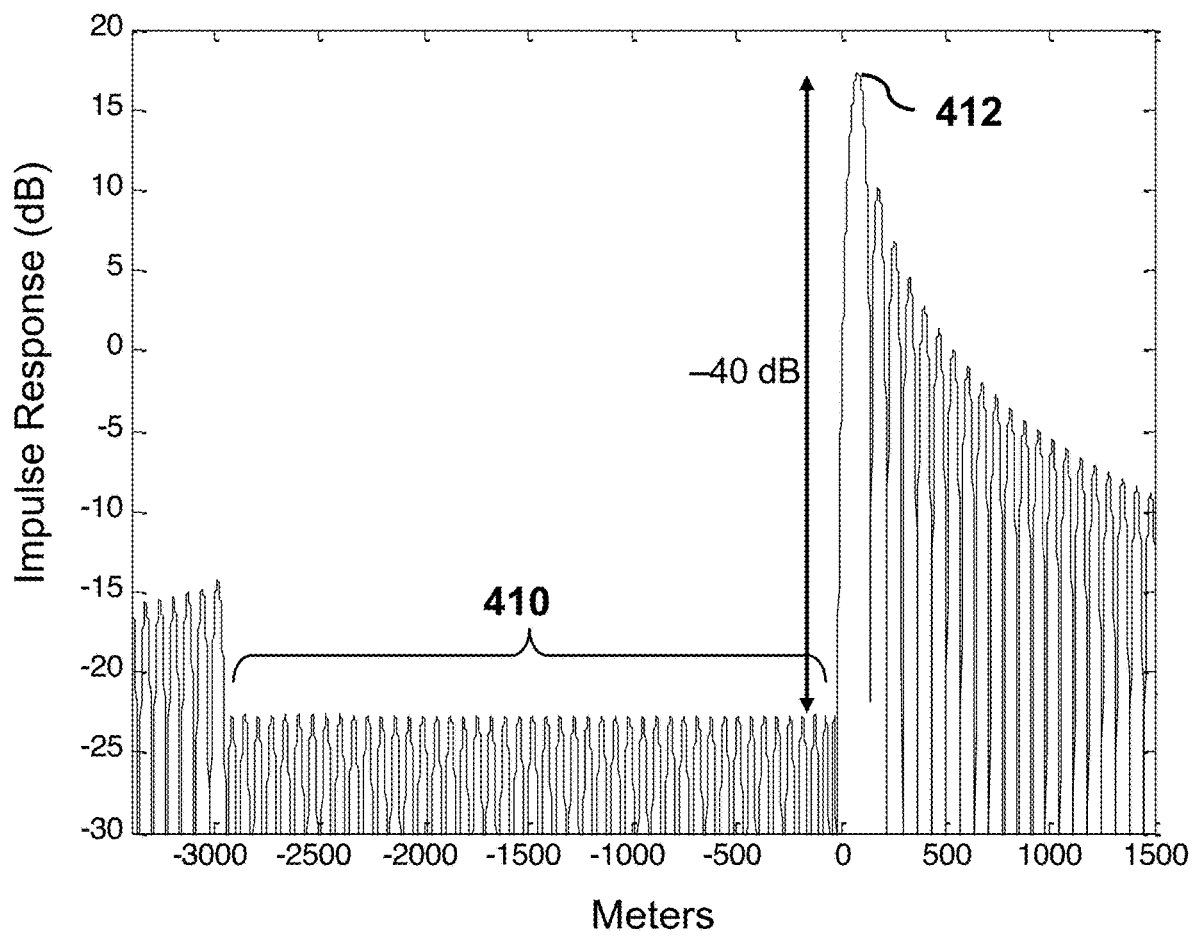
FIG. 4 is a graph of an impulse response of a near-causal filter in time domain (where time is represented as equivalent distance) with flat response in the early side lobes region (side lobes occurring before the main lobe).

Referring to FIG. 4, the impulse response of a near-causal filter is illustrated in time domain with flat response in the early side lobes region 410 (side lobes occurring before the main lobe). The example is given for LTE's 5 MHz system with flat side lobe region of −40 dB below the peak 412 of the main lobe. The flat early side lobe region in this example extends to about 3 km (10 µs) prior to the main lobe, i.e., we expect substantial multipath to appear not beyond 3 km from the first path component (main lobe).

Figure 5:
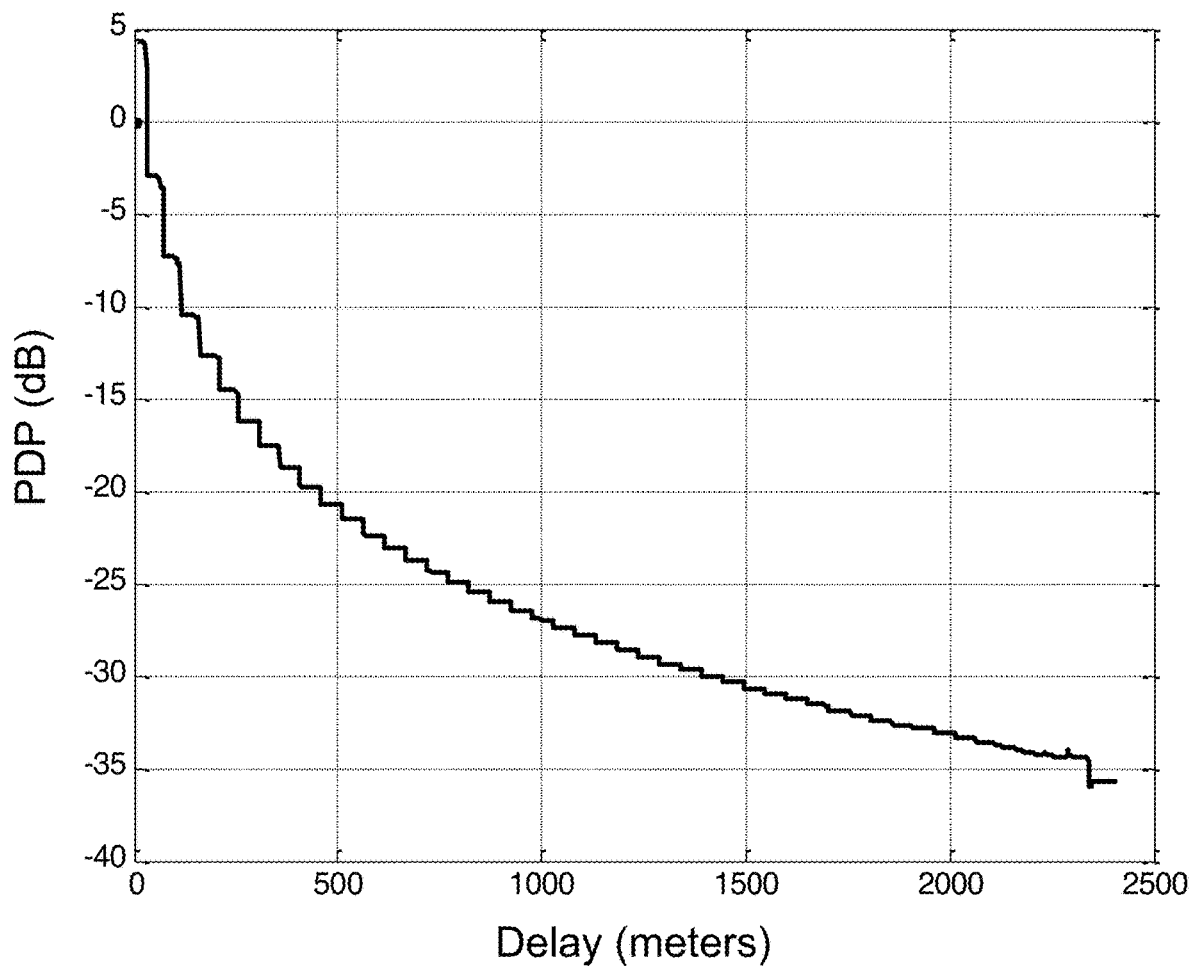
FIG. 5 is a PDP (power delay profile) that generates the impulse response shown in FIG. 4.

The expected resulting PDP (power delay profile) that generates the impulse response of FIG. 4 can be computed (cf. below) and is given in FIG. 5, with total signal plus multipath SNR of 20 dB (it would be of lower SNR if the flat early side lobe region has less than 40 dB rejection). The PDP is approximately exponentially decreasing, which is consistent to some extent with real-life PDP. Some tradeoff between flat early side lobe region and more real-life-like PDP can be envisaged too (i.e., less flat region).

The advantage of designing a flat early side lobe region is that it permits a better estimation of noise power and it also reduces the probability of a noise spike (created by noise and/or early side lobes) getting confused for a true first path component; i.e., we reduce false alarm probability in the early side lobes region.

Note that the flat region may actually be non-horizontal (e.g., decreasing or increasing slope) if all side lobes are already weaker than the desired level. Either this level is acceptable or one could further tighten the level to enforce a flat region, if needed (at the cost of a wider main lobe, i.e., less sharp rising edge).

There are various solutions for creating the filter in FIG. 4, such as the method of Constrained TOA-MF described below.

In a variant of the method for estimating a time of arrival of a signal, the following instructions are repeated for a few iterations until result is satisfactory, i.e., until the side lobes preceding the main lobe exhibit a flat response with desired power level below the main lobe's peak (usually very few iterations, e.g., 5 iterations suffice).

Compute a TOA-MF filter (described previously; or using any equivalent method) for some initial multipath Power Delay Profile (PDP). The initial Power Delay Profile can be assumed flat or as desired in the region of interest (e.g., in a region extending over 3 km for a cellular system, or 200 m for a WiFi system).

After a first near-casual filter is obtained (with non-flat early side-lobe region), find the peaks of the side lobes in the region preceding the main lobe, and in any other region where we wish to produce flat low level side lobes.

If one or more side lobe peaks are above the maximum allowed level, or for all side lobes, find the corresponding point or area in the PDP section (mirror point around the main lobe). There is in general an interfering path component in the PDP that corresponds to each given side lobe, i.e., the side lobe of the interfering path component falls onto the main lobe and hence impacts the SINR of the TOA-MF. Locate all path components corresponding to the (offending) side lobes in the mirror region.

Increase or decrease these path components' power value (in the PDP) in order to respectively decrease or increase the corresponding mirror side lobe level. One solution that works well (but many variants can be derived): at iteration n, assign to the PDP in a small subsection corresponding to a side lobe the following value, function of previous iteration n−1:

$$PDP_n(S) = PDP_{n-1}(S) \frac{P_{SL,n-1}(S_M)}{P_{ML} P_{level}}$$

Where S is a subsection of PDP, and its corresponding mirror subsection of side lobe(s) $S_M$ (mirror around the main lobe). The subsections $S_M$ may change at each iteration, and they may be formed by connecting the peaks of the side lobes (or any similar scheme). $PDP_n(S)$ is the power level in the PDP subsection at iteration n, and $P_{SL,n}(S_M)$ is the side lobe power level in the mirror subsection, at iteration n. $P_{ML}$ denotes the main lobe's power or peak power, and $P_{level}$ denotes the desired relative power level of the side lobes; relative to the main lobe (e.g., $P_{level}=10^{-4}$ for a relative level of −40 dB with respect to the peak of main lobe).

The above operation is repeated a few times until results are satisfactory, i.e., until mainly flat early side lobes are in the desired region, with their peaks below the desired level. The final $PDP_n(S)$ is an expected resulting PDP that generates the desired filter with flat response in the early side lobes region. It does not correspond to a true PDP but may approximate a true PDP since it is exponentially decreasing.

Flat Early and/or Late Side (Dual Constrained TOA MF)

In an embodiment, a near-casual filter, such the filter used for near-causal filtering 232 or improved near-causal filtering reselection 308, may be designed to create a flat response in either the late side lobes region or in both early and late side lobe region. This filter design is termed a Dual Constrained TOA Matched Filter.

The flat early side lobes help in determining noise level and detecting the signal energy rise while minimizing confusion with early side lobes.

But it can be useful to also have flat late side lobes, which can reduce the confusion with multipath component late side lobes, and hence could improve estimating the Power Delay Profile (PDP) or noise covariance matrix. Although a regular sinc filter is often sufficient for such estimation. Nevertheless, if desired, late flat side lobes can be created in a very similar manner to early flat side lobes by using the mirror problem and increasing the power of "virtual early multipath" before the main lobe. Furthermore, we can create simultaneously early and late flat side lobes by iteratively calling each function, for early side lobes, then for late side lobes, then repeating the operation with the constraint specified as above, until we reach the desired final constraints with flat side lobes on both sides (early and late). In an embodiment, the filter may be designed to have different side lobe levels on each side (e.g., −30 dB on the early side, and −20 dB on the late side).

Natural IIR Response of RF and Baseband Filters

Figure 11:
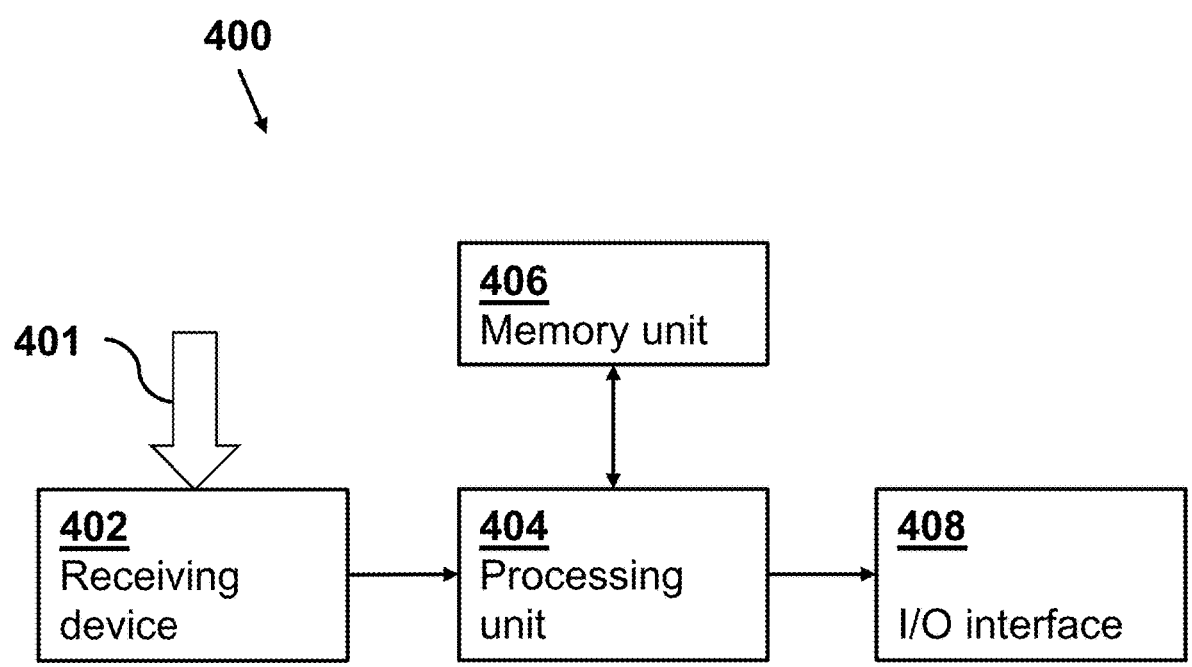
FIG. 11 is a block diagram illustrating a computerized processing system configured for estimating TOA, according to some embodiments of the present invention.
Figure 12:
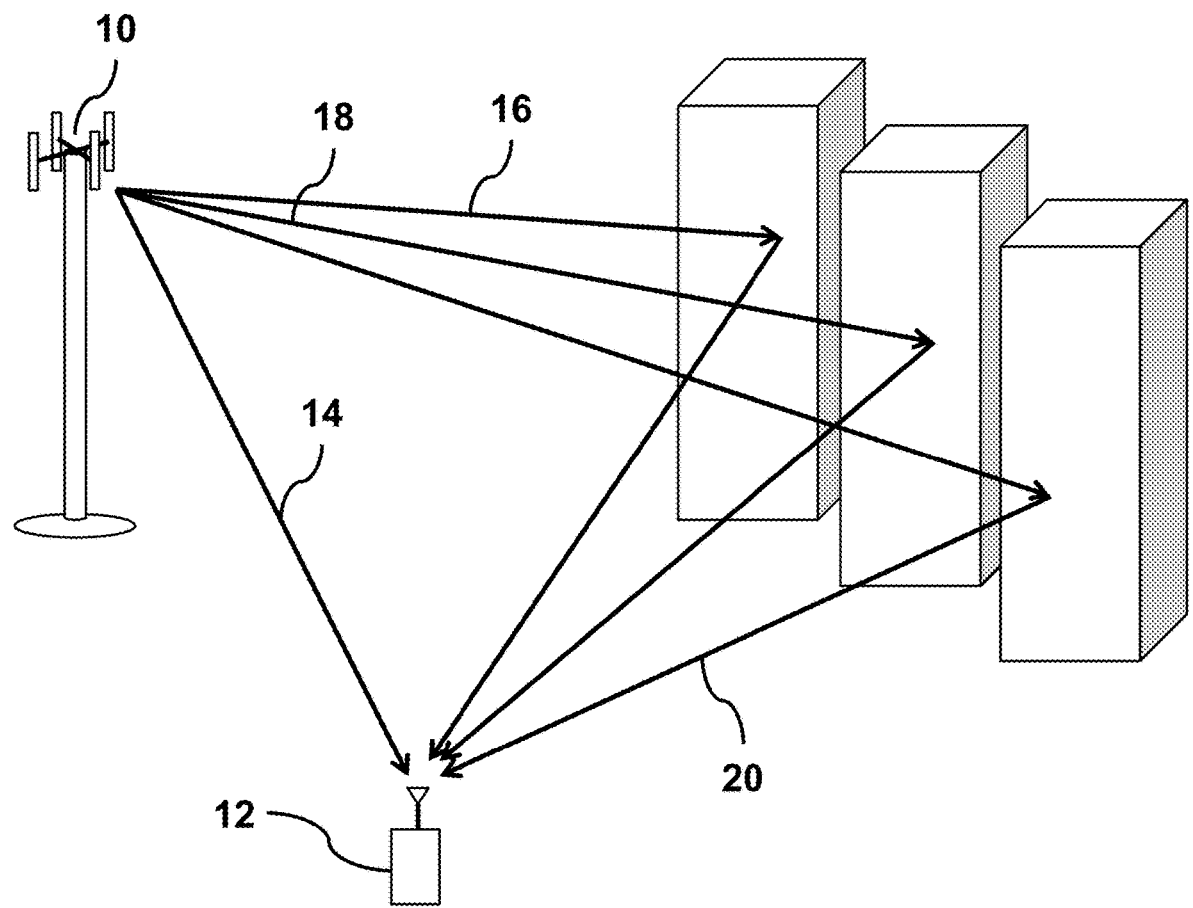
FIG. 12 is a schematic drawing illustrating different paths taken by a radio wave traveling from an antenna to a receiver.
Figure 13:
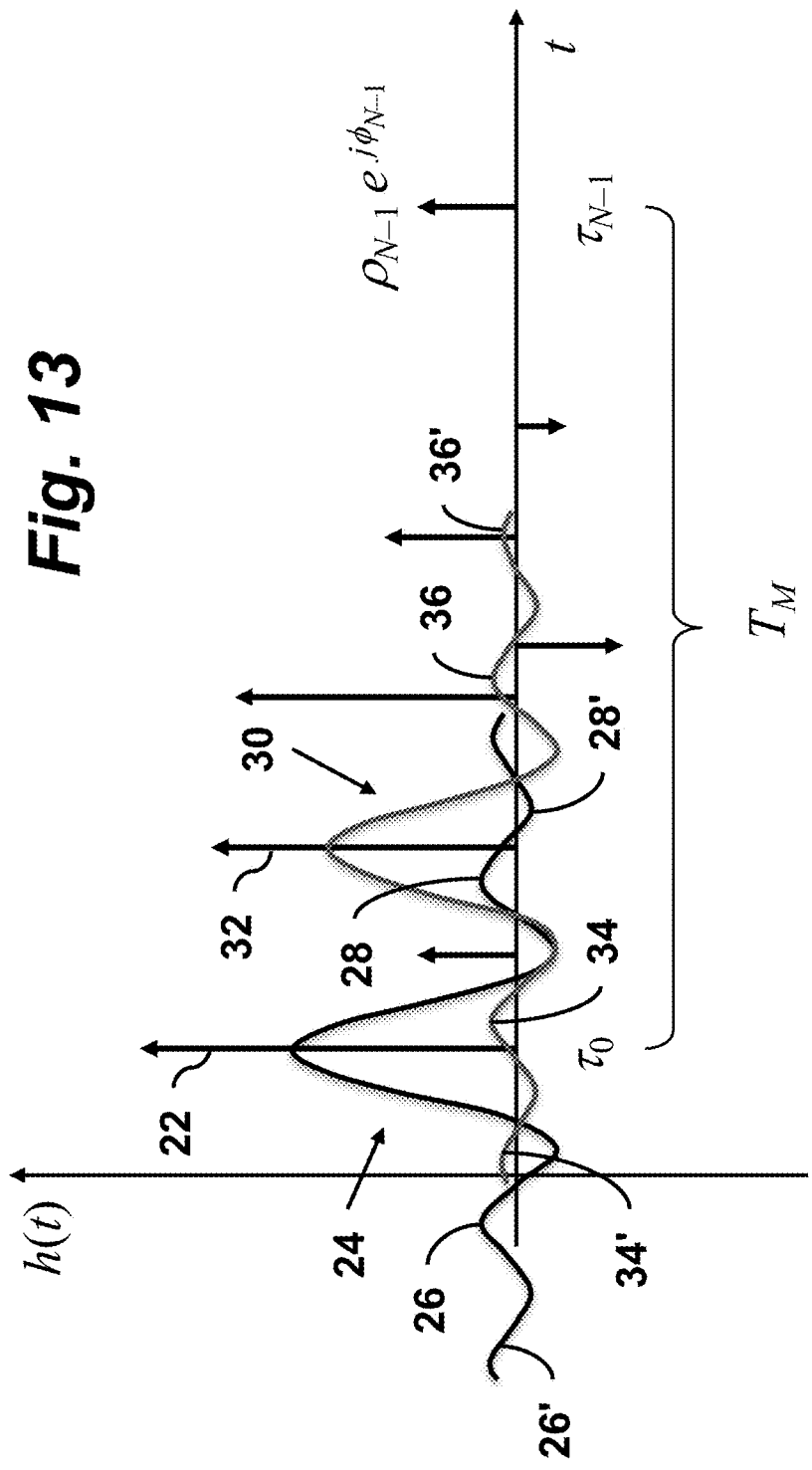
FIG. 13 is a graph showing the impulse responses of a plurality of single pulses (taps), the impulse responses being obtained by bandwidth filtering each pulse via a sinc filter known in the prior art.

Yet another method for generating near-causal filters is to use the natural minimum phase IIR response of analog filters in the Radio Frequency (RF) chain or in the front end of a baseband chain (BB) in, for example, receiving device 402 as shown in FIG. 11. Rather than compensating the phase of such filters to become zero or linear phase, as is typically done, we can leave them naturally as minimum phase IIR filters and take advantage of such response for time of arrival estimation. If necessary, the natural response can be corrected to achieve some desired near-causal response, by either reducing or increasing the early side lobes to bring them approximately to noise level, or in order to approximate a desired TOA-MF response, e.g., depending on the expected or measured PDP and SNR, or to create a flat early side lobe region, etc. The correction can be performed digitally either in frequency domain, or by convolving with a short FIR or with an IIR correction filter in time domain. The compensation filter can be designed by finding a good TOA-MF filter X as presented earlier, and then dividing, in frequency domain, by the pre-applied existing IIR response of the analog filter; such that the product of the two filters, analog and compensation filters, in frequency domain is the desired final filter X. At very low SNR, the response should normally be approximately zero phase or linear phase.

Time of Arrival Estimation

The TOA-MF or near-causal filters designed in this document reduce or nearly cancel interference from subsequent multipath components. And in doing so, they create a mainly noise only section followed by signal energy rise. In an embodiment, a system to estimate the time of arrival may be based in part on the detection of the signal energy rise (e.g., energy rise 122 in FIG. 1 as determined by energy rise detection 302 in FIG. 3A) as the first (few) sample(s) above a threshold (i.e., some number of dB above the measured noise level). The rising curve immediately following the noise section consists mainly of the first path component and some noise and multipath interference. It is along this rising curve where the best operating point can be found.

Several other methods may be used to determine energy rise 122, including:

1-point estimation (the first sample above noise, or the first peak above noise (positive then negative slope), or the first change in secondary derivative, or some sample in-between provide an estimate of the time of arrival (with the average offset from the point to the time of arrival determined theoretically or experimentally), 2-point estimation using observed logarithmic slope matched against the reference logarithmic (described in more detail in a later section), 2 or more points matching between received signal and reference waveform (described later as MAP or ML solutions for time of arrival estimation). A number of (oversampled) points starting from the signal energy rise detection and beyond are matched against a reference waveform, in an optimal manner according to MAP or ML, with 1 or more path component estimation and with predetermined noise and multipath covariance matrix, which leads to the time of arrival estimation (when the matching is maximal.

Other possible methods can be devised to estimate the time of arrival after the signal is filtered with near-causal filters.

Maximum A Posteriori (MAP) and Maximum Likelihood (ML) Methods

In this section, we provide near optimal time of arrival estimation method according to the MAP or ML criterion by considering some of the multipath components in the MAP decision as useful or nuisance signal to be estimated, and treating the remaining multipath components as colored noise, not to be estimated. For example, $1^{st}$ path component can be considered useful signal, 2nd and 3rd path components can be considered nuisance signals; and beyond these first few path components, the remaining multipath components are considered colored noise, not to be estimated but to be taken into account. Essentially, we split the multipath into 3 groups: a) the first path component, b) the nuisance multipath that succeed the first path component, c) the remaining multipath that typically succeed the nuisance multipath. The group of remaining multipath is assigned to the colored noise covariance matrix; while the group of nuisance multipath is estimated and resolved jointly with the first path component.

The number of path components that are defined or assumed as useful or nuisance signals for the purpose of carrying out the above method, may be determined by the processing power available on the receiver, SNR level (actual or anticipated), the expected density of multipath in the PDP, and the desired accuracy and robustness.

The complexity of MAP (or ML) is reduced exponentially since we can process M path component(s) in the MAP maximization rather than processing all of the possibly received path signal components. If M is sufficiently large, or if the ignored multipath components are far enough from the first few path components, there is no significant loss with respect to full MAP that attempts to jointly estimate all multipath components; the reason is that the farther multipath components that we treat as colored noise in our method do not substantially impact the first path component.

We can show that for the case where we consider only the first path component in the MAP or ML criterion, and assume all remaining multipath components as colored noise, this method is equivalent to the previously presented method of TOA-MF filtering with maximal SINR in a small region, the best operating point where the first path component parameters (time of arrival and complex amplitude) should be estimated. Recall that the TOA-MF filter is given by $X=C^{-1}G$ and serves to whiten the noise and multipath components before measuring the distance to the reference sequence, which is the solution given by the MAP or ML criterion.

The method is described below. For a few first path components (or M-paths) that we wish to jointly estimate, we define the received signal model by $$Y = G_t A + N$$

We define a (usually periodic and long enough; but not necessarily) time domain space and its corresponding sampled frequency domain space. G is the transmitted reference sequence (vector) and $G_t$ a horizontal concatenation of (circular) time shifted (i.e., delayed) reference sequences corresponding to multipath components. The time shifts are denoted by the set $t=\{t_2, t_3, \ldots\}$ indexed by multipath indices 1, 2, 3 . . . . Components of vector $A=[a_1 \ldots a_M]^T$ are the complex signal amplitudes that we consider for the ML or MAP estimator. Component $a_1$ corresponds to the direct path signal component of interest, while components $a_2, \ldots a_M$ correspond to the undesirable multipath signal components. Remaining ignored multipath signal components starting from M+1 ..., are considered as interference or colored noise (the value of M can vary during successive or iterative processing). In this model, we have applied the time shifts to the reference signal $G_t$ rather than to the received signal Y (as is often done in satellite navigational systems). But either solution works although as we shall see later, applying the time shifts to the reference signal has many advantages (no resampling or recapturing of the received signal, pre-calculated and stored reference sequences to save power; moreover, for ML or MAP multiple path resolution it is far more convenient to apply the time shifts to the reference sequences).

N is the noise vector and Y is the received vector. The covariance matrix of the noise is C and, critically, it includes the remaining multipath components starting from index M+1. Recall the previous section on how to include the remaining M+1 and beyond multipath components, in the noise covariance matrix; we obtain $$C = V + \sum_{i>M} w_i P_i G G^H P_i^H$$

Using the notation of this section, we could also write $$C = V + \sum_{i>M} w_i G_i G_i^H = V + G_t W G_t^H$$

where index i denotes some time shift $t_i \in \bar{t}$ of the transmitted reference waveform G, $\bar{t}$ the set of interfering multipath components for i>M, $G_t$ the matrix of horizontally concatenated interfering multipath vectors $G_i$, and W the diagonal matrix of the PDP (power values) of the interfering multipath components. The noise covariance matrix C is not time invariant and the resulting problem is not time invariant. An anchor in time domain for matrix C can be the first detected signal energy sample (ahead of all received multipath components). Other anchors can be obtained; e.g., by fitting C to the received signal minus the first (few) path component(s). Moreover, C could vary if we include more or less multipath components as nuisance signal, i.e., increasing or decreasing M. After an initial guess of the first M path components, we can increase M to search for more path components and hence increase the estimation precision of all of the first M path components. When we increase M, we automatically decrease the multipath components embedded in C, i.e., decreasing noise interference (which can also be approximately achieved by shifting the position of C away from the first M path components, without modifying C).

Note that shifting the position of C can alternatively be performed by shifting the position of input signal Y in the opposite direction, or equivalently, the reference signals $G_t$; i.e., the reference signals $G_t$ can be checked at the positions in the set t but also at the shifted position set t+δ. Note that as we shift in time far from the multipath component, the desired response starts to resemble G (e.g., a sinc response for a flat G in frequency domain). But as we shift in time nearer to multipath component, the desired filter response starts to be more causal-like, and the overall response, including the whitening (and weighting), diverges from the shape of G.

The following Cholesky decomposition is considered for noise whitening: $C^{-1}=L^H L$ such that $$LY=LG_t A+LN$$

has white noise. We denote a noise whitened quantity by a bar, i.e., $$\bar{Y}=\bar{G}_t A+\bar{N}$$

We can also apply a convenient (invertible) pre-filter X to the received signal (e.g., X could be a near-causal filter generated using an approximate or typical noise and multipath interference model), such as $$Y'=XY=XG_t A+XN=G'_t A+N'$$

where matrix X is the diagonal or Circulant matrix of filter vector X (diagonal in frequency domain, Circulant in time domain). The prime superscript denotes pre-filtering with X.

Noise whitening should be applied after pre-filtering with X, and we can write $$\bar{Y}'=\bar{G}'_t A+\bar{N}'=L'XY=L'XG_t A+L'XN$$

The noise covariance matrix in the pre-filtered version is $$C'=XCX^H$$

And the Cholesky decomposition of the inverse of this matrix is $$C'^{-1}=L'^H L'=X^{-H}L^H LX^{-1}$$

The MAP estimator without pre-filtering, where we make a hypothesis on M multipath components being at time positions given in the (to be determined) set $t=\{t_1, t_2, \ldots, t_M\}$, and where $t_1$ is the most interesting parameter to estimate (i.e., Time of Arrival), and where the various possible sets t enable oversampling the time domain for higher TOA estimation precision (without necessarily oversampling input signal Y); and by denoting by $G_t$ the matrix of concatenated vectors G with (circular) time shifts (or offsets) $t_i$, we can write the MAP (or log of MAP) as $$\min_{A,t}(Y-G_t A)^H C^{-1}(Y-G_t A) + \log\det C - \sum \log Pr\, a_i - \sum \log Pr\, t_i$$

Typically, the distribution probabilities of $t_i$ is constant and can be ignored. Otherwise, it can be included. The distribution of $a_i$ can be taken into account if it is not uniform; if the distribution is approximately uniform above noise level, then we should have $|a_i|>\rho\sigma^2$ (with $\rho \gg 1$, such that $a_i$ is much above noise level, $\sigma^2$), and reject solutions that do not verify this condition; if the distribution is complex Gaussian with variance $\sigma_{ai}^2$ for parameter $a_i$ ($\sigma_{ai}^2$ can be a function of $t_i$); in this case, $$-\Sigma \log Pr a_i = A^H \Sigma_A^{-1} A$$

where $\Sigma_A$ is the diagonal matrix of $\sigma_{ai}^2$.

log det C is a known value for each value of C, which is function of M as well as of noise power, for example. In many cases this term can be ignored, though.

Assuming and ignoring constant log det C, Pr $a_i$, Pr $t_i$, then the solution for A for the hypothesis t is $$\hat{A}_t=(G_t^H C^{-1} G_t)^{-1} G_t^H C^{-1} Y$$

And then the MAP simplifies to ML as $$\max_t Y^H C^{-1} G_t (G_t^H C^{-1} G_t)^{-1} G_t^H C^{-1} Y - Y^H C^{-1} Y$$

Applying pre-filter X and noise whitening L', we can write $$\max_t \overline{Y}'^H \overline{G}'_t (\overline{G}'^H_t \overline{G}'_t)^{-1} \overline{G}'^H_t \overline{Y}' - \overline{Y}'^H \overline{Y}'$$

We can then Cholesky decompose $(\overline{G}_t^H \overline{G}_t)^{-1} = (G_t^H C^{-1} G_t)^{-1} = \Gamma_t \Gamma_t^H$, of dimension M and obtain $$\max_t \|\Gamma_t^H \overline{G}'^H_t \overline{Y}'\|^2 - \|\overline{Y}'\|^2 \text{ or } \max_t \|\Gamma_t^H \overline{G}'^H_t L' Y'\|^2 - \|\overline{Y}'\|^2$$

to avoid the costly operation of pre-whitening input signal Y. The last formula could also be written, without any pre-whitening, but only with pre-filtering with X, to substantially reduce implementation cost, as:

$$\max_t \|\Gamma_t^H G'^H_t C'^{-1} Y'\|^2 - \|\overline{Y}'\|^2$$

Note that $(\overline{G}_t^H \overline{G}_t)^{-1} = (\overline{G}'^H_t \overline{G}'_t)^{-1} = \Gamma_t \Gamma_t^H = \Gamma'_t \Gamma'^H_t$, i.e., $\Gamma_t = \Gamma'_t$ (whether we pre-filter with X or not). The term $\|\overline{Y}'\|^2$ is constant and can be ignored if, and only if, the same received samples are used for computing the MAP or ML metric. It should be taken into account if we displace (a bit) the window of observation of Y. More on this topic later.

The search for the maximum can be done in binary fashion or any other method over the possible values and combinations of time positions $t_i \in t$; we do not need to test all combinations of time positions $t_i \in t$. When more than one path component is being tested (e.g., first and second path components), a first coarse position for first path component can be obtained (possibly via one path component search alone). Then a coarse position for 2nd path component is obtained. And so on. Finally, fine tuning around each position is performed, e.g., via binary search or grid search.

After replacing $A_t$ by its estimated value $\hat{A}_t$, we observe that the maximization is done in the subspace generated by the sequences in $G_t$ assuming everything in this subspace can be signal. The reason is that the ML has no way for distinguishing between signal and noise, and hence, it assumes everything in the subspace of $G_t$ can be signal (no a priori information on $a_i$). The goal is then to maximize the projection onto this signal after removing the two kinds of correlations: noise whitening, $C^{-1}$, and M-paths decorrelation, $\Gamma_t$.

We define the matrices $g_t = C^{-1} G_t \Gamma_t$ and $x_t = C'^{-1} G'_t \Gamma_t = X^{-H} g_t$. They are the MAP or ML correlator sequences in time or frequency domain, respectively, for non-filtered version and pre-filtered with X version. Each matrix such as $x_t$ contains one or more column vectors (one column vector per path component we are trying to estimate; first path component plus nuisance path components). There are several matrices $x_t$ that we precalculate and prestore, for example. Each matrix corresponds to a set $t = \{t_1, t_2, \ldots\}$. It is a first, second, and more path component hypothesis t to try and check if it has the best match by correlating or multiplying with the corresponding matrix $x_t$. We can then write $$\max_t \|x_t^H Y'\|^2 - \|\overline{Y}'\|^2$$

The sequences $g_t$, $x_t$ are time variant since C is time variant, except for the special case of the traditional Matched Filter where C is time invariant, e.g., after noise and multipath whitening. In this special case, $g_t$ is time invariant and the dot-product $g_t^H Y$ or $x_t^H Y'$ can be written as a convolution with the Matched Filter (unique but shifting ML sequence): the peak of the output of the convolution maximizes the dot-product. The solution is straightforward. However, the multipath whitening operation is itself time variant and costly.

When the MAP or ML sequences are time variant (by avoiding the cost of the noise and multipath whitening), we cannot model the solution by a unique sequence convolution; essentially the sequences change as we shift in time but the problem is similar: the sequence and shift that produce the maximum dot-product is selected for the time of arrival position.

Paths' Complex Amplitude $a_i$

For each hypothesis on time, i.e., t, we can now compute the path components' complex amplitude for the hypothesis t, $$\hat{A}_t = (G_t^H C^{-1} G_t)^{-1} G_t^H C^{-1} Y$$
$$= \Gamma_t \Gamma_t^H G_t^H C^{-1} Y'$$
$$= \Gamma_t x_t^H Y'$$

and can be quickly computed after computing $x_t^H Y'$.

Modeling the Path Components' Complex Amplitudes $a_i$

If $\Sigma_A$ models a complex Gaussian distribution of $a_i$ with known standard deviation (Rayleigh distribution of $|a_i|$ per path component), it can be included and it will appear in the inner term as $(\overline{G}_t^H \overline{G}_t + \Sigma_A^{-1})^{-1} = \Gamma_t \Gamma_t^H$. The remaining quantities are unchanged. This is a MAP rather than ML solution. A similar result is obtained using the MMSE criterion (Minimum Mean Squared Error with) with the given distribution of A. The problem with this solution is how to determine the standard deviation of $a_i$. The standard deviation could be a function, experimentally determined, of overall measured SNR or of the maximum observed peak (over all multipath components).

Another more convenient model, given that very weak path components are normally confused with noise, is to constrain $|a_i|^2 \geq \rho$ or reject the path component otherwise. If the power of the path component is below a selected threshold $\rho$ (usually some order of magnitude above noise variance, i.e., $\rho = K\sigma^2$ with $K \approx 10$), it is an invalid signal path component (it is more likely noise than signal path component). In such a model, if the MAP or ML solution results in an invalid path component $|a_i|^2 < \rho$, then the path component is assumed non-existent. The corresponding hypothesis is rejected. It is then possible to recompute MAP or ML without this path component and compare the resulting MAP or ML cost function to other combinations or hypotheses (that may include this path component).

With the constraint $|a_i|^2 \geq \rho$, we can either use ML, ignoring $\Sigma_A$, or use MAP assuming some knowledge of $\Sigma_A$.

In an embodiment, an additional constraint on the estimated first path component's or a nuisance path component's amplitudes is $|a_i|^2 \geq \max\{\rho, \gamma|a_j|^2\}$, where j represents all of the first path component and nuisance path components estimated amplitudes, and γ is a fraction of the power (e.g., 0.1). This additional constraint means that any of the estimated first path component or nuisance path component cannot be too weak with respect to the other estimated path components; otherwise, the hypothesis is rejected.

In an embodiment, the first path component jointly estimated with the nuisance path component(s) must be within a limited time range from the first path component initially estimated without any nuisance path components (i.e., in a first non-joint estimation step without any nuisance path components). The reason for such a limit on the time range is that the non-joint estimation can be more robust; hence, limiting the time range where the first path component is allowed to move reduces the risk of an erroneous first path component estimation using the joint estimation method (which could lead to occasional large errors).

Reducing Complexity by Shortening the ML or MAP Correlator Sequences

Applying a near-causal filter, X, reduces interference from colored noise multipath components. At this stage, the useful information is concentrated in and around the best operating region, i.e., in the vicinity of the first path component (or the path component to be detected). The SINR (FIG. 9B) shows that only a small section contains useful information. We can exploit this fact to compute very short ML or MAP sequences (truncated sequences) in order to greatly reduce complexity. The general idea is that after applying a near-causal filter, then before the first path component arrival, the signal to interference and noise ratio (SINR) is very low and there is no information (particularly when using pseudo-causal filters). And after the first path component arrival, when (strong) interfering multipath components start arriving, the SINR is again weak and there is little information (assuming we treat the multipath components as interference not to be estimated). Hence, most of the useful information on the time of arrival of the first path component is concentrated within a few samples (or time dimensions, i.e., small subspace) toward the start of the signal reception. We consider the signal within that subspace while ignoring the rest. We incur some loss with respect to the full sequences, but we drastically reduce computational requirements.

A first solution is to truncate the MAP or ML correlator sequences $x_t$ to the region of high SINR (operating region with some number of samples and where the sequences are not weak). However, more optimal MAP or ML correlator sequences can be designed by truncating the space to the subspace of interest and then computing short MAP or ML correlator sequences within the subspace of interest. The truncation to the space of interested is equivalent to considering or reweighting the first part of the MAP or ML minimization $(Y-G_tA)^H C^{-1}(Y-G_tA)$ in order to keep only the few important components. The truncation or reweighting could be smooth rather than abrupt, example, slowly decaying from 1 to 0. The remaining components in the MAP or ML minimization are unchanged, i.e., log det C-Σ log Pr $a_t$-Σ log Pr $t_t$.

The model is as before $$Y = G_t A + N$$

We could multiply by a filter that further concentrates the information within a few samples (or dimensions or axes) having the strongest SINR, and that enables locating the start of signal energy (signal energy rise). This filter is typically the near-causal or time of arrival Matched Filter (TOA-MF) with colored noise in time domain (with almost no information before the causal part, and with most information often destroyed by the multipath components in the causal part after the first few clean samples). Applying the filter leads to, $$XY = XG_tA + XN$$

$$Y' = G_t'A + N'$$

We can then truncate the space and limit it to a very small subspace where the useful signal resides. I.e., we ignore samples having little or no information (low SINR). For example, we may choose a subspace or an operating region of 2 points (or more) where SINR is strongest. Truncating to the subspace can be achieved by the operator T, a non-square primary or secondary diagonal matrix, with a very small number of rows in time domain, that selects a number of usually consecutive samples in time domain and throws the rest away); T removes rows of vector or matrix appearing on the right side, or it removes columns of a (transpose) vector or matrix appearing on the left side. Index T denotes a truncated vector or matrix to the region of interest in T after removing the zeroed components. Hence, $$Y'_T = TXY = TXG_tA + TXN = G_{tT}'A + TXN$$

where the region of interest is a very short observation window of the signal immediately following the energy rise above noise; the operating region (where we assume first detectable above noise path component is present).

Note that matrix T may not necessarily have a flat primary or secondary diagonal, i.e., a rectangular window shape in time domain: instead, window shaping (e.g., raise cosine or triangular or other) can be applied such that when we focus on the short observation window, we minimize the amount of leakage (or aliasing) in frequency domain that results from focusing on a short window in time domain.

In fact, the shortening of time domain results in frequency domain leakage that requires a higher sampling rate in time domain in order to reduce the aliasing. This phenomenon is similar to the frequency leakages or aliasing observed in wavelet theory. We therefore shorten time domain but also oversample it in the region where most useful information for time of arrival is present. However, adjacent path components (first, second, third, etc.) should not be placed too near each other because they result in substantial correlations between the path components that make the inner matrix non-invertible. In other words, the sequences are oversampled (to some sufficiently acceptable rate with good performance) but the path components hypotheses do not cover all oversampled samples to maintain some separation between path components.

We denote the selected subspace's noise covariance matrix by $C_T' = TXCX^H T^H$. Now the ML or MAP for a hypothesis on time of arrivals of the first few path components given by the set t is $$\max_t Y^H X^H T^H C_T'^{-1} TXG_t (G_t^H X^H T^H C_T'^{-1} TXG_t)^{-1} G_t^H X^H T^H C_T'^{-1} TXY -$$

$$Y^H X^H T^H C_T'^{-1} TXY$$

i.e. $\max_t Y_T'^H C_T'^{-1} G_{tT}' (G_{tT}'^H C_T'^{-1} G_{tT}')^{-1} G_{tT}'^H C_T'^{-1} Y_T' - Y_T'^H C_T'^{-1} Y_T'$ And this leads to the short ML correlation sequence in time domain, $$x_t = C_T'^{-1} G_{tT}' \Gamma_{tT}$$

Where $\Gamma_{tT}\Gamma_{tT}^H = (G_{tT}'^H C_T'^{-1} G_{tT}')^{-1}$ is a Cholesky decomposition. Note that in the above, we filter C then project it (or truncate it) then invert it, i.e., $[[C']_T]^{-1} \cong C_T'^{-1}$ (although the designer may choose to proceed in a different order, usually suboptimum).

And therefore, $$\max_t \|x_t^H Y_T'\|^2 - \|Y_T'\|^2$$

The short and efficient MAP or ML correlator sequences $x_t$ (of dimension L×M where L is the size of the short window T, and M is the number of multipath components considered in the MAP or ML criterion; some of them being nuisance multipath components) can be pre-calculated for a few noise covariance matrices (and associated near-causal filter) and a few hypotheses on the M multipath component positions, and pre-stored.

Noise matrix C may shift in time along with the first path component. Or preferably, it is fixed relative to position of signal energy rise (the first position where the received signal power increases above a threshold above the noise power). The second and subsequent multipath components may also shift in time relative to first path component; position is a delta with respect to currently tested first path component or with respect to energy rise. Each path component may be located in a short segment and it is allowed to vary only within that segment, i.e., we sample the time domain and for each hypothesis, we select a possible sample position for the path component within the segment. For each of these short segments, a decision can be made if the path component exists or not. For example, based on its estimated amplitude $a_i$ (obtained from the estimation of A), for example; or by checking if removing this path component results in improved MAP or ML cost function.

We can avoid computing the term $\|Y_T'\|^2$ if the correlator sequences $x_t$ encompass all of the samples in the window of the received signal such that $\|Y_T'\|^2$ becomes a constant that can be ignored. This is a good solution. Otherwise, if we wish to use shorter sequences in a shorter but sliding window, then we can precompute small matrices $C_T'^{-1}$ or their Cholesky decomposition and then find the noise whitened $\|Y_T'\|^2$ and subtract it for each short window.

Algorithm Listing for Generating the Short ML Sequences (Offline or in Real-Time)

The process of generating short ML sequences (done in real time or to be stored for use later in real time) is also shown in FIG. 3A.

In step 314, some expected typical PDP and noise level (repeat for different possible PDP and noise levels if needed) is assumed, or an approximate PDP or an accurate PDP is estimated online.

In step 316, an appropriate (pre) filter (e.g., TOA-MF filter) is generated that substantially reduces medium to far multipath, and that somewhat reduces nearby multipath (proximity is relative to first path component).

In step 318, a best operating region is determined: this is the region of a few samples where the post filtering operation reports the highest SINR. The region typically follows the energy rise of the main lobe and precedes the peak of the main lobe. It can be identified in real-time either by a few samples following and above the energy rise, or by a few samples preceding the first peak above the energy rise. The operating region can be 2 or more oversampled samples. More samples are needed if nuisance path components are included (i.e., M path components to be estimated and positioned: first path component plus M−1 nuisance path components).

In step 320, for various time hypotheses, the first path and nuisance paths matrix, and the colored noise matrix are created then projected onto the best operating region subspace. Make various time hypotheses on the TOA of each of the first path component and M−1 (0 or more) nuisance path components: this is the reference sequence and nuisance multipath sequences matrix G', post filtering. Include in the noise the remaining (medium to far) multipath that are not part of the nuisance set. The noise becomes colored noise. The choice of M depends on the acceptable complexity of the algorithm (M=1 is often sufficient and lowest complexity), and on the expected type of multipath (dense multipath will not work with M>1; on the other hand, discrete or sparse multipath may provide better results using M>1).

Step 322 projects (or truncate or shorten) onto the operating region the necessary vectors or matrices: a) the reference sequences matrix representing the first path component and nuisance multipath with various hypothetical delays ($G_{tT}'$, post filtering), b) the colored noise covariance matrix representing noise and the remaining multipath ($C_T'$, post filtering). And compute the Cholesky decomposition $\Gamma_{tT}\Gamma_{tT}^H = (G_{tT}'^H C_T'^{-1} G_{tT}')^{-1}$, of size M×M.

For each time hypotheses of first path component and M nuisance path components, compute the short sequence vector or matrix $x_t$, post filtering, that serves as projection vector or basis for the filtered and truncated signal $Y_T'$. Note that $x_t$ is a vector if M=1 otherwise it is a matrix. Computing $x_t$ consists of finding the short sequence matrix for a given time hypotheses of M path components that: a) undoes (or deconvolve) the pre filtering operation, b) undoes (or whitens) the noise coloring, c) orthonormalize the set of M path components to form a projection basis, and d) ensures a maximal norm of the projection of the filtered signal $Y_T'$ onto the basis or subspace of $x_t$ relative to other time hypothesis when the corresponding time hypothesis set t={$t_1, t_2, t_3, \ldots$} is the correct one. A preferred formula for $x_t$ is $x_t = C_T'^{-1} G_{tT}' \Gamma_{tT}$.

Finally, perform the projections of filtered signal $Y_T'$ onto the short sequences $x_t$ and pick the time hypothesis set t that maximizes the resulting norm of the projection. It is not necessary to project onto all of the available short sequences $x_t$. We may employ some type of search for the maximum, such as a binary search or other.

Essentially, we match the received samples in a short window with short sequences stored in a database in order to guess the TOA or TOA offset, using the best possible matching technique; where the short sequences are computed based on an expected PDP, i.e., a statistical model of the PDP.

Alternative Solutions

The reader should note that the above algorithm using a Maximum Likelihood (ML) criterion with Weighted Least Squares solution for Gaussian type of noise and interference, and with a projection onto a short subspace of oversampled samples is only one embodiment of the solution.

Other embodiments, usually suboptimum, may project or truncate the long sequences after calculating them as before, $x_r = C'^{-1} G_r T_r = X^{-H} g_r$; or by projecting or truncating the inverted covariance matrix, $[C'^{31\ 1}]_T$ after inversion rather than before inversion (as was done above by the definition $[[C']_T]^{-1} \triangleq C_T'^{-1}$), or by projecting the formula $(Y-G_r A)^H C^{-1}(Y-G_r A)$, leaving only the few terms corresponding to the subspace, then calculating the short sequences in this subspace; or by choosing a criterion different from Least Squares (e.g. Least Absolute Deviations or other).

Notes on the Covariance Matrix $C_T'$

For the oversampled short sequences with one first path component to be determined and no nuisance path components, and with near-causal filter approximately $C^{-1} G$, the rank of the matrix $C_T'$ is approximately 1, with eigenvector parallel to the useful signal, behaving like white noise. Proof: the model for one path component of interest in noise plus multipath interference is $Y = aG + N$, and the near-causal filter is $X \approx C^{-1} G$, whose output at the adjacent (oversampled) samples 0, t, . . . is $$Y_T = (X X_t \ldots)^H Y = (X X_t \ldots)^H (aG + N)$$

Where $X_t$ is the time shifted version of X by t. For a short sequence of 2 or few samples, the resulting noise covariance at the output of the filter is $$C_T' = (X\ X_t\ \ldots)^H C(X\ X_t\ \ldots)$$
$$\approx (X\ X_t\ \ldots)^H (G\ G\ \ldots)$$

i.e., approximately rank 1 with eigenvector $(X X_t \ldots)^H G$, parallel to the signal's vector (first path component). In essence, in the narrow operating region where most of the information is located, the near-causal filter manages to remove all noise except in the direction of the signal. Therefore, in this scenario, the ML or MAP does not need to invert $C_T'$ (which is nearly non-invertible) and can ignore it since the signal and noise are in the same one dimension. Especially if the noise covariance matrix is not accurately known, as is often the case.

Non-Invertible Matrix $C_T'$

Due to oversampling in the operating region, or to the use of the filtering operation, the matrix $C_T$ may not be invertible (low rank matrix). In this case, we may use alternatives such as: a) using the pseudo-inverse of $C_T'$, b) each column in $x_r$ is calculated using a linear equation solution (e.g., using the backslash operator or MLDIVIDE of MATLAB), c) using any regularization method, e.g., by adding an identity matrix $C_T' + \epsilon I$ scaled by a small number $\epsilon$ to make the summed matrix invertible. For the last option c), since the true actual but unknown PDP may be different from the expected approximate PDP used for the construction of the sequences $x_r$, a regularization method helps reducing the impact of an inaccurate expected PDP.

Special Low Cost and Robust Method: Logarithmic Slope

A low cost and robust solution is devised for the case of one path component estimation, assuming all other multipath components are interfering noise (zero nuisance path components). The solution ignores the phase information and uses only amplitude information; hence it is less optimal than using ML sequences that account for phase information. Nevertheless, the loss of performance is often small. Furthermore, following non-coherent combining of correlations from various snapshots (e.g., in LTE or in GPS), the phase is anyways lost and hence the logarithmic slope method is equal to the ML sequences using 2 adjacent points.

In this method, a near-causal filter is used, for example a TOA-MF filter that is matched to one first path component and that has an operating point suitable for the kind of observed SNR and expected channel model (the filter configuration and operating point determination as described herein). The goal is to operate at the operating point position; but this point is often not well known unless position and strength of multipath components are studied first. Here we assume it is not well known.

First, we detect signal energy rise, e.g., the first sample that is 8, 10 or 12 dB above noise power level where the threshold level may be a function of the distance (i.e., earlier) from the main signal. For example, if we are far from the main signal, a larger threshold above noise may be used in order to prevent early false alarms, i.e., noise being confused for signal, whereas if the signal is evaluated at a point close to the main signal, a lower threshold may be used.

Next, rising signal around and after the energy rise is analyzed. If the signal quickly drops below the noise threshold (e.g., within one or two samples), then the position of maximum signal may be used as the first path component time of arrival estimate. On the other hand, if the signal continues to rise, then two adjacent signal points early on the rising signal curve are selected (operating region). The adjacent point(s) can be obtained by oversampling, e.g., interpolating in time domain the signal to find one or two adjacent points (using a short and efficient interpolator filter; alternatively, using a bit more expensive inverse Discrete Fourier Transforms).

Next, the two adjacent points are analyzed via the following method in order to compute a time of arrival.

The "logarithmic" slope obtained from the received signal is denoted by $S_i = |y_{i+1}|/|y_i|$ where $y_i$, $y_{i+1}$ are the two received signal values at the adjacent points. This slope can be compared to pre-stored reference slopes obtained from the noise-free and multipath-free signal. Denote the reference slopes by $R_j = |x_{j+1}|/|x_j|$ for all j (oversampled signal). Each slope $R_j$ on the reference curve is also assigned an offset $O_j$ that gives the time offset (in subsamples) to move from that slope position to the time of arrival position. Comparing to the list of $R_j$ (in a binary search, for example) and finding the nearest $S_i \approx R_{j0}$, we then find the offset $O_{j0}$ from the position of $y_i$ to the time of arrival, and hence an estimate of the time of arrival.

Note that the time delta between $y_i$, $y_{i+1}$ is assumed equal to the time delta between $x_i$, $x_{i+1}$ in order to obtain compatible logarithmic slopes. The logarithmic slope automatically cancels the impact of the unknown amplitude of the first path component ($a_1$).

There is a tradeoff in the choice of the position and level of $y_i$, $y_{i+1}$. If we select them too low near noise threshold, then their quality is reduced (they are noisy). If we select them further higher on the received curve, then their quality may degrade if there are strong interfering multipath components.

One option is to select the operating point always assuming strong multipath, hence just above noise threshold.

Another option is to select them further higher depending on an estimate of the subsequent multipath proximity and power.

A third option is to compute the logarithmic slope at multiple positions. Then the region where the time of arrival estimate is the least jittery, i.e., varying the least between adjacent estimates, is selected for the final time of arrival estimate.

Figure 6:
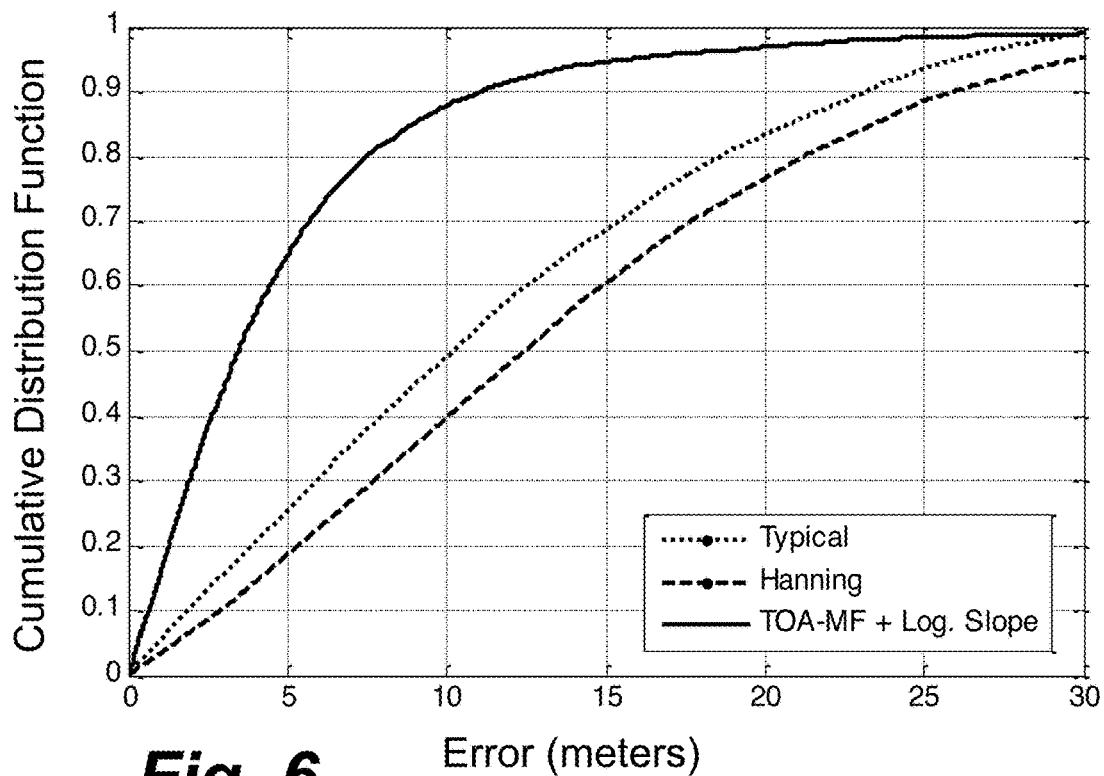
FIG. 6 is a graph of cumulative distribution function vs error, illustrating results from a case of one path estimation method for an EPA channel from LTE channel models. The figure shows how the method of logarithmic slope applied to a fixed operating region (approximately selected based on SNR) outperforms current state of the art.
Figure 7:
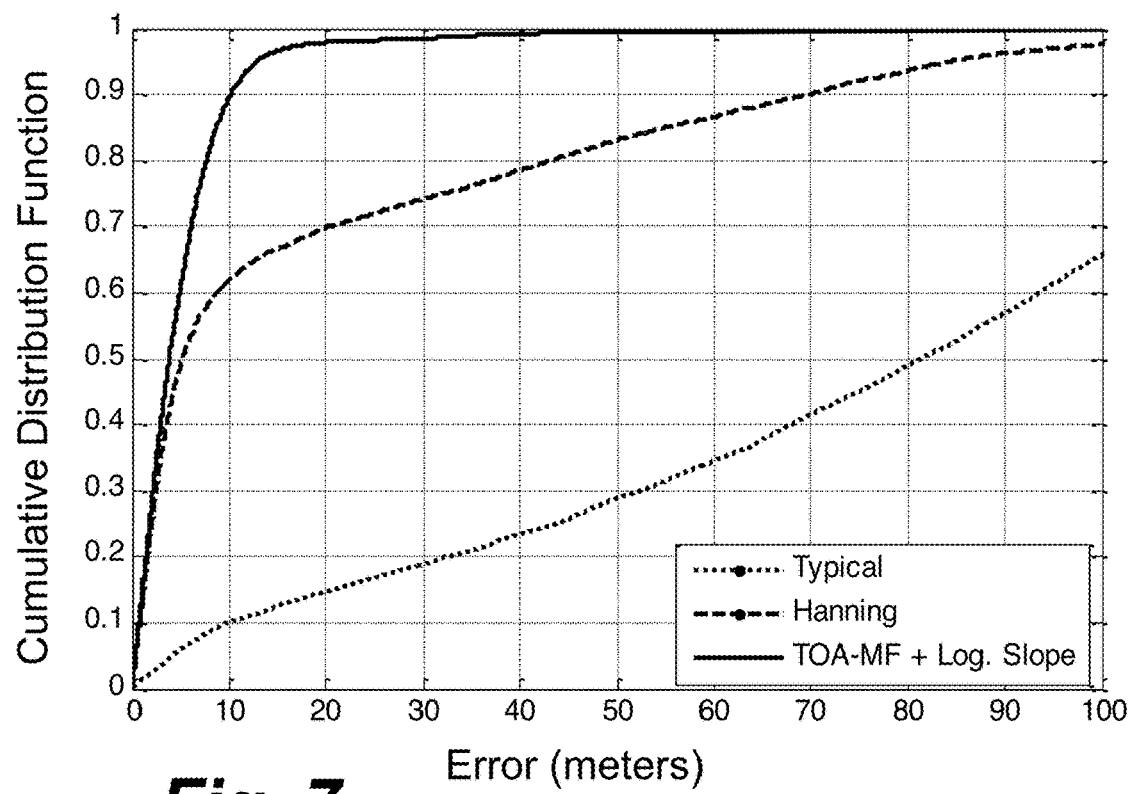
FIG. 7 is a graph of cumulative distribution function vs error, illustrating results from a case of one path estimation method for an ETU channel from an LTE channel model with strong NLOS condition.

Results from this method are shown in FIG. 6 and FIG. 7 for two channels from the LTE channel models: respectively EPA channel and ETU channel with NLOS component (the to NLOS is implemented as an additional first path component occurring between −100 m and 0 meter earlier than first tap in the ETU channel, and with a fixed −15 dB power below the ETU channel. The curves are plotted for SNR of 3 dB, LTE PRS pilots in one subframe, and a 10 MHz spectrum. In FIG. 6, the cumulative distribution of the error is provided. The logarithmic slope method is about 2.5 times more accurate than the earliest peak detection method (with or without Hanning filtering; the Hanning filtering enables identifying early path component hidden under the sidelobes of subsequent path component). In FIG. 7, a strong NLOS component is introduced in the channel model. By strong NLOS component or condition we mean that the first arriving path component is much weaker than subsequent path components. The Hanning filtering helps in this case, with respect to the typical solution. However, it still cannot reach the performance of our logarithmic slope method. One important reason is that the Hanning filter narrows down the useful spectrum, and consequently it widens the main lobe in time domain, and hence it creates additional interference from multipath components adjacent to the first path component. Our near causal filters prevent this phenomenon by preserving all of the useful spectrum, especially the all-important spectrum edges.

The logarithmic slope's best operating point is typically earlier than the TOA-MF maximum SINR operating point, i.e., where the slope is sharper. The best position may be a function of the expected range of PDPs and SNRs of the environment for which the system is to be deployed. For example, the logarithmic slope's best operating point may be that in which the TOA estimate has minimal variance as determined by a simulation, a priori.

Figure 8:
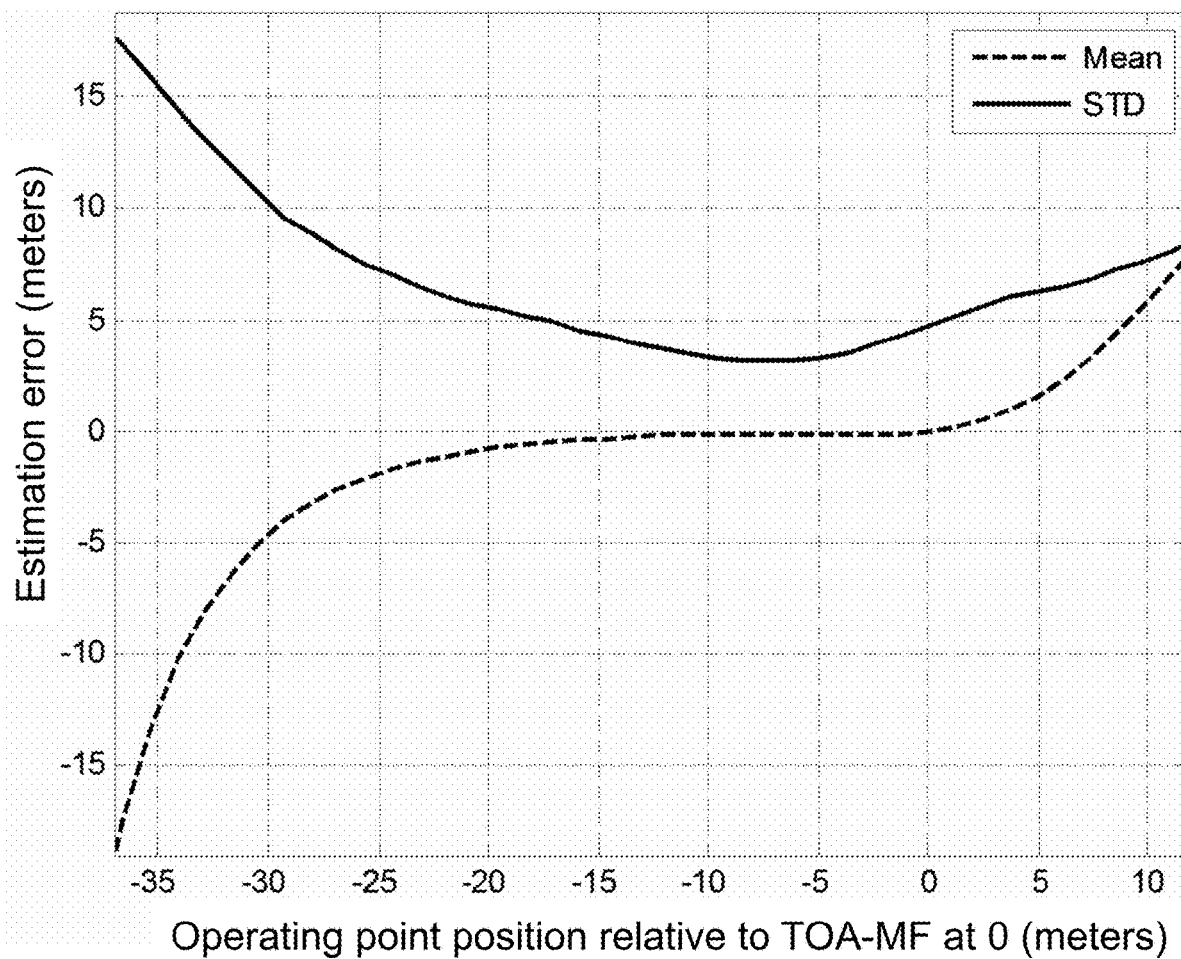
FIG. 8 is an illustration of mean and standard deviation of the estimation error for the logarithmic slope as a function of the operating point position, in the case of one path estimation.

Referring to FIG. 8, an example is illustrated of mean and standard deviation of the estimation error for the logarithmic slope as a function of the operating point position. The best operating point for the logarithmic slope, in the particular example below, is 7.5 meters earlier than the TOA-MF best operating point. Nevertheless, between 10 and 5 meters earlier, the standard deviation is nearly flat hence the algorithm is not too sensitive to a small shift in the operating point position.

In an embodiment, the previously described method of a logarithmic slope used to determine time of arrival may be replaced by a method employing a two-point ML correlator sequence (one dimensional for first path component only) as explained in the previous section: $\|x_t^H Y_T'\|^2$. The ML correlator sequences are computed for similar positions i starting from some threshold above noise level. In other words, the logarithmic slope has equivalent performance to the optimal ML correlator sequences assuming 2-point sequences (one dimensional search without nuisance path components) and ignoring the noise covariance matrix in this region (which is nearly rank 1).

Non-Coherent Combining of Snapshots or Antennas

As described herein, multiple snapshots with minimal timing and channel drift may be combined to improve performance of the time of arrival estimation (e.g., GPS non-coherent combining). In an embodiment, when combining multiple snapshots i from: different antennas, different sectors, different times, different frequency bands, etc., an optimal combiner based on the following may be used:

$$\max_t \sum_i \alpha_i (\|x_t^H Y_{Ti}'\|^2 - \|Y_{Ti}'\|^2)$$

where we maximize the sum over all snapshots (each weighted by a factor, typically $\alpha_i = 1/\sigma_i^2$ to normalize them to the same noise power level) for the same hypothesis set t for the selected first path component and nuisance multipath signal components, and where $\sigma_i^2$ is the estimated noise power level (in the early side lobe region, for example). Essentially, we correlate (coherently) with a given sequence $x_t$ per snapshot, prior to non-coherent accumulation; then we accumulate, non-coherently, the squared terms from each snapshot; we repeat for each hypothesis t; finally, we select the winning hypothesis t that maximizes the sum of the squared terms for this hypothesis.

Note that antennas may have different polarizations, or small movements of the receiver or transmitter may occur over time, or more generally, the first path component and nuisance path components may shift a bit between snapshots. In that case, the set t may be slightly different between each snapshot. For instance, the first path component and nuisance path component may follow a predictable trajectory.

In an aspect, the whitened signal power term $\|Y_{Ti}'\|^2$ may be eliminated from the snapshot combining method as was done for a unique snapshot: by using, within each snapshot, the same received samples in the operating region, hence this term is constant, per snapshot, and can be ignored.

Alternatively, the truncated covariance matrix may often be approximated as an identity matrix, as we have seen for closely spaced samples, and therefore the term $\|Y_{Ti}'\|^2$ can be quickly computed. In this case, nevertheless, the scaling of the identity matrix should be computed and accounted for (including the term log det C). The scaling of the identity matrix depends on effective noise and interference levels, which can be difficult to estimate.

Application to Satellite Navigational Systems

In the case of satellite navigation systems such as GPS and GNSS, the transmitted reference waveform G is not a sinc in time domain, or a flat response in frequency domain. It is rather the inverse: flat in time domain and sinc in frequency domain (newer GNSS systems use some variants).

Relying on (minimum phase) IIR filtering to create near-causal sequences may not work due to poorly controlled early side lobe level.

In an embodiment, a near-causal or TOA-MF filter, such as one of the near causal filters described herein, is used to filter the reference sequences used by a GPS receiver prior to correlation with the received signal. E.g., of ±1 reference sequence, which is oversampled and pre-filtered with the TOA-MF filter X. Hence, at the output of the typical GPS correlation, instead of having a pseudo triangular autocorrelation waveform per received path component, we automatically obtain a near-causal waveform per received path component (due to the filtering with X embedded within the reference sequences). There is nearly no additional processing cost. When computing the TOA-MF filter $X=C^{-1}G$, the reference waveform G can be, for a given satellite, the full transmitted Pseudo Random Noise (PRN) sequence of the satellite, of duration 1 ms in GPS, for example. The output filter X will be best matched to the input PRN sequence G of this satellite (bandlimited to a bandwidth of interest usually between 2 MHz and 16 MHz depending in desired performance); assuming the expected multipath interference and noise covariance matrix C that is computed based on an expected channel model, for example. The output filter X for this particular solution is of same length as reference sequence G, in either time domain or frequency domain, and is essentially a pre-filtered PRN sequence with filter X. Applying the pre-filtered PRN sequence to the received signal is performed similarly to applying the normal unfiltered PRN sequence G to the received signal (e.g., using correlations of 1 ms long, for 3 sampling positions or 3 correlators, early, prompt and late). The operating point is a little earlier than the peak of the signal and one or more additional correlators can be positioned within the operating region; then a 2-point ML matching or a logarithmic slope can be used to determine the time of arrival.

For best performance, the filter X can be set to G when a multipath detector estimates that there are no multipath and we use peak detection rather than earlier operating point in this case.

Once a near-causal filter is embedded in the GPS sequences, and adjusted for the nominal case, e.g., C/N of 40 dB (Carrier to Noise ratio), it can have a negative impact on satellites detected with low C/N. Moreover, it can reduce the precision of Line-Of-Sight (LOS) satellites.

In an aspect, the use of near-causal filtering of the GPS reference sequence may be a function of the presence and strength of the multipath components. For example, if the strength of the multipath is below a threshold, the near-casual filter may be turned off.

Figure 9A:
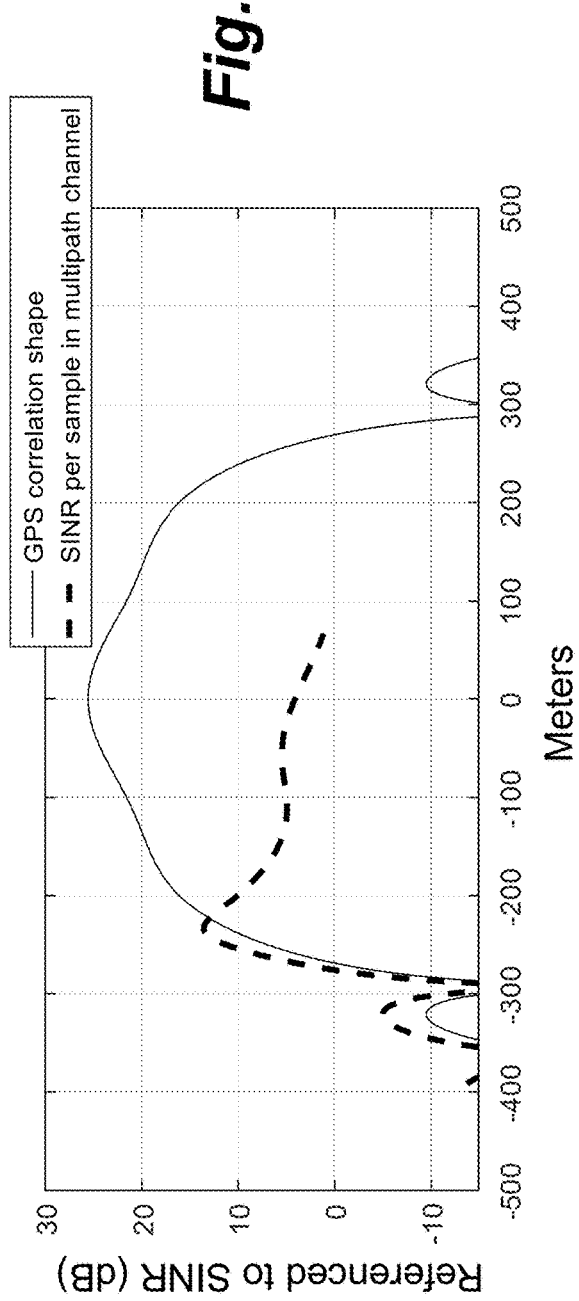
FIG. 9A is a graph of SINR in time domain (represented as distance) that illustrates the correlation output using a regular GPS correlation.
Figure 9B:
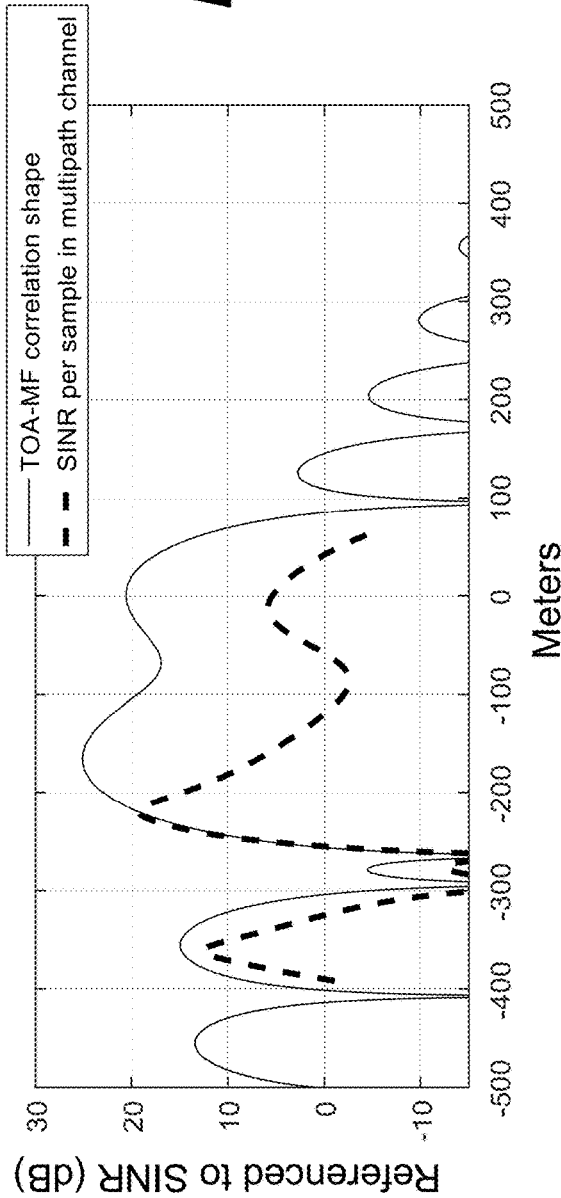
FIG. 9B is a graph of SINR in time domain (represented as distance) that illustrates a near-causal correlation, computed as a Time of Arrival Matched Filter (TOA-MF) filter for a channel with multipath.

FIG. 9A illustrates the correlation output using a regular GPS correlation, and FIG. 9B illustrates a near-causal correlation, computed as a TOA-MF filter for a channel defined with a few multipath components. The baseband sampling rate is 4 MHz. The SINR is also shown in each case. On these figures, the SINR is defined as the ratio of the first path component power over noise plus multipath interference power. This SINR is a function of where we sample the output of the correlation function. We observe that in the presence of multipath, the SINR increases if we sample the correlation function earlier (before the multipath impact kicks in). For the type of channel modeled in FIG. 9A and FIG. 9B (cf. FIG. 10B for the channel details), using a traditional GPS correlation, the SINR is highest if we sample the output of the output of the correlation around 250 m earlier than the usual peak of the correlation (15 dB vs. 5 dB at the standard peak position of the correlation). Furthermore, using an improved filter adapted to the modeled channel and that reduces multipath interference, sampling the output correlation at the right position leads to an even higher SINR (20 dB vs. 15 dB for the GPS standard correlator).

We observe in FIG. 9B that the side lobes of the GPS correlation are increased by the near-causal filter on the left side (in the causal part) in order to sharpen the signal energy rise. The correlation output tends to look more like a square than like a triangle. This behavior is suboptimal for Line of Sight reception, where the noise is uniformly spread in time domain and the triangle correlation is optimal, but has much higher performance in the presence of multipath on the right side.

At the best operating point, the SINR is 20 dB for the near-causal filter while it is only 15 dB for the usual triangle correlation output. Moreover, at the peak of the triangular correlation, the SINR is very weak due to interference from subsequent multipath components. It is the wrong decision to look for the time of arrival at that position. The correct position to estimate the time of arrival is earlier where there is less multipath interference, i.e., where SINR is maximum. Hence, our novel method achieves two improvements for GPS: first, we shift earlier the estimation region of time of arrival where there is less multipath interference, and second, we filter the correlation with a near-causal filter that further reduces the influence of subsequent multipath components and increases SINK in the operating region.

Note that the near-square looking shape of the correlation with the TOA-MF filter essentially reduces the emphasis on combatting noise with a regular matched filter (that generates a triangular correlation output) and increases the emphasis on combatting multipath: minimal filtering to maintain the near-rectangular shape of the GPS transmitted signal, which can better discern between first path component and subsequently received path components (mainly due to a very fast signal energy rise for a squared wave). The method strikes the right balance between noise filtering and multipath mitigation.

Although it appears not to be near-causal, the TOA-MF can still be considered near-causal because it removes a substantial amount of signal energy from the early part of the triangular waveform (the slow rising edge of the triangle before the peak), and creates a sharp fast rise instead. Hence, the near-causality terminology can still apply.

A simulation with a GPS channel model gives the performance results shown in FIG. 10A and FIG. 10B, for both typical GPS correlation and for TOA-MF filtering. The channel model is shown in FIG. 10B with a main path component and 2 subsequent path components that are 6 dB weaker. The baseband sampling rate is 4 MHz. Two methods are shown: regular peak detection, and multipath mitigation using TOA-MF filtering and the "logarithmic slope" TOA estimation method.

We observe a significant gain of performance when the channel suffers from multipath interference. On the other hand, the performance loss when the channel is AWGN (Line of Sight) is negligible. Hence one could always use the multipath mitigation method, or it could be turned off if multipath is not detected.

Note that in GPS, the typical methods slowly lock onto the peak by acquiring more and more signal and by shifting the sampling position to the left or to the right until the peak is detected. Another option to save power is to acquire the signal only once, then use digital interpolation to shift the sampling position until the peak is detected. Either method is suitable for the TOA-MF filtering in the presence of multipath: compute a number of points on the correlation output and then use interpolation to find the points in-between, or simply shift the sampling position on new input samples until we locate the region of the fast-rising edge.

After the general shape of the GPS correlation output is obtained with the few computed points similarly to normal GPS processing using 3 or more correlators such as the known Early, Prompt and Late correlators, a short interpolation is used to obtain more points near the best operating point, i.e., near the fast rising edge of the TOA-MF filter. In particular, to oversample the correlation output and find correlation values in the operating region where SINR is maximum.

By fast rising edge, or operating region, in the case of GPS, we mean moving earlier and down from the peak, on the correlation output curve (FIG. 9B), by a few dB (e.g., 5 dB below the peak, but which depends on the experimental design of the filter), to where multipath interference is reduced, i.e., to the operating region of best SINR.

The other option for locating the operating region is moving up from the energy rise, as usual. But for GPS and other narrowband systems with one main lobe carrying most of the energy, we have the option of moving down from the peak rather than up from the energy rise.

We may alternatively locate the operating region as the region before the peak where the signal's phase in the complex plane exhibits the slowest variations (meaning less interference).

At this point, once correlation values are obtained in the operating region, the logarithmic slope, MAP or ML method, or other methods can be used to determine the TOA from the samples in the best operating region.

When non-coherent combining is needed in GPS, we provide the optimal method of MAP or ML. Each snapshot s, before non-coherent combining, is processed with the short MAP or ML correlator sequences, and then we non-coherently combine the output of these short correlations before making a decision on the time of arrival estimate, $$\max_t \sum_s \|x_t'^H Y_s'\|^2$$

Hence, for each snapshot, a set of hypotheses on time of arrival is made, and a set of short MAP or ML correlations are performed and stored. When the next snapshot is received, we compute similar short MAP or ML correlations for the same time of arrival hypotheses; and then for each time of arrival hypotheses, we accumulate non-coherently the output of the MAP or ML correlator sequences. Finally, we select the time of arrival hypothesis that maximizes the cost function.

We have ignored above the term $|\overline{Y}_s'|^2$ by assuming it is constant per snapshot (by using the same window of samples for matching with the ML sequences).

The previous method can be replaced by a lower cost solution for non-coherent combining by using the logarithmic slope method that ignores the complex phase of the correlators value. Contrary to MAP or ML method, this solution can be applied after non-coherent combining of the snapshots, hence it can be applied at the end of the processing to reduce cost. The logarithmic slope method depends only on the amplitude of the waveform and is not impacted by the non-coherent combining. But two important points have to be considered: first, the logarithmic slope changes when it is computed after the squaring operation (non-coherent combining in power) and therefore a new logarithmic slope table based on the squared waveform, with its own set of time offsets is needed. Second, the operating region has to be determined before non-coherent accumulation (because interpolation to locate the operating region cannot be performed after combining in power). Therefore, before accumulating, the operating region on the rising curve is determined approximately (e.g., using around 100 ms of GPS signal). 2 or a few points on the rising curve are located. Each sub-snapshot computes the correlation at these predetermined point positions. Non-coherent combining is applied per point position, i.e., we accumulate non-coherently as GPS does. And finally, the logarithmic slope method is used on two adjacent points to determine an estimate of time of arrival.

In wireless systems, it is common for each transmitter to transmit signals based on a unique code sequence (e.g., PRN sequence). This is done to enable simultaneous transmissions from multiple transmitters. This is the case, for example with GNSS (e.g., GPS) satellite transmissions.

Using GNSS as an example, we discuss here how to adapt the TOA-MF to each GNSS transmitter's unique PRN sequence, i.e., to each satellite, for best performance; and to optionally incorporate the TOA-MF within the entire PRN sequence itself. This renders the autocorrelation with the sequence costlier; however, the performance in multipath channels is substantially improved. The same technique can be applied in a straightforward manner to other, non-GNSS wireless systems. That is, the techniques described herein apply to the use of CDMA sequences or sequences defined in the time domain, and more generally to sequences that present variations of the amplitude in the frequency domain (usually rapid variations of the amplitude in the frequency domain). We will focus here on the example of GPS L1 sequences.

Traditional solutions design the TOA-MF only considering the GNSS shaping waveform, e.g., the rectangle or binary offset carrier (BOC) waveform, which is applied to "one-chip". In an embodiment, the TOA-MF is adapted to the entire PRN sequence of each satellite, having "multiple-chips", and having a specific auto-correlation shape relatively different from the auto-correlation of rectangle or BOC waveform. It is especially different in terms of interfering sidelobes to suppress; but also, in terms of rising edge of the main lobe, where we'd like to estimate the TOA in the presence of multipath. The shape of the main lobe is important and needs to be properly shaped by the TOA-MF for best performance, e.g., to maximize SINR and to maximize the rising slope.

The constructed TOA-MF filter will be incorporated inside the PRN sequence, thereby replacing the original PRN sequence with a TOA-MF pre-compensated PRN sequence, which provides for excellent performance; however, at the cost of increased complexity to compute the autocorrelation function, i.e., to compute the correlators. In this case, the shaped PRN sequence is no longer given at the chip rate and comprised of +/−1s; after shaping with TOA-MF filter it is defined at a higher sampling rate with real valued coefficients.

More generally, we denote by code sequence the sequence of chips having values such as +/−1 or complex values and generating one code (e.g., PRN code or PRN sequence). The code sequence consists of 1023 chips in the case of GPS L1 C/A or 4092 in the case of Galileo E1. We further denote by shaping sequence (e.g., square wave or BOC wave) that is sampled to some desired sampling rate (e.g., 16.368 Msps). The shaping sequence is convolved with each chip of the code sequence, resulting in the shaped code sequence. The shaped code sequence may also be denoted by the reference sequence transmitted by the transmitter.

We denote by the filtered code sequence, the shaped code sequence filtered by the TOA-MF filter, which is therefore incorporated in the filtered code sequence itself.

In order to compute the filtered code sequence, i.e., the TOA-MF for a specific code sequence (e.g., PRN sequence) and shaping sequence of a specific transmitter (e.g., satellite), we first oversample and shape the entire code sequence to the desired sampling rate; i.e., we create the reference sequence G defined as the convolution of the shaping sequence $G_s$ (e.g., square wave) with the code sequence $G_c$ (e.g., PRN code). The sampling rate for good multipath mitigation in GPS L1 C/A is preferably 8 Msps or above. In GPS L1 C/A, the entire PRN sequence consists of 1023 chips of +/−1 spanning 1 ms to be shaped and oversampled (it is an option to use the entire "one bit" sequence of 20 ms rather than the code sequence of 1 ms; but the complexity is far higher and the benefits are negligible).

We may further oversample the reference sequence G above the desired sampling rate (we denote it by extra oversampling) if we wish to model the channel PDP with a dense multipath structure having a fixed sampling rate (more on this point later; it helps to efficiently compute the covariance matrix). In the frequency domain, the extra oversampling consists simply of inserting zeros to lengthen the frequency domain.

The expected PDP is then constructed, for example, by inserting a path every 1 meter or every 1 sample, with the expected power density. For a uniform PDP, it will consist of multipath every sample with equal power. But one may consider an exponentially decaying PDP or other. The expected PDP may further depend on the environment, e.g., rural, urban, dense urban, etc. The expected PDP may be determined in advance of the receiver receiving a transmitted signal, including the possibility that the PDP is programmed in software as a parameter (array or vector) or possibly a set of static parameters. Alternatively, or in addition, the PDP may be based upon channel measurements performed by the receiver in order to account for channel characteristics of the currently received signal. Other methods may be used to create the PDP and are familiar to one skilled in the art.

The power of the multipath relative to the power of the noise post-correlation (i.e., post accumulation of a number of 1 ms codes) is an important parameter to be assessed approximately. The stronger the noise the lower the impact of multipath and vice versa. Note that the power of the main path of interest, i.e., the first path, does not impact the TOA-MF and we can set it to 0 in the PDP. It does not impact the shape of the TOA-MF but it does impact the output SINR level and the overall TOA estimation performance.

It can be an option to set a small region between the first path and the second path to zero; i.e., the interfering multipath may start after a number of meters following the first path.

Then the noise and multipath covariance matrix is computed as shown previously, $$C = V + \sum_{i>1} w_i P_i G G^H P_i^H = V + \Gamma W \Gamma^H$$

Optionally, if we uniformly sample PDP in time domain, we can show that W can be efficiently computed as a circulant (Toeplitz) matrix of the FFT of the PDP function.

Before computing the TOA-MF as $X=C^{-1}G$, it is helpful to truncate the frequency domain spectrum to the useful part where G is non-zero, i.e., by removing the extra oversampling of the spectrum. This contiguous part is simple to remove from the matrix C and vector G. It has no impact on the computed filter X and served mainly to efficiently compute a high-density PDP's covariance matrix.

The size of vectors G or X is the number of chips times the oversampling rate (e.g., 1023 times 16, i.e., 16368). The covariance matric C is a square matrix with each dimension having a size of number of chips times oversampling rate (e.g., 16368 times 16368).

Figure 16:
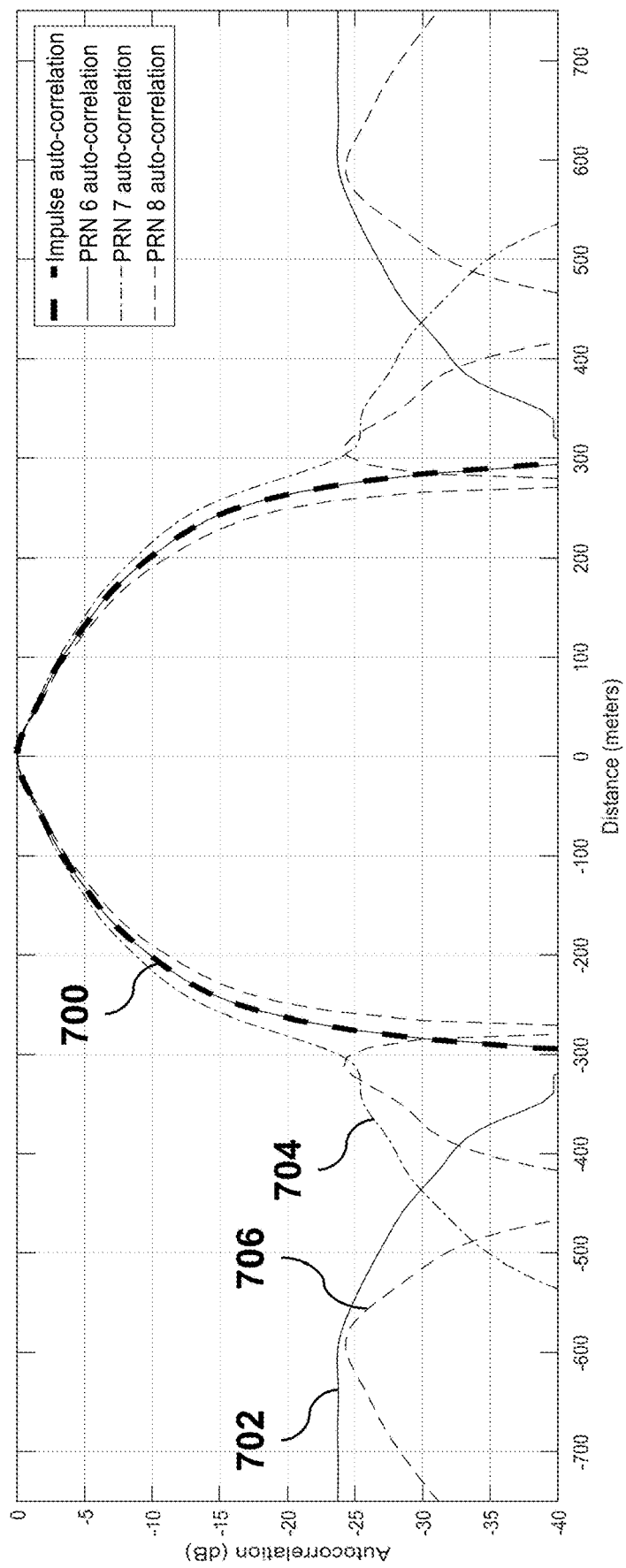
FIG. 16 is a graph showing the autocorrelation functions of various GPS L1 PRN sequences, with comparison to the autocorrelation of the shaping function (square wave).
Figure 17A:
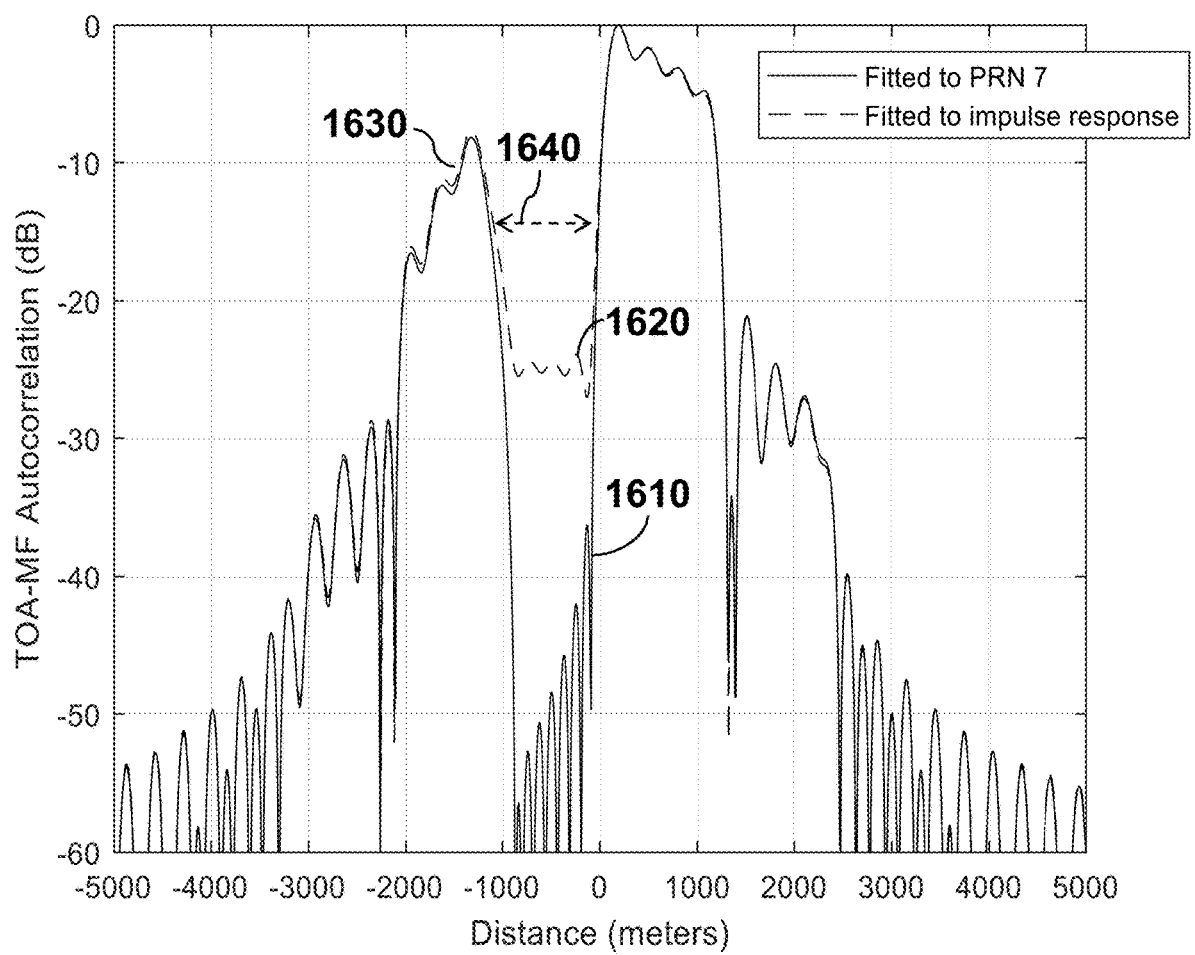
FIG. 17A is a graph showing the autocorrelation functions of GPS L1 PRN pre-compensated by the TOA-MF filter for a given expected channel PDP.
Figure 17B:
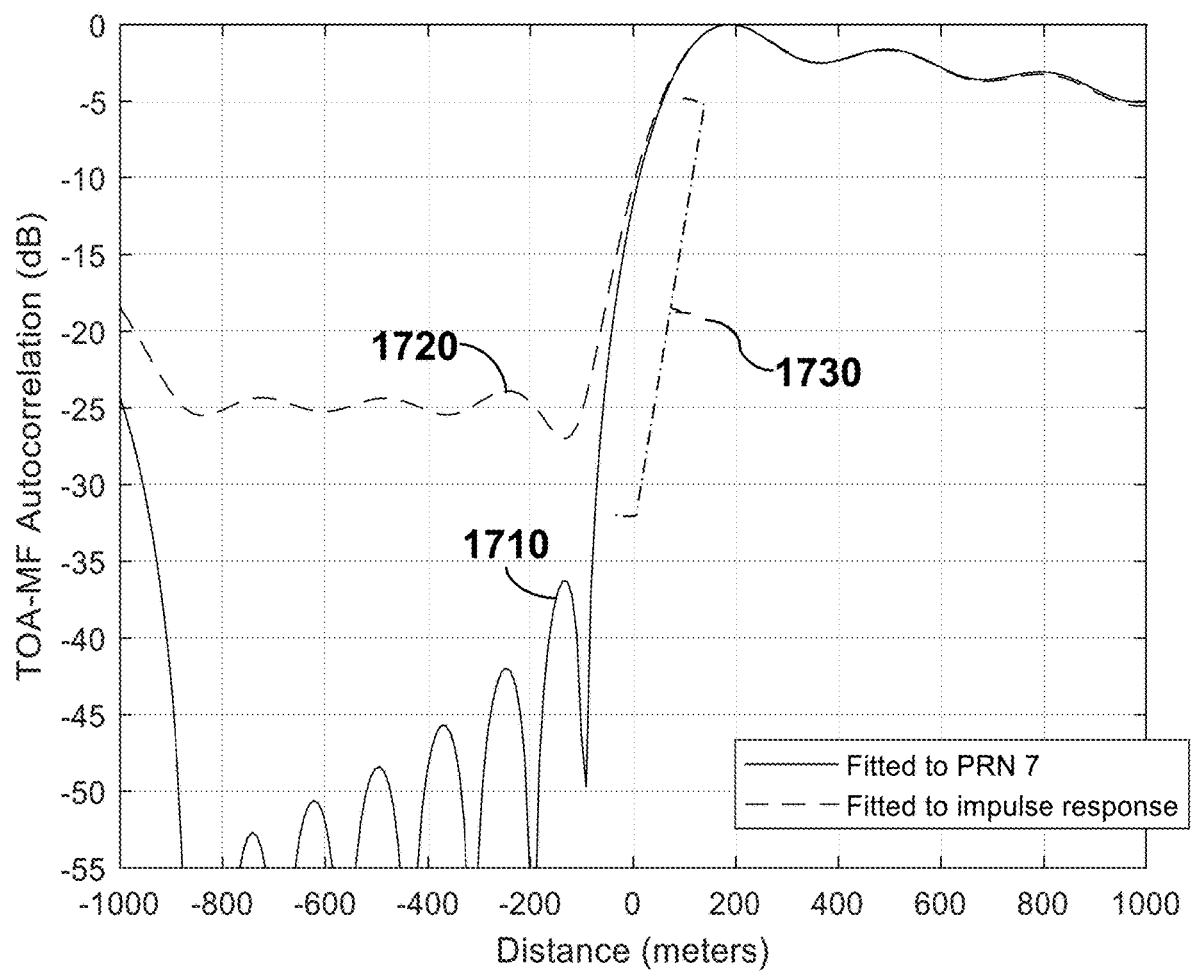
FIG. 17B is a graph showing a zoomed portion of the graph of FIG. 17A.
Figure 18:
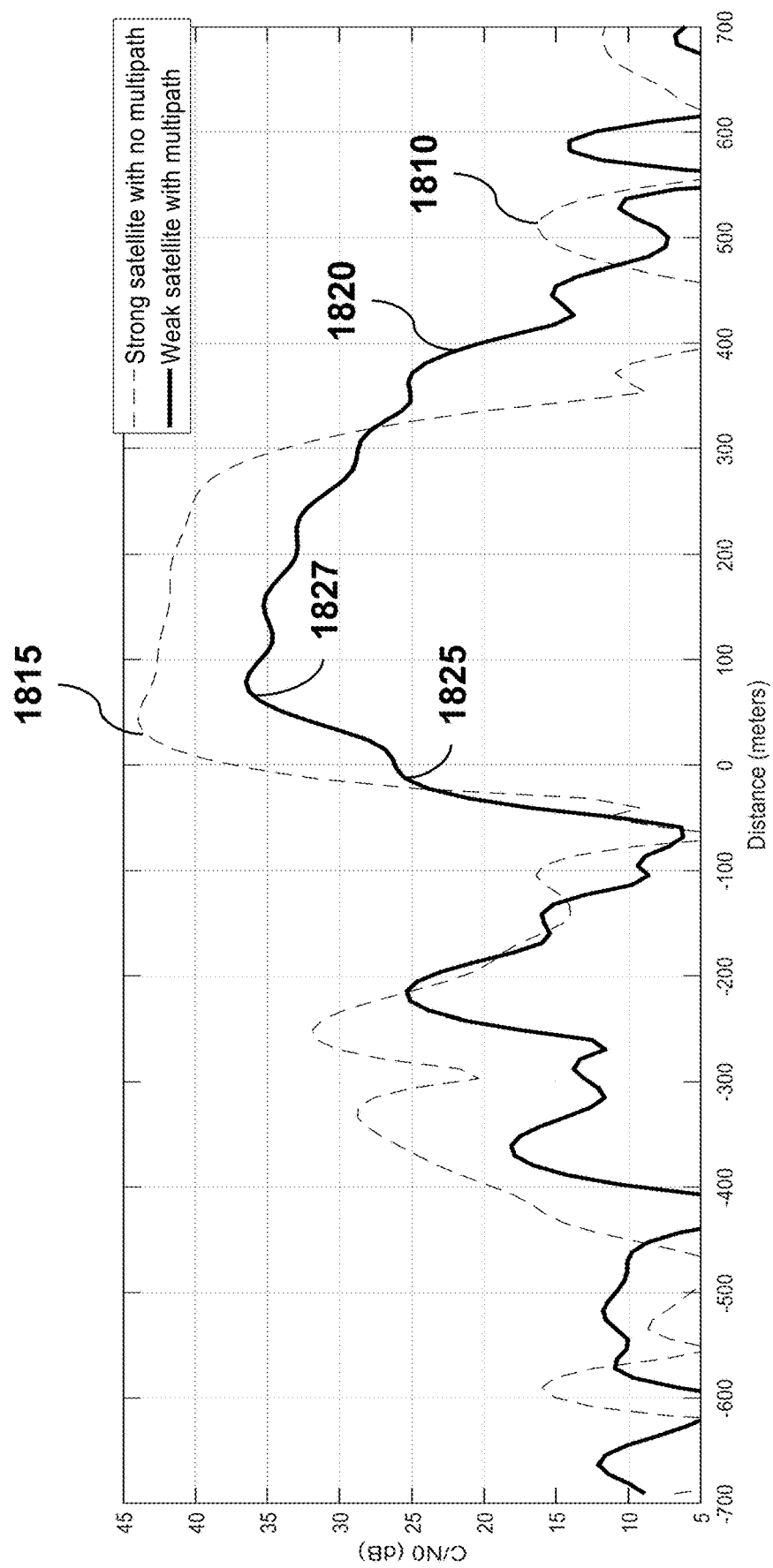
FIG. 18 is a graph showing the TOA-MF pre-compensated autocorrelation functions of GPS L1 applied to a real-world received signal.

The computed filtered code sequence X combines both the TOA-MF filter and the shaped code sequence, convolved into one vector. The receiver correlates the received signal with vector X, instead of a shaped code sequence as is performed in traditional systems. The output of the normal auto-correlation of the received GPS L1 signal without TOA-MF filtering is shown in FIG. 16, while the output of the correlation with the TOA-MF filtered code sequence X is shown in FIG. 17A-B, and FIG. 18. Traditionally, a GPS receiver first correlates with the shaping sequence and then correlates with the code sequence. In an embodiment, the filtered code sequence is correlated with the received signal directly and in a non-hierarchical manner with the filtered code sequence (as it incorporates both the code sequence and shaping sequence).

In FIG. 16 we show the time domain auto-correlation function 700 of a square wave impulse response: approximately a triangle in dB at high sampling rate. As well as the typical auto-correlation functions 702, 704, 706, of GPS L1 C/A PRN 6, 7 and 8, respectively. We clearly observe that the GPS auto-correlation functions do not match that of the triangle impulse response, and hence it is quite helpful to fit the TOA-MF to the PRNs rather than to the triangle impulse response. The mismatch is both in the main lobe with tens of meters of difference and in the sidelobes with substantial difference.

In FIG. 17A and FIG. 17B we show the correlation function of the received reference sequence with the filtered code sequence, i.e., the time domain waveform of the frequency domain $X^H \odot G = XG$ where operator $\odot$ is the elementwise product of 2 vectors, and X is the diagonal matrix of X in frequency domain (circulant in time domain). The function 1610 is TOA-MF fitted to the entire PRN 7 sequence while the function 1620 is TOA-MF fitted to the shaping square wave sequence. The shape in 1610 corresponds to the filtered code sequence fitted to the entire PRN 7 sequence then applied to the received PRN 7 reference sequence or shaped code sequence. The shape in 1620 corresponds to the TOA-MF filter fitted to the square wave then applied to the received PRN 7 reference sequence.

We notice that both correlation functions 1610 and 1620 look somewhere between a triangle and a square wave. The reason is that the TOA-MF finds a tradeoff between the typical autocorrelation in the absence of multipath, i.e., the triangle, and something closer to original rectangle or square wave in the near absence of noise. These TOA-MF filtered correlation functions also show some significant side lobes in a safe region 1630 beyond the multipath interference ("don't care" region), and substantially weakened side lobes in the region 1640 where multipath occur (the region we care about and where multipath is harmful). The "don't care"

region where the side lobes appear relatively strong is a region where the expected PDP does not show any significant multipath.

In FIG. 17B we zoom into the nearest early side lobes and the rising main lobe of the correlation functions in order to see how the entire PRN 7 filtered code sequence 1710 outperforms the "one-chip" square wave's filtered sequence 1720. The benefits of fitting to the entire PRN sequence are clear: the harmful sidelobes are much more suppressed; the rising edge 1730 of the main lobe is steeper for 1710 compared to either 1720 or 704 (unfiltered shaped code sequence), which helps in TOA estimation accuracy; and the expected SINR in this scenario is about 2 dB better for 1710 compared to 1720, and far more than 2 dB better when compared to 704. The early harmful sidelobes of 1710 are 10 dB or more below the same side lobes of 1720, and 10 dB or more below compared to sequence 704. This provides significantly improved protection against multipath.

The suppressed side lobes and steeper rising edge enable extracting a weak first path from underneath multipath in NLOS situations.

In FIG. 18 we provide a real-life example. The correlation of two received GPS L1 C/A satellites signals (from two different satellites) with the corresponding filtered code sequence. Sampling rate at 8.184 Msps. The curve 1810 is the correlation of a strong satellite, where we see a clean correlation function and the clearly distinguishable first path 1815. The curve 1820 is the correlation of a weaker satellite in NLOS condition. The correlation function of the weaker satellite is substantially distorted. Nevertheless, we are able to observe the first path 1825 substantially below the second path 1827. The first path is the visible perturbation or protrusion along the rising edge of the main lobe.

After applying the TOA-MF filtered code sequence, we create the short ML sequences as discussed previously, $x_t = C'_T{}^{-1} G_{tT} T_{tT}$, and find the first path along the rising edge or within the observation window 1730 of the main lobe by maximizing any of the ML formulas (cf. previous sections) such as, $$\max_t \|x_t^H Y'_T\|^2 - \|Y'_T\|^2$$

or the non-coherently accumulated over multiple snapshots, $$\max_t \sum_i \alpha_i (\|x_t^H Y'_{Ti}\|^2 - \|Y'_{Ti}\|^2)$$

Note that the observation window 1730 may extend beyond the rising edge. The observation window can be located by computing additional correlators until locating the rising edge, and/or the falling edge when moving backward from the peak toward the early side lobes.

The procedures are provided herein.

Figure 19:
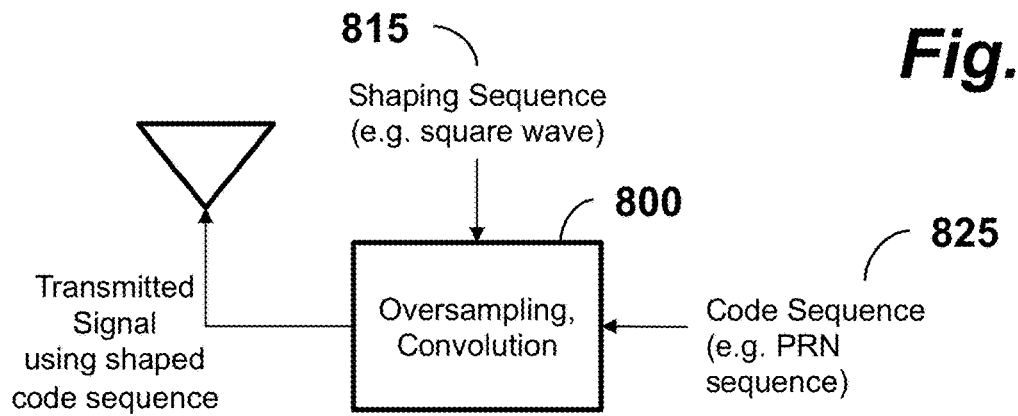
FIG. 19 shows a functional block diagram of a transmitter of GNSS or similar wireless systems.

The transmitter, FIG. 19, uses a predetermined shaping sequence 815 to shape (via convolution 800) a predetermined sequence of chips, or code sequence 825, then it uses the resulting shaped code sequence to transmit a code-modulated carrier signal over the air.

Figure 20:
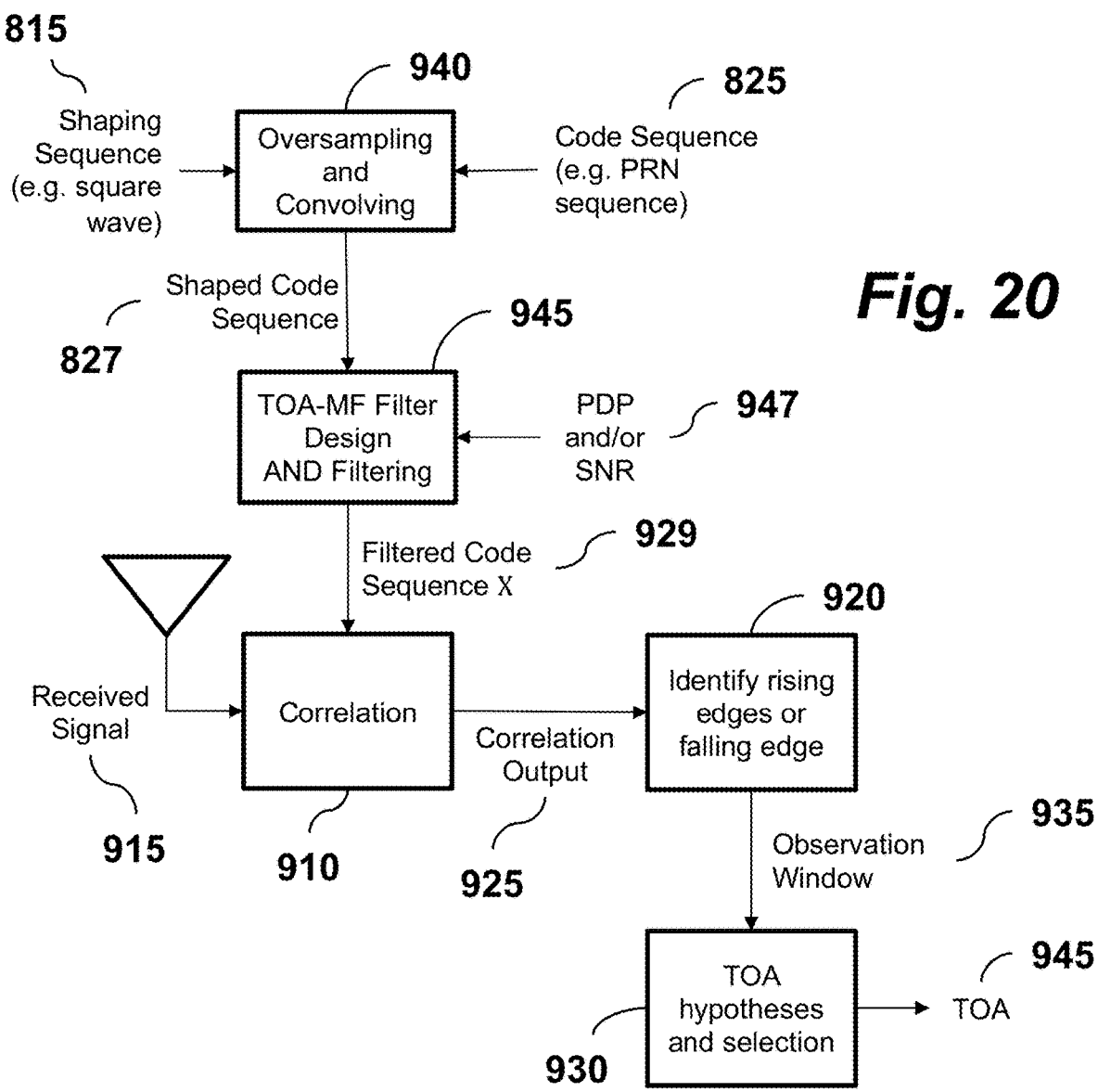
FIG. 20 shows a functional block diagram of a receiver that correlates a received signal with a filtered code sequence constructed using a TOA-MF filter according an embodiment of the present invention.

After the signal propagates over the wireless channel, the receiver in FIG. 20 receives a signal 915 with additive noise and other distortions. The received signal 915 is then correlated 910 with a filtered code sequence 929. The correlation output 925 is then processed 920 to identify the observation window 935 (i.e., a period of time in the vicinity of a rising edge or the falling edge when moving backward from the main lobe/peak). The TOA hypotheses and selection 930 (e.g., using ML sequences) then analyzes the window 935 to determine the TOA 945 of the first path of the received signal 915.

The filtered code sequence 929 is computed in a procedure that may be performed online or offline. The predetermined shaping sequence 815 and oversampled code sequence 825 are convolved 940 to produce a shaped code sequence 827. A TOA-MF filter design 945 based on the shaped code sequence 827 (and optionally based on PDP and/or SNR 947) is used to produce a filtered code sequence 929 that incorporates the TOA-MF filter into the shaped code sequence 827. The filtered code sequence may be computed offline (i.e., in advance of the receiver receiving a wireless signal and possibly pre-stored in the receiver) or online (i.e., during operation or during the reception of wireless signals) and based on an expected PDP or an estimated PDP. One filtered code sequence is used per satellite or per code sequence, i.e., various filtered codes sequences may be stored/computed and each used to correlate with the received signal from the corresponding satellite.

Frequency Domain Preprocessing

In this section, we introduce frequency domain preprocessing performed in a receiving device, in order to reduce complexity, apply near-causal filtering, and prepare the signal for time domain processing. This processing is depicted in FIG. 2.

The preprocessing in this section is not needed if the signal is already in time domain (e.g., GPS or CDMA systems).

In the case of frequency domain systems such as OFDMA, a Fast Fourier Transform (FFT) is typically applied per symbol of interest to obtain the pilots (received reference signal) in frequency domain. The pilots are typically scrambled. Each OFDM symbol may contain a linear combination of signals transmitted from several transmitting devices (base stations, cells or satellites); interference between the transmitting devices may result, and hence, some transmitting devices may not be well heard (and could be dropped as we shall see below).

Before applying descrambling to extract the pilots of a given transmitter device, due to linearity, we may apply to a received symbol from the FFT block a causal filter (complex multiplication per subcarrier in the Fourier domain) and optionally a phase ramp rotation to align the symbol to an ideal position centered around location 0 in time domain (if the coarse time domain position of the transmitted path component is known); subsequent filtering in frequency domain can be lower cost and real only.

After descrambling of the pilots, we may coherently accumulate, per transmitter device, several received OFDM symbols to improve signal quality.

If the approximate position of the received channel in time domain is unknown, before performing an inverse FFT, we use banks of low cost filters or similar method (e.g., Fitz method), applied in the frequency domain, to determine approximately the position of the received signal in time domain; it can be simply obtained by the frequency filter bank that shows maximum energy. Indeed, each filter is "band" or "region" limited in time domain and outputs strong energy if the received impulse response is located within the corresponding region.

Optionally, we determine an approximate SNR at this point, per transmitter device, by finding the residual noise after coarse filtering.

All of the previous procedures could be applied to one or few OFDM symbols and then dropping the weak signals from weak transmitting devices before proceeding further. This is to reduce memory requirements the overall complexity. The focus can then be on transmitter devices heard with sufficient SNR.

After this step, we may continue coherently accumulating OFDM symbols for the selected and promising signals. The accumulation may be weighted to account for movement and Doppler.

Optionally we select or reselect an approximately suitable near-causal filter for each transmitter device based on approximate SNR (high SNR implies a causal filter with weaker early side lobes).

With approximate position of the impulse response known in time domain, we filter and resample the frequency domain signal with a low cost filter (e.g., short FIR or CIC or IIR) in order to reduce the sampling rate and hence complexity, if necessary, and/or to obtain uniformly spaced pilots. For example, in LTE the pilots are not uniformly distributed in some cases, and there may be some benefit in resampling for uniformly distributed pilots. As an example of shortening the frequency domain size: say we start with an LTE 20 MHz system with an FFT size and corresponding time domain of 2048 subcarriers and samples, respectively, with 15 kHz subcarrier spacing and 30.72 Msps. 2048 samples are equivalent to about 20 km of wave propagation time. However, in cities, a channel delay profile extends effectively to only about 2 or 3 km. Moreover, since we are not interested in the last path components in this delay profile, we could further focus on a smaller region, where we have information on where the first path component is approximately located. We can say that the impulse channel response is "band" or "region" limited in time domain. Therefore, we can filter and resample the frequency domain to about $\frac{1}{5}$th or $\frac{1}{10}$th of the subcarriers in order to reduce for the impulse response from each transmitter, antenna or cell: a) storage requirements, and b) iFFT size. Filtering and resampling should be carefully done to prevent aliasing into the region of the first (few) path component(s). The iFFT operation may insert zeros to increase a bit time domain sampling rate, if necessary. However, the higher sampling rate of time domain in the region of the first path component can be later achieved via time interpolation after the first path component is approximately located.

Figure 15:
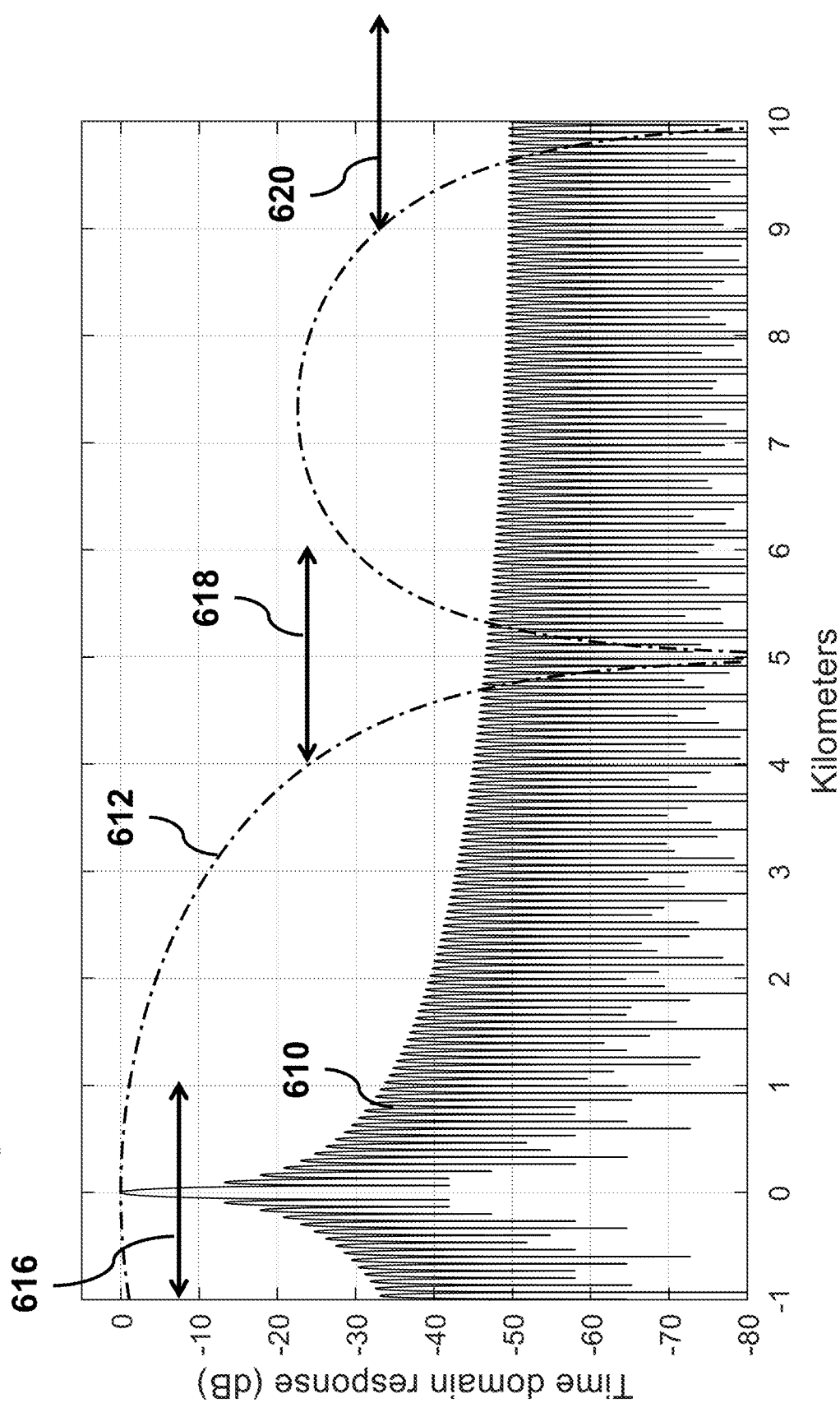
FIG. 15 is a graph showing how we can down sample (shorten) the frequency domain waveform before applying an inverse FFT (iFFT) to move to time domain. The graph shows the time domain signal and filter responses, before down sampling.

Another example is provided in FIG. 15. It is the case of LTE using 5 MHz signal. The time domain impulse response extends over 20 km (+/−10 km after re-centering).

If we know that the first path component 610 of the time domain's impulse response of the channel is located within some useful range 616, after re-centering, for example, from −1 km to +1 km around the center of the time domain, then we can attenuate substantially the time domain signal outside of this range by filtering the frequency domain signal; then we can down sample the frequency domain signal while ensuring that the impact of aliasing (post down sampling) is negligible. Note that the main lobe of 610 is centered at 0 in this figure.

The useful range can be narrower or wider than +/−1 km and then the frequency domain filter can be adapted to the expected range.

A simple and relatively low cost example of frequency domain filter is the triangular shape in frequency domain, $H_f(f)=[1\ 2\ 3\ 4\ 3\ 2\ 1]$, and having a time domain response 612, $H_f(t)$, a lowpass filter that is approximately a squared sinc in time domain.

The part of the signal that will alias after down sampling by 2 is the right edge of the figure, 620, at 10 km distance from the main lobe of the first path component. We observe that this part is weaker than the main peak of the signal by about 50 dB, and that the filter will further reduce it by an additional 35 dB, for a total 85 dB reduction. After down sampling (and shortening) of the frequency domain, this part will overlap and alias underneath the main lobe in 616 but it's impact will be negligible.

Similarly, the part of the signal that will alias after down sampling by 4 is the middle of the figure, 618, at 5 km distance from the main lobe of the first path component. We observe that this part is weaker than the main peak of the signal by about 50 dB, and that the filter will further reduce it by an additional 25 dB, for a total 70 dB reduction. After down sampling (and shortening) of the frequency domain, this part will overlap and alias underneath the main lobe in 616 but it's impact will also be negligible.

The frequency filter will typically distort the shape of the time domain signal inside the useful range 616 (aside from reducing the signal outside of the useful range). This distortion can be corrected in time domain by multiplying the time domain signal by $1/H_f(t)$ inside the useful range 616 in order to undo the distortion of $H_f(f)$, i.e., the multiplicative distortion of $H_f(t)$.

After down sampling the frequency domain signal by 2 or more, the size of the IFFT to move from frequency domain to time domain is reduced by half or more. It is then an option to upsample the time domain by inserting zeros in the center of the frequency domain and using a larger FFT. Although this is usually not necessary.

Finally, given an approximately estimated SNR in frequency domain, we select a near-causal filter constructed for that predetermined SNR (i.e., a filter with more causality is selected for high SNR, a filter with less causality is selected for low SNR. so that early side lobes of all multipath components are weakened to be of the order of the noise level). For example, the SNR range could be divided into two sections; −10 dB to 0 dB and 0 dB to 20 dB. For each section a filter is constructed, for example, for the mid-point SNR of −5 dB, and for the mid-point SNR of 10 dB. In real-time, the SNR is determined and the appropriate filter is selected. The selected filter is then applied (as a complex weight applied to each subcarrier, often with amplitude near 1, i.e., few bits are required to encode the weight). And then apply the (possibly shortened) iFFT to move to time domain. The above operations may not be needed if the processing starts in time domain.

FIG. 2 is an example of detailed processing in frequency domain of a signal received by a receiver. In step 220 an FFT is applied to the arriving OFDM symbols assuming an approximate OFDM symbol alignment has been obtained. In step 222 a phase ramp shift may then be applied in frequency domain in order to bring the time domain impulse response (of the signal received from each cell or the average cell) toward zero; this optional operation will help in the subsequent filtering operation. The operation assumes that approximate timing of transmission of the signal from each cell is known, e.g., during position or movement tracking, or from a known coarse position. In step 224 the Reference Signal (RS) pilots are descrambled, for signals received from each cell, using a list of cells obtained from the network or from other means. For the first OFDM symbol (or first few), we compute in step 226 the received energy per cell, in the frequency domain. The energy is obtained by filtering around time domain sample 0 with a bandwidth equal to the expected time domain channel length (determined using standard techniques). Weak energy signals from cells are identified and dropped, based on a predetermined signal level threshold selected for the application. We proceed with the remaining signals. Based on each signal's energy, we may select the most appropriate causal filter (per cell). Or we may select one causal filter suitable for all signals. Fine Doppler estimation can be computed at this point, if necessary. Although it is usually already known. If we do not know the approximate position of the cell or of its signal in time domain, at this stage we may attempt several filters in frequency domain (using different phase ramps to select different time domain positions), and then select, for a given cell, the highest energy position in time domain. From this point on we perform the processing over all available OFDM symbols and for all remaining signals (having good energy). In step 228 IIR or FIR filtering of the frequency domain helps interpolate the RS pilots to align the subcarrier positions with previous and subsequent OFDM symbols (although this operation could be performed later). In step 230, several OFDM symbols are accumulated, coherently, in order to increase SINR level. The accumulation may use an FIR (or IIR) filter that accounts for the Doppler effect, although it can usually be a simple accumulation over a short time (for fast moving objects, we may split the set of OFDM symbols into two or more adjacent subsets; each subset is accumulated coherently separately; then the subsets are combined as explained later regarding combining different time snapshots). Furthermore, the filtering operation enables shortening the frequency domain by down sampling. The main region of interest in time domain is the first few arriving path components. All the rest can be filtered and removed in frequency domain in order to down sample as much as feasible (without degrading the time of arrival estimation by creating excessive aliasing). In step 232, a near causal filter is applied to signals per cell or for all cells (applying it for all cells requires applying it before step 224). The near causal filter shapes the time domain waveform such that side lobe interference is reduced onto the first arriving path component and in the operating region. Its ideal shape is a function of the signal and noise covariance matrix. But in most cases one (or few) shape fits all. The near-causal filter applied in step 232 may be based on one or more methods described herein. In step 234 we perform an inverse FFT for signals from each cell and then move to the time domain processing.

Time Domain Preprocessing

If a receiver performs time domain processing (e.g., TDMA, CDMA or GPS), or for receivers which perform frequency domain processing, once we are in time domain after an iFFT operation (e.g., OFDMA processing per FIG. 2), the impulse response to be analyzed contains the original reference waveform modified by near-causal filtering, plus its echoes and noise.

The goal now is to determine the time of arrival based on this new time domain impulse response.

In time domain, we estimate the noise level in the early samples before the main signal starts (i.e., before the first path component). Noise might contain some aliased signal, which can now be considered as noise. The noise estimation can be performed by averaging the power of a number of samples, from the current snapshot as well as from different but compatible snapshots (different time, different antenna, etc.) to increase the accuracy of noise estimation, which is important to reduce false alarms of a wrongly detected signal energy rise. Accumulation cost can be reduced by accumulating absolute values instead of power values, with some well-known correction function of the I/Q values to approximate $I^2+Q^2$). Alternatively, noise power level is determined based on average and/or number of the few strong peaks in the noise region.

Determination of the noise region may be based on several methods. First, it may be known from network side information on where the useful signal is located. That is, it may be programmed on the receiving device in advance, or communicated from another network device during operation. Alternatively, the following method may be used. First, the peak levels are grossly determined in each section of the time domain signal.

Then the section with lowest peak levels but preceding the first strong peak level (e.g., above a threshold) may be considered the noise section. The noise level can then be estimated within this noise section (e.g., by averaging the signal level over the section, possibly using a sliding window that ends as soon as the energy rise is detected)

Next, a threshold is determined above the noise level which will be used to detect signal energy rise. The threshold may be 8 to 13 dB above noise average power level, taking into account the precision of the estimated noise level as well as probability of sudden early side lobes emerging high above the noise due to some strong multipath components. Furthermore, the threshold above noise power level can be time varying, increasing as we move closer to the main useful signal. This is to reduce the chances of false alarms from early noise or early side lobe spikes.

If a first detected signal region is weak (over M consecutive samples where M is determined empirically), i.e., a region of low reliability, barely above the threshold, then the detected signal region and the corresponding estimated time of arrival may be dropped or tagged as potentially a false alarm (i.e., noise). In such a case, in addition to this first low-quality estimate, a second more reliable higher quality first path component can be estimated in subsequent samples. Hence, 2 or more estimates can be reported with varying quality.

Once the energy rise is detected, we can optionally measure the SNR (or improve the previous measurement of the SNR) and then reselect a different near-causal filter.

Then interpolate in time domain, using the original or reselected near-causal filter (convolved with the original reference waveform), to obtain enough samples on the rising curve after and before the signal energy rise detection.

Finally, use one of the various methods described in this patent application in order to locate more precisely the position of the first path component, i.e., the time of arrival of the signal, within the operating region, i.e., the first region around and after the energy rise. The methods essentially match the detected rising curve (rising signal energy) against pre-stored rising curves with corresponding time offsets to hypothesize the position of the waveform (the first path component waveform).

FIG. 3A is an example of time domain processing. In step 300, the noise level is estimated in the early side lobe region 120 (FIG. 1). It can also be estimated in different regions or globally; however, the region 120 provides major benefits in terms of noise estimation quality for time of arrival estimation, and that includes early side lobes noise. In step 302, we detect a first sample some desired level above the estimated noise level in region 120 (FIG. 1). Usually, 8 to 12 dB above the estimated noise level. It is preferred to use a relatively high level such as 12 dB; then optionally, move a little backward (i.e., earlier in time domain) and check if a weaker level such as 8 or 10 dB can detect an earlier weak arriving path component. This sub-step is helpful in detecting weak path components in Non-Line-of-Sight (NLOS) environments; this sub-step may be complemented with a check that a little later there is indeed good signal energy (more samples above 12 dB or even above 14 dB are immediately after, in order to avoid the particular case of an isolated path component detection at 12 dB and that can lead to false alarms when we check for the 8 dB level). In optional step 304, a more accurate SNR is estimated based on the regions 124 and 126 (FIG. 1), which represent the ratio of received full signal power over noise power. In optional step 306, based on estimated SNR and/or estimated multipath component level and characteristics (more on this later) in region 126 (FIG. 1), the best suitable noise covariance matrix may be selected (e.g., from a set of prestored matrices). In optional step 308, and based on the noise covariance matrix estimate, an improved near-causal filter can be selected (which better fits the multipath characteristics, and hence improves interference reduction). In step 310, the original or the improved near-causal filter is applied, for example as a short FIR (10 to 20 samples) in time domain in order to interpolate and obtain the N≥1 points of interest in the operation region 124 (FIG. 1) for the subsequent N point matching algorithm. In step 312, a minimum distance or N point matching algorithm (FIG. 3B) is executed in order estimate the time of arrival (assuming some number of nuisance path components, and some amount of colored noise). The choice of the N points is: for N=1 point (simple energy detection), a point that is some level above the noise level (e.g., 12 to 14 dB); for N=2 points, it is usually 2 nearby points in the region where SINR is maximal after the preceding filtering operations. For N≥3 points, we select N points in a region of maximal SINR and that are least correlated.

FIG. 3B is an overview of the steps of step 312 of FIG. 3A. In step 324, Correlate the N point signal vector with the set of ML sequences in order to a) undo the filtering (the prime), b) undo the colored noise or reduce the colored noise (the inverse of matrix C), c) orthonormalize the set of first and nuisance paths (matrix Γ), and d) maximize the norm of the projection onto the signal vector that has the best timing (TOA) hypothesis. In step 326, the sequence that shows the strongest correlation is determined. In step 328, the time offset corresponding to this sequence (obtained from the corresponding set t) provides the timing of the first path component (TOA).

FIG. 3C provides an overview of a method for estimating a time of arrival of a signal received by a receiving device over a wireless channel by identifying a location in the time domain of a first path component in a waveform of the received signal, according to an embodiment of the invention. Step 330 applies a filter to the waveform; step 332 identifies in the waveform an observation window associated with an energy rise in the waveform; step 334 correlates the identified observation window in the waveform with correlator sequences, and step 336 determines a time of arrival offset of the first path component from results of correlating the observation window with the correlator sequences, e.g., by minimizing a cost function; wherein properties of the correlator sequences depend on properties of the filter such that the correlator sequences account for the filtering of the waveform during the correlating, wherein the correlator sequences reduce the effect of colored noise after hypothetical first path components; wherein the correlator sequences correspond to different time shifts of a hypothetical first path component.

System for Estimating TOA

All the techniques described above regarding filter construction, filter selection, operating point determination and TOA estimation are executed on a processing system. Therefore, an aspect of some embodiments of the present invention relates to a system for estimating TOA.

A system 400 for estimating TOA according to an embodiment of the invention is illustrated in FIG. 11. The system includes a receiving device 402, a processing unit 404, a memory unit 406, and an input/output interface 408.

The system 400 may be used for online TOA estimation, and may not be required, itself, to generate a filter described above. That is, the system 400 may analyze a received signal 401, extract one or more properties therefrom, and use the one or more properties to match the one or more properties of the received signal to one or more corresponding pre-calculated filters. In some embodiments of the present invention, a single pre-calculated filter is available for being applied to an incoming signal. In other embodiments, multiple pre-calculated filters may be available and applied depending on the properties of the received signal. Alternatively, one or more filters may be determined by system 400 based upon the real-time or historical properties of the received signal.

In a further embodiment, multiple received signals 401 (or "snapshots") may be combined using the various methods described herein, so as to further improve performance.

The receiving device 402 may be any kind of detector able to detect the transmitted signal. In the case in which the transmitted signal is a radio signal, the receiving device is any kind of known antenna operating within a radio frequency. The receiving device 402 is configured for generating a received signal in response to the reception of the transmitted signal.

The received signal 401 is received by the processing unit 404, which applies a near-causal filter as described above to the received signal, to generate the first waveform. The processing unit 404 follows the method of FIG. 2 and FIG. 3A to estimate TOA, by using any one of the above described decision methods. When the TOA estimation is complete, the processing unit 404 may output the estimated TOA value to the input/output interface 408, which will communicate the value to a user, and/or stores the estimated value in the memory unit 406, for later use and/or further processing.

Preferably, prior to the application of the filter, the processing unit 404 extracts at least one value related to at least one property related to at least one of a signal to noise ratio (SNR) of the received signal in the time domain, a channel length, and a power delay profile. In some embodiments of the present invention, the memory unit 406 includes a plurality of pre-calculated instances/adaptations of the near-causal filter, each instance corresponding to a respective value of the one or more properties. The processing unit 404 selects the pre-calculated adaptation of the near-causal filter which corresponds to the extracted value. The pre-calculated filters are configured for filtering the matching received signals in order to enable more accurate and/or easier TOA estimation by the further processing of the filtered received signal (first waveform).

Optionally, following the application of the near causal filter the processing unit is configured for analyzing the first waveform, in order to check if a better instance of the near causal filter can be applied to the received signal. In this manner, the near causal filter can be optimized to the received signal.

The memory unit 406 is a computer memory in communication with the processing unit and is configured for storing data indicative of: the non-causal filter or of a plurality of adaptations thereof, computer-readable instructions for processing the received signal, computer readable instructions for processing the received signal for executing the at least one predefined decision technique.

The input/output interface 408 is any type of interface that connects the processing unit to input and or output devices, to enable communication between the processing unit and a user.

The processing unit comprises a microprocessor, microcontroller, custom ASIC, and/or discrete circuitry which may be selected on the basis of power consumption, size, processing speed, memory capacity, and other factors for performing all of the functionality of the apparatus.

The system 400 may include a cellular phone, a smart phone, a tablet computer, a laptop computer, a desktop computer, or any similar computing/communication electronic device.

In another aspect, the invention provides techniques to address an issue related to multipath mitigation filters designed for satellite navigation systems.

The issue is concerned with generalizing the TOA-MF design. Although TOA-MF filters are designed to maximize SINR, it is possible to design different types of multipath mitigation filters mainly based on the near-causal filter property. These designs might not maximize SINR but they may fulfill other criteria, such as minimizing the impact of side lobes while maintaining a sharp rising edge of the main lobe.

Figure 21:
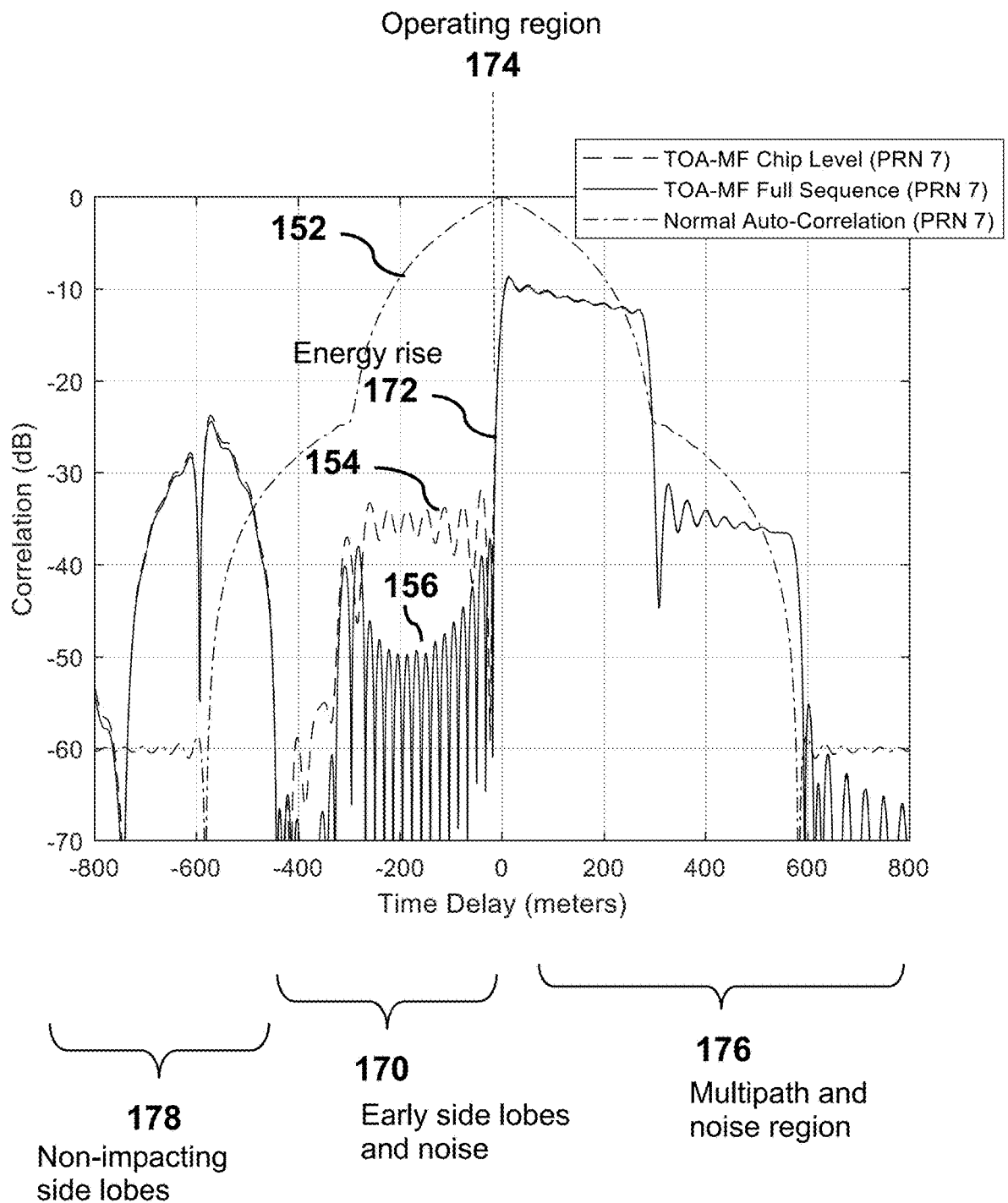
FIG. 21 is a graph of correlation output vs time delay, comparing the standard correlation curves with the correlation using a TOA-MF filter matched to the full PRN 7 sequence for standard GPS band L1 C/A.

FIG. 21 shows the correlation output for standard GPS band L1 C/A, using bandwidth of 16.368 MHz; as well as the correlation for the case using TOA-MF filter. We show the correlation for satellite using PRN 7 (pseudo random noise).

Figure 22:
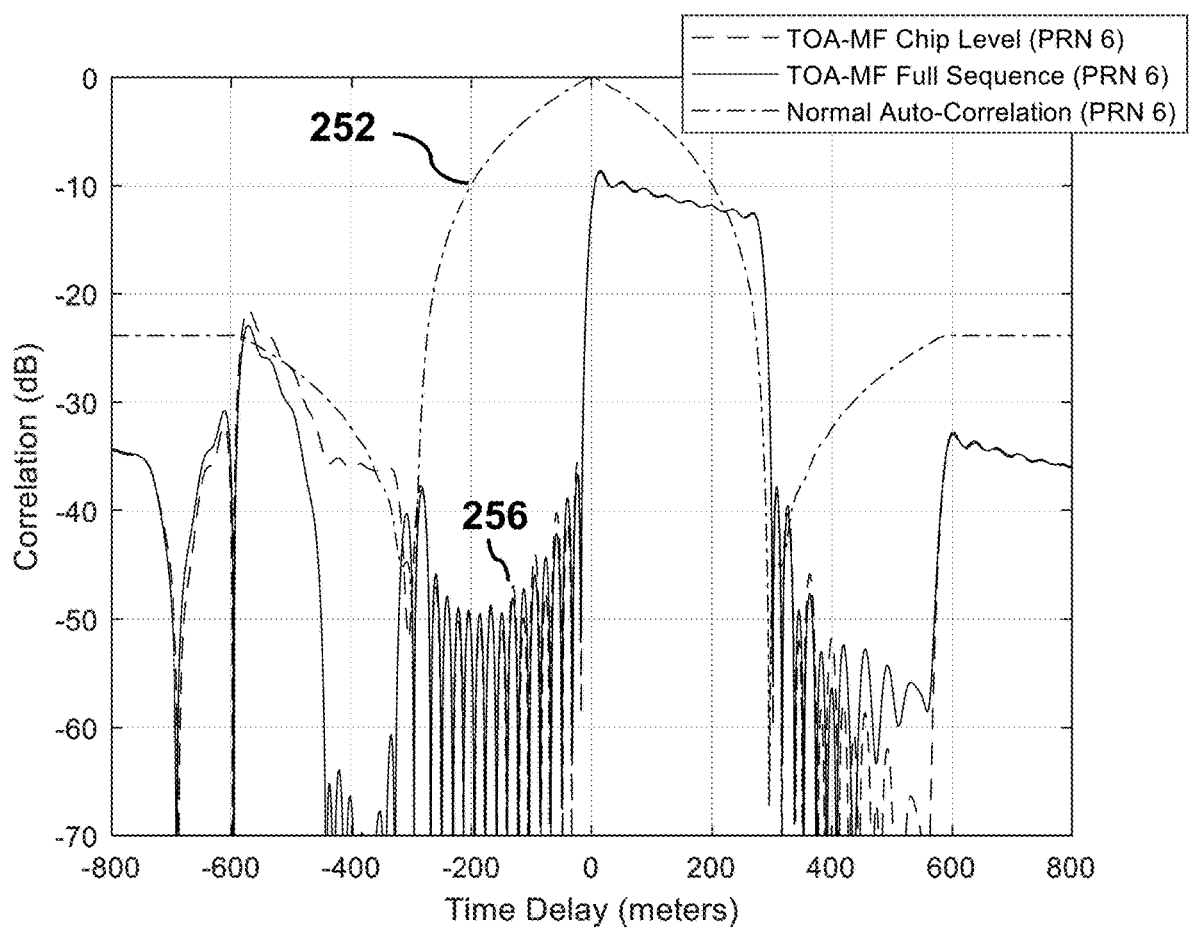
FIG. 22 is a graph of correlation output vs time delay, comparing the standard correlation curves with the correlation using a TOA-MF filter matched to the full PRN 6 sequence for standard GPS band L1 C/A.

FIG. 22 same as FIG. 21 but for PRN 6.

Figure 23:
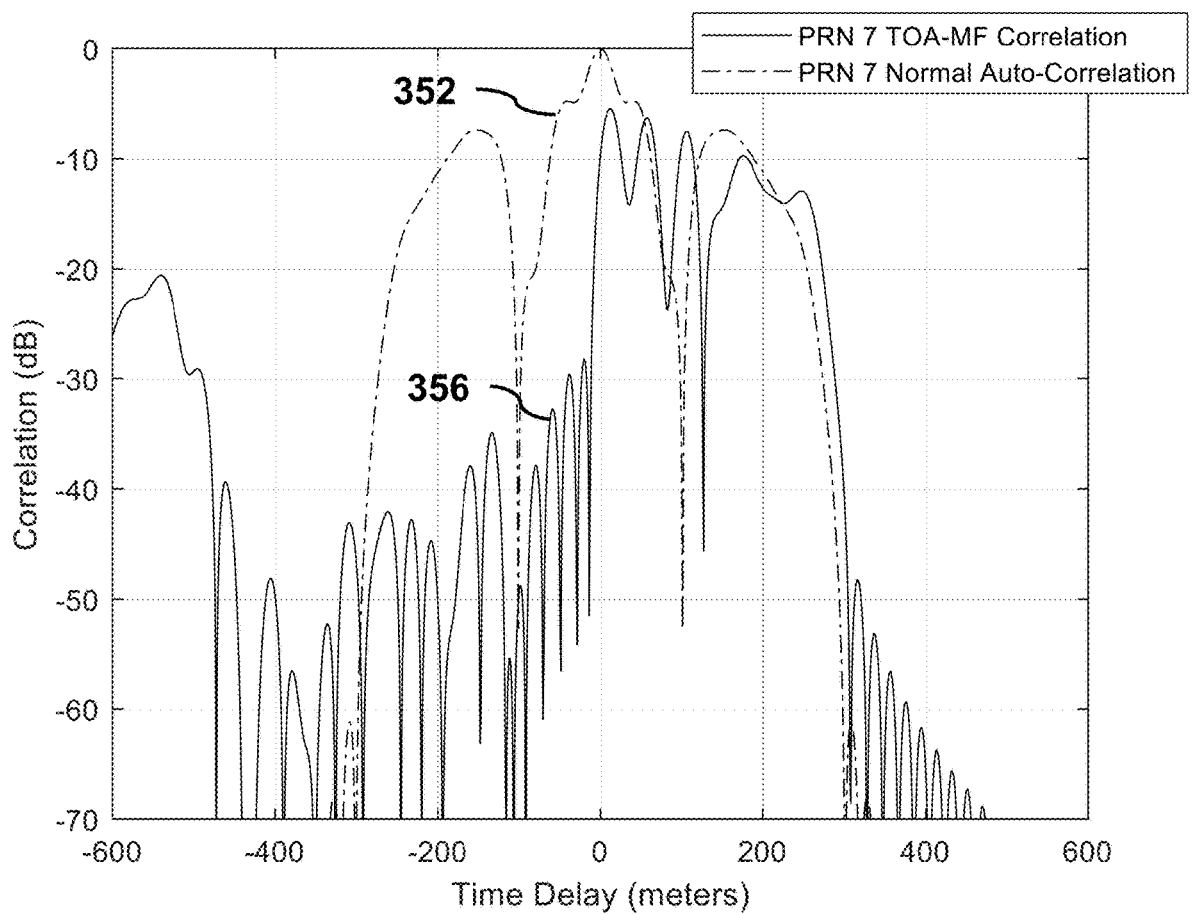
FIG. 23 is a graph of correlation output vs time delay, comparing the standard correlation curves with the correlation using a TOA-MF filter for Galileo band E1.

FIG. 23 same as FIG. 21 but for Galileo band E1 (any PRN).

Figure 24:
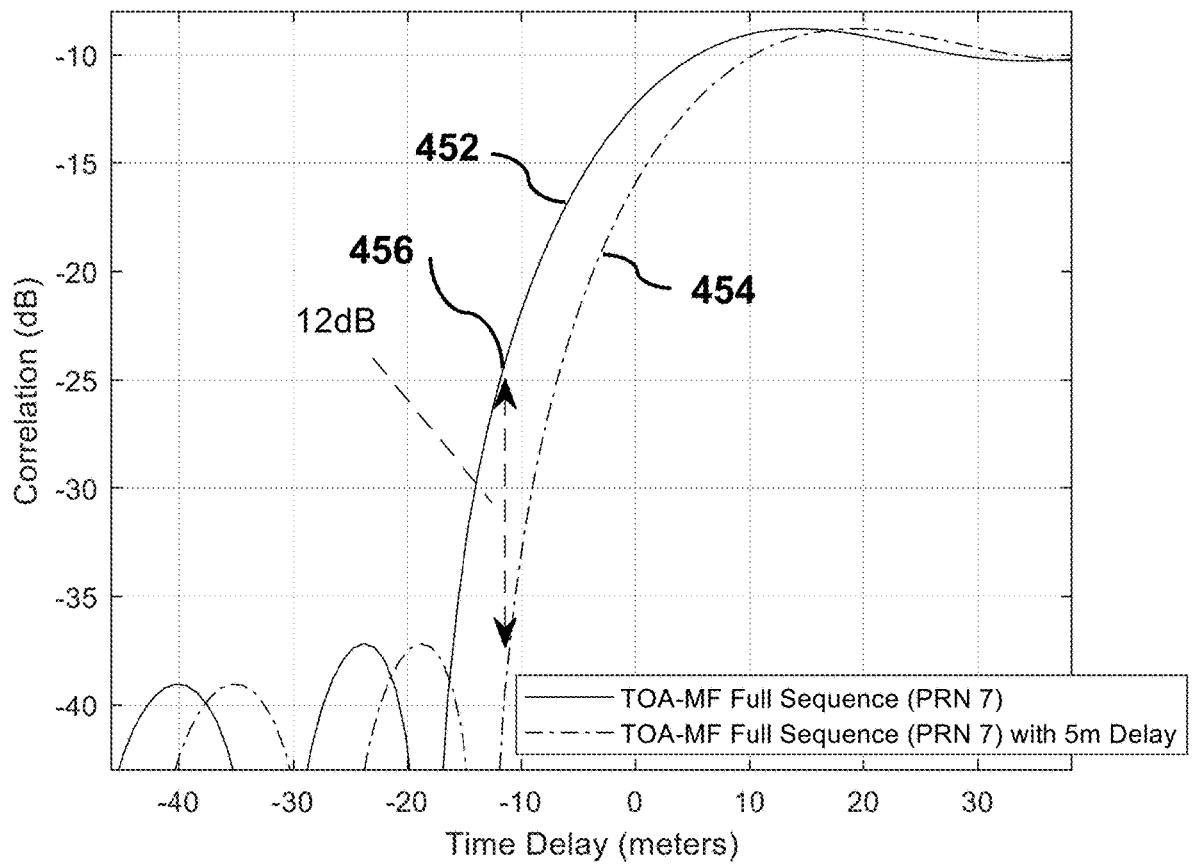
FIG. 24 shows detail of the graph of FIG. 21 illustrating the rising edge of the main lobe for the TOA-MF case, as well as a delayed path's correlation (delayed by 5 meters).

FIG. 24 is a zoom of FIG. 21 onto the rising edge of the main lobe for the TOA-MF case, as well as a delayed path's correlation (delayed by 5 meters).

Near-Causal Filter or Near-Causal Correlation Output for Multipath Mitigation in Satellite Navigation Systems (GNSS)

FIG. 21, 22, 23 are helpful to explain the solution. 152, 252 and 352 are the standard correlation curves (in dB scale). We observe, in addition to the main lobe, residual side lobes due to imperfect auto-correlation of the PRN sequence. The solid line curves 156, 256, 356 are the correlation when using a TOA-MF filter matched to the full PRN sequence. The curve 154 corresponds to correlation when using TOA-MF filter matched to 1 chip (not to the full PRN sequence). The difference with 156 is that the early side lobes are less suppressed (more on this later).

More formally, the standard correlation is the convolution or correlation of the BPSK (GPS) or BOC (Galileo) waveform with itself, $R_G = G \odot conj(G)$, where vector G is a BPSK or BOC waveform (including or not the PRN sequence), and $\odot$ is the elementwise product in frequency domain or convolution or correlation in time domain. For the TOA-MF correlation, TOA-MF filter vector X replaces the correlation with G as follows to obtain the output correlation $R_X = G \odot conj(X)$; i.e., we replace the usual matched filtering with G by filtering with X.

The general observation is that the output correlation functions after applying the TOA-MF are near causal. Hence, it is sufficient to design a type of filter that generates a near causal correlation output, and a TOA-MF filter is only one particular case.

The essential property is that there is a sharp rising edge at the start of the main lobe (time delay 0), i.e., 172 energy rise or detection of the start of main lobe, and 174 operating region where SINK is strong for best TOA estimation. This is preceded by side lobes with substantially reduced power, 170, i.e., early side lobes region that have impact on the first path when there are delayed multipath (−450 meters to 0 meters roughly on FIGS. 21, 22, 23). Both these properties, sharp rising edge of main lobe and reduced side lobe power, ensure that we eliminate significantly the impact of late arriving multipath.

For instance, FIG. 24 shows, using a TOA-MF filter, a first arriving path 452, and a late arriving path, late by 5 meters (dashed curve 454). The late path is attenuated by 12 dB (arrow starting at 456) in the useful operating region where we will estimate TOA. The operating region is located at 174 or 456.

Note that the further earlier sidelobes, before −450 meter in region 178, have no impact on TOA estimation if maximum delayed multipath is assumed to be around 450 meters.

On the other side, the late side lobes in region 176 do not impact the TOA estimation: this is where delayed multipath occur relatively to the first path.

Generating a near-causal correlation suitable for GNSS, in place of the TOA-MF filter that maximizes SINR, can be done in a variety of ways. In particular, we can constrain the early sidelobes 170 of the output correlation $R_X$ to be at certain level below the main lobe. It Is sufficient to enforce this constraint in the region 170 where sidelobes from late multipath may interfere with the rising edge of the main lobe of the first path (based on maximum expected multipath delay). Example, the early sidelobes between −450 meters and 0 meters on FIGS. 21, 22, 23 should be constrained; assuming that maximum delay is 450 meters for non-negligible multipath (i.e., multipath beyond 450 meters are considered too weak and won't matter, in this particular example).

A similar method was described earlier in this description in order create a filter X by pushing down and constraining the early side lobes. However, an important difference and distinction for the case of GNSS's BPSK or BOC waveforms is that an early section of the "fat" main lobe of the standard correlation $R_G$ can be considered "like" an early sidelobe. Comparing main lobe 152, 252, 352 to the main lobe of 156, 256, 356, we observe that half of the main lobe of the 152, 252, 352 was pushed down similarly to the early side lobes. The main lobe in TOA-MF correlation is about half the width of the main lobe in the standard correlation.

Therefore, the overall solution also needs to constrain a part of the main lobe (usually roughly half of it is a good first guess but a better result can be found by trial and error).

Constraining the correlation's early sidelobes and part of the early main lobe to be below a threshold can be done in a variety of ways (aside from the TOA-MF method). The region to be constrained in the example shown in FIGS. 21, 22, 23 is the region roughly from −450 meters to 0 meters. A desirable response can be assumed to have standard $R_G$ response 152, but where the region between −450 meter and 0 meters is set to all 0: no side lobe power ideally. However, this solution is non-reachable within the limited bandwidth (it needs infinite bandwidth). The algorithm will find a tradeoff on early sidelobe power in region 170 and how well we match the remaining part of $R_G$ 152.

To find a solution, we may proceed by iterations. First, we need to oversample the time domain, at least by two times, to properly model the sidelobe power. We set the ideal correlation response vector $R_{G0}$ to $R_G$ except in the region 170 in time domain where we set it to 0. As the frequency domain of $R_{G0}$ is limited to the bandwidth of interest (e.g., 16.368 MHz). this is a hard constraint on the problem. We may therefore solve the problem by also considering the frequency domain, i.e., applying the square Fourier transform matrix, F, from time domain to frequency domain, or vice versa, $F^H = F^{-1}$, from frequency domain to time domain.

Since the bandwidth is limited in frequency domain, the extra frequency bins are constrained to 0 and this can be simply achieved by including a truncation matrix T that is a non-square matrix, having fewer rows than columns, with partial diagonal of ones, and with remaining elements 0. Matrix T truncates a vector from the oversampled space to the useful bandwidth in frequency domain. Vice versa, transpose matrix $T^T$ extends a vector from the bandwidth limited size to the oversampled size by inserting zeros. Example, $R_X^{freq} = TFR_X^{time}$ and vice versa $R_X^{time} = F^H T^T R_X^{freq}$. The superscript indicates the vector is in time or frequency domain, for clarity.

Note that $TT^T = I$, an identity of same size as the bandwidth frequency domain. Matrix $T^T T$ is a squared diagonal matrix, of same size as the oversampled domain, with ones on the diagonal except zeros where we are out of bandwidth (truncated diagonal).

The problem can now be formulated as iteratively minimize the cost function, $$\min_{R_X}(R_{G0} - R_X)^H W (R_{G0} - R_X),$$

where $R_X$ is the correlation vector we are trying to design (the unknown vector), $R_{G0}$ is the desired correlation vector, and W is a weighting matrix. The cost function is given in either time or frequency domain (we may include superscripts "time" or "freq" when the distinction is helpful; otherwise, we drop the superscript). In time domain, the weight matrix is diagonal with strong weights given in the early side lobes region 170 in order to push down the early side lobes. The weight matrix is iteratively updated in time domain until we are satisfied with the power of sidelobes in 170. Since $R_{G0}$ is defined in time domain (and has no equivalent in the truncated or bandwidth limited frequency domain), and since W is known in time domain, we may assume the minimization and all quantities are in time domain except for unknown vector $R_X^{freq}$ in frequency domain (it needs to be in frequency domain where its components are independent and uncorrelated):

$$\min_{R_X^{freq}} (R_{G0} - F^H T^T R_X^{freq})^H W_i (R_{G0} - F^H T^T R_X^{freq})$$

We have added subscript i to weight matrix $W_i$ in order clarify that this is the weight matrix at iteration i. The solution for an iteration i is given by the Least Squares solution $$R_X^{freq}(i) = (TFW_i F^H T^T)^{-1} TFW_i R_{G0}^{time}$$

After each iteration, the diagonal of weight matrix $W_i$ is updated to increase or decrease the weight in the various regions until we achieve the desired outcome: as close as possible to $R_{G0}$ and, as with sidelobes in 170, as weak as possible. The proposed solution is only one solution out of many to constrain the side lobes, such as a constrained gradient descent, a minimax type of algorithm, etc.

Finally, the filter to be applied in order to achieve a near causal correlation output can be obtained from $R_X = G \odot \text{conj}(X)$, e.g., in frequency domain $X = \text{conj}(R_X \oslash G)$ in the non-zero region of G (i.e., in the useful bandwidth), and $X = 0$ in the zero region of G. The operator $\oslash$ denotes element-wise division in frequency domain, or equivalently circular deconvolution in time domain. The operator $\oslash$ maybe extended in frequency domain to output zero when the denominator is zero (out of band).

Note that filter X may not necessarily be near causal. The near-causal property mainly applies to the output of the convolution or correlation of X by G, i.e., to $R_X$.

The invention claimed is:

1. A method for estimating a time of arrival of a signal transmitted over a wireless channel, the method comprising:
   receiving the signal by a receiving device to produce a received signal;
   filtering by a filter either the received signal or a code sequence, wherein the filter is designed to produce a correlation output that is near causal;
   correlating the received signal with the code sequence to create the correlation output that is near causal; wherein near causal means that early side lobes and an early part of a main lobe of the correlation output are sufficiently suppressed in order to substantially reduce an impact of delayed multipath onto a first path component in the received signal, wherein the first path is in an operating region;
   identifying in the correlation output, an observation window associated with a main lobe in the correlation output;
   processing the observation window to determine a time of arrival of the first path component in the received signal.

2. The method of claim 1 wherein the early part of the main lobe is a part of the main lobe before a peak of the main lobe.

3. The method of claim 1 wherein the side lobes and the early part of the main lobe are suppressed by predetermined amounts selected to reduce TOA error in predetermined operational conditions.

4. The method of claim 1 wherein the side lobes and the early part of the main lobe are sufficiently suppressed to decrease the impacting early side lobes and the first 50% or less of the main lobe by at least 20 dB below the peak of the main lobe.

5. The method of claim 1 wherein the filter is designed to produce a correlation output that is near causal by iteratively reweighting a cost function until the early side lobes and a part of the main lobe of the output correlation are suppressed.

6. The method of claim 1 wherein the filtered code sequence is precomputed and stored by the receiving device.

7. The method of claim 1 wherein the filtered code sequence is computed by the receiver.

8. The method of claim 1 wherein the shaping sequence is a square wave or binary offset carrier (BOC) waveform.

9. The method of claim 1 wherein the power delay profile is an expected power delay profile of the wireless channel.

10. The method of claim 1 wherein the power delay profile is a measured power delay profile of the wireless channel.

11. The method of claim 1 wherein the code sequence is a PRN code sequence, CDMA code sequence, GNSS code sequence, or GPS L1 code sequence.

12. The method of claim 1 wherein identifying an observation window associated with a main lobe comprises identifying a rising edge in the correlation output.

13. The method of claim 1 wherein identifying an observation window associated with a main lobe comprises identifying a falling edge in the correlation output.

14. The method of claim 1 further comprising correlating the observation window with correlator sequences that reduce the effect of colored noise after a hypothetical first path component.

15. The method of claim 14 wherein the correlator sequences correspond to different time shifts of the hypothetical first path component.

* * * * *